(12) United States Patent
Aureglia et al.

(10) Patent No.: US 8,230,321 B2
(45) Date of Patent: *Jul. 24, 2012

(54) SYSTEM IN AN ELECTRONIC SPREADSHEET FOR DISPLAYING AND/OR HIDING RANGE OF CELLS

(75) Inventors: Jean-Jacques Aureglia, Saint Martin du Var (FR); Frederic Bauchot, Saint Jeannet (FR)

(73) Assignee: International Business Machines Corporation, Armonk, NY (US)

( * ) Notice: Subject to any disclaimer, the term of this patent is extended or adjusted under 35 U.S.C. 154(b) by 675 days.

This patent is subject to a terminal disclaimer.

(21) Appl. No.: 12/352,220

(22) Filed: Jan. 12, 2009

(65) Prior Publication Data

US 2010/0199161 A1 Aug. 5, 2010

Related U.S. Application Data

(63) Continuation of application No. 10/299,744, filed on Nov. 19, 2002, now Pat. No. 7,546,523.

(30) Foreign Application Priority Data

Mar. 28, 2002 (EP) ..................... 02368032

(51) Int. Cl.
G06F 17/30 (2006.01)
G06F 17/18 (2006.01)
(52) U.S. Cl. ....................... 715/217; 715/218
(58) Field of Classification Search .................. 715/217, 715/218
See application file for complete search history.

(56) References Cited

U.S. PATENT DOCUMENTS

| 5,315,581 A | * | 5/1994 | Nakano et al. | 370/218 |
| 5,715,294 A | * | 2/1998 | Pester, III | 379/32.03 |
| 6,711,715 B1 | * | 3/2004 | Grealish | 715/206 |

* cited by examiner

*Primary Examiner* — Doug Hutton, Jr.
*Assistant Examiner* — Shawn S Joseph
(74) *Attorney, Agent, or Firm* — David A. Dagg

(57) ABSTRACT

The present invention is directed to a method, system and program for displaying and/or hiding, in an electronic multi-dimensional spreadsheet on a user interface, elements of a range of cells, a range of cells having one or more contiguous elements aligned along a given spreadsheet dimension, an element of a range of cells having one or more cells along one or a plurality of spreadsheet dimensions. The method includes (A) detecting a command for hiding at least one element in a selected range of cells, the command comprising means for identifying the selected range of cells and means for identifying a display focus level selected among a plurality of ordered display focus levels defined for the selected range of cells; (B) identifying the selected range of cells in the element to hide; (C) identifying the selected display focus level; (D) identifying a table associated with the selected range of cells, the table associating each defined display focus level with at least one cell content criteria to apply to the content of the at least one cell; and (E) selectively displaying the element on the user interface based on the relationship of the selected display focus level with the display focus level associated with the element.

17 Claims, 23 Drawing Sheets

FIG. 19A

| | A | B | C | D | E | F | G | I | |
|---|---|---|---|---|---|---|---|---|---|
| | 1901 | 1902 | 1903 | 1904 | 1905 | 1906 | 1907 | 1908 | |
| 1 | Date | Item | Unit Price | Number | Total | Region | Town | Type | |
| 2 | 02/01/2001 | item A | 50.00 | 2 | 100.00 | North | Lille | element | |
| 3 | 02/01/2001 | item B | 20.00 | 3 | 60.00 | West | Nantes | element | ←1909 |
| 4 | 02/01/2001 | item A | 50.00 | 2 | 100.00 | North | Lille | element | |
| 5 | 02/01/2001 | item A | 50.00 | 5 | 250.00 | East | Strasbourg | element | |
| 6 | 02/01/2001 | item A | 50.00 | 7 | 350.00 | North | Lens | element | |
| 7 | 02/01/2001 | item B | 20.00 | 2 | 40.00 | West | Rennes | element | |
| 8 | 02/01/2001 | item C | 70.00 | 5 | 350.00 | South | Marseille | element | |
| 9 | 03/01/2001 | item A | 50.00 | 4 | 200.00 | South | Nice | element | |
| 10 | 03/01/2001 | item A | 50.00 | 4 | 200.00 | North | Lille | element | |
| 11 | 03/01/2001 | item C | 70.00 | 8 | 560.00 | North | Lille | element | |
| 12 | 03/01/2001 | item A | 50.00 | 4 | 200.00 | North | Lens | element | |

FIG. 19B

| | A | B | C | D | E | F | G | I | |
|---|---|---|---|---|---|---|---|---|---|
| 1 | Date | Item | Unit Price | Number | Total | Region | Town | Type | |
| 38 | 05/01/2001 | item A | 50.00 | 4 | 200.00 | South | Nice | element | 1910 |
| 39 | 05/01/2001 | item B | 20.00 | 1 | 20.00 | North | Lille | element | |
| 40 | 06/01/2001 | Lens Week 1 | | | 1390.00 | North | Lens | town week | ←1918 |
| 41 | 06/01/2001 | Lille Week 1 | | | 3250.00 | North | Lille | town week | ←1911 |
| 42 | 06/01/2001 | Marseille Week 1 | | | 1260.00 | South | Marseille | town week | |
| 43 | 06/01/2001 | Nantes Week 1 | | | 450.00 | West | Nantes | town week | |
| 44 | 06/01/2001 | Nice Week 1 | | | 1400.00 | South | Nice | town week | |
| 45 | 06/01/2001 | Rennes Week 1 | | | 40.00 | West | Rennes | town week | |
| 46 | 06/01/2001 | Strasbourg Week 1 | | | 890.00 | East | Strasbourg | town week | |
| 47 | 06/01/2001 | East Week 1 | | | 890.00 | East | | region week | |
| 48 | 06/01/2001 | North Week 1 | | | 4640.00 | North | | region week | ←1912 |
| 49 | 06/01/2001 | South Week 1 | | | 2660.00 | South | | region week | |
| 50 | 06/01/2001 | West Week 1 | | | 490.00 | West | | region week | |
| 51 | 06/01/2001 | Total Week 1 | | | 8680.00 | | | week | ←1913 |
| 52 | 08/01/2001 | item A | 50.00 | 2 | 100.00 | North | Lens | element | |
| 53 | 08/01/2001 | item A | 50.00 | 7 | 350.00 | South | Nice | element | |

FIG. 19C

| | A | B | C | D | E | F | G | I | |
|---|---|---|---|---|---|---|---|---|---|
| 1 | Date | Item | Unit Price | Number | Total | Region | Town | Type | |
| 245 | 31/01/2001 | item A | 50.00 | 2 | 100.00 | West | Nantes | element | 1914 |
| 246 | 31/01/2001 | item A | 50.00 | 5 | 250.00 | North | Lens | element | |
| 247 | 31/01/2001 | Lens January | | | 8670.00 | North | Lens | town month | |
| 248 | 31/01/2001 | Lille January | | | 13750.00 | North | Lille | town month | ←1915 |
| 249 | 31/01/2001 | Marseille January | | | 5440.00 | South | Marseille | town month | |
| 250 | 31/01/2001 | Nantes January | | | 3450.00 | West | Nantes | town month | |
| 251 | 31/01/2001 | Nice January | | | 5570.00 | South | Nice | town month | |
| 252 | 31/01/2001 | Rennes January | | | 340.00 | West | Rennes | town month | |
| 253 | 31/01/2001 | Strasbourg January | | | 5060.00 | East | Strasbourg | town month | |
| 254 | 31/01/2001 | East January | | | 5060.00 | East | | region month | |
| 255 | 31/01/2001 | North January | | | 22420.00 | North | | region month | ←1916 |
| 256 | 31/01/2001 | South January | | | 11010.00 | South | | region month | |
| 250 | 31/01/2001 | West January | | | 3790.00 | West | | region month | |
| 258 | 31/01/2001 | Total January | | | 42280.00 | | | month | ←1917 |
| 259 | 01/02/2001 | item A | 50.00 | 7 | 350.00 | South | Nice | element | |
| 260 | 01/02/2001 | item A | 50.00 | 2 | 100.00 | North | Lille | element | |

/1919

|    | A | B | C | D | E | F | G | I |
|----|---|---|---|---|---|---|---|---|
| 1 | Date | Item | Unit Price | Number | Total | Region | Town | Type |
| 2 | 02/01/2001 | item A | 50.00 | 2 | 100.00 | North | Lille | element |
| 3 | 02/01/2001 | item B | 20.00 | 3 | 60.00 | West | Nantes | element |
| 4 | 02/01/2001 | item A | 50.00 | 2 | 100.00 | North | Lille | element |
| 5 | 02/01/2001 | item A | 50.00 | 5 | 250.00 | East | Strasbourg | element |
| 6 | 02/01/2001 | item A | 50.00 | 7 | 350.00 | North | Lens | element |
| 7 | 02/01/2001 | item B | 20.00 | 2 | 40.00 | West | Rennes | element |
| 8 | 05/01/2001 | item A | 50.00 | 5 | 250.00 | South | Marseille | element |
| 9 | 05/01/2001 | item B | 20.00 | 1 | 20.00 | North | Lens | element |
| 10 | 05/01/2001 | item C | 70.00 | 2 | 140.00 | East | Strasbourg | element |
| 11 | 05/01/2001 | item A | 50.00 | 4 | 200.00 | South | Nice | element |
| 12 | 05/01/2001 | item B | 20.00 | 1 | 20.00 | North | Lille | element |
| 13 | 06/01/2001 | Lens Week 1 | | | 1390.00 | North | Lens | town week |
| 14 | 06/01/2001 | Lille Week 1 | | | 3250.00 | North | Lille | town week |
| 15 | 06/01/2001 | Marseille Week 1 | | | 1260.00 | South | Marseille | town week |
| 16 | 06/01/2001 | Nantes Week 1 | | | 450.00 | West | Nantes | town week |
| 17 | 06/01/2001 | Nice Week 1 | | | 1400.00 | South | Nice | town week |
| 18 | 06/01/2001 | Rennes Week 1 | | | 40.00 | West | Rennes | town week |
| 19 | 06/01/2001 | Strasbourg Week 1 | | | 890.00 | East | Strasbourg | town week |
| 20 | 06/01/2001 | East Week 1 | | | 890.00 | East | | region week |
| 21 | 06/01/2001 | North Week 1 | | | 4640.00 | North | | region week |
| 22 | 06/01/2001 | South Week 1 | | | 2660.00 | South | | region week |
| 23 | 06/01/2001 | West Week 1 | | | 490.00 | West | | region week |
| 24 | 06/01/2001 | Total Week 1 | | | 8680.00 | | | week |

|    | A | B | C | D | E | F | G | I |
|----|---|---|---|---|---|---|---|---|
| 1 | Date | Item | Unit Price | Number | Total | Region | Town | Type |
| 13 | 06/01/2001 | Lens Week 1 | | | 1390.00 | North | Lens | town week |
| 14 | 06/01/2001 | Lille Week 1 | | | 3250.00 | North | Lille | town week |
| 15 | 06/01/2001 | Marseille Week 1 | | | 1260.00 | South | Marseille | town week |
| 16 | 06/01/2001 | Nantes Week 1 | | | 450.00 | West | Nantes | town week |
| 17 | 06/01/2001 | Nice Week 1 | | | 1400.00 | South | Nice | town week |
| 18 | 06/01/2001 | Rennes Week 1 | | | 40.00 | West | Rennes | town week |
| 19 | 06/01/2001 | Strasbourg Week 1 | | | 890.00 | East | Strasbourg | town week |
| 20 | 06/01/2001 | East Week 1 | | | 890.00 | East | | region week |
| 21 | 06/01/2001 | North Week 1 | | | 4640.00 | North | | region week |
| 22 | 06/01/2001 | South Week 1 | | | 2660.00 | South | | region week |
| 23 | 06/01/2001 | West Week 1 | | | 490.00 | West | | region week |
| 24 | 06/01/2001 | Total Week 1 | | | 8680.00 | | | week |

FIG. 19E

|    | A          | B                 | C          | D      | E       | F      | G          | I           |
|----|------------|-------------------|------------|--------|---------|--------|------------|-------------|
| 1  | Date       | Item              | Unit Price | Number | Total   | Region | Town       | Type        |
| 2  | 05/01/2001 | item C            | 70.00      | 2      | 140.00  | North  | Strasbourg | element     |
| 3  | 02/01/2001 | item A            | 50.00      | 5      | 250.00  | West   | Strasbourg | element     |
| 4  | 06/01/2001 | Strasbourg Week 1 |            |        | 890.00  | North  | Strasbourg | town week   |
| 5  | 06/01/2001 | Rennes Week 1     |            |        | 40.00   | East   | Rennes     | town week   |
| 6  | 02/01/2001 | item B            | 20.00      | 2      | 40.00   | North  | Rennes     | element     |
| 7  | 05/01/2001 | item A            | 50.00      | 4      | 200.00  | West   | Nice       | element     |
| 8  | 06/01/2001 | Nice Week 1       |            |        | 1400.00 | South  | Nice       | town week   |
| 9  | 02/01/2001 | item B            | 20.00      | 3      | 60.00   | North  | Nantes     | element     |
| 10 | 06/01/2001 | Nantes Week 1     |            |        | 450.00  | East   | Nantes     | town week   |
| 11 | 05/01/2001 | item A            | 50.00      | 5      | 250.00  | South  | Marseille  | element     |
| 12 | 06/01/2001 | Marseille Week 1  |            |        | 1260.00 | North  | Marseille  | town week   |
| 13 | 02/01/2001 | item B            | 20.00      | 1      | 20.00   | North  | Lille      | element     |
| 14 | 02/01/2001 | item A            | 50.00      | 2      | 100.00  | North  | Lille      | element     |
| 15 | 06/01/2001 | Lille Week 1      |            |        | 3250.00 | South  | Lille      | town week   |
| 16 | 02/01/2001 | item A            | 50.00      | 2      | 100.00  | West   | Lille      | element     |
| 17 | 06/01/2001 | Lens Week 1       |            |        | 1390.00 | South  | Lens       | town week   |
| 18 | 05/01/2001 | item B            | 20.00      | 1      | 20.00   | West   | Lens       | element     |
| 19 | 02/01/2001 | item A            | 50.00      | 7      | 350.00  | East   | Lens       | element     |
| 20 | 06/01/2001 | East Week         |            |        | 890.00  | East   |            | region week |
| 21 | 06/01/2001 | North Week        |            |        | 4640.00 | North  |            | region week |
| 22 | 06/01/2001 | South Week        |            |        | 2660.00 | South  |            | region week |
| 23 | 06/01/2001 | West Week         |            |        | 490.00  | West   |            | region week |
| 24 | 06/01/2001 | Total Week        |            |        | 8680.00 |        |            | week        |

FIG. 19F

|    | A          | B                 | C          | D      | E       | F      | G          | I           |
|----|------------|-------------------|------------|--------|---------|--------|------------|-------------|
| 1  | Date       | Item              | Unit Price | Number | Total   | Region | Town       | Type        |
| 2  | 06/01/2001 | Strasbourg Week 1 |            |        | 890.00  | East   | Strasbourg | town week   |
| 3  | 06/01/2001 | Nice Week 1       |            |        | 1400.00 | South  | Rennes     | town week   |
| 4  | 06/01/2001 | Rennes Week 1     |            |        | 40.00   | West   | Nice       | town week   |
| 5  | 06/01/2001 | Nantes Week 1     |            |        | 450.00  | West   | Nantes     | town week   |
| 6  | 06/01/2001 | Marseille Week 1  |            |        | 1260.00 | South  | Marseille  | town week   |
| 7  | 06/01/2001 | Lille Week 1      |            |        | 3250.00 | North  | Lille      | town week   |
| 8  | 02/01/2001 | item A            | 50.00      | 2      | 100.00  | North  | Lille      | element     |
| 9  | 02/01/2001 | item B            | 20.00      | 3      | 60.00   | West   | Nantes     | element     |
| 10 | 02/01/2001 | item A            | 50.00      | 2      | 100.00  | North  | Lille      | element     |
| 11 | 02/01/2001 | item A            | 50.00      | 5      | 250.00  | East   | Strasbourg | element     |
| 12 | 02/01/2001 | item A            | 50.00      | 7      | 350.00  | North  | Lens       | element     |
| 13 | 02/01/2001 | item B            | 20.00      | 2      | 40.00   | West   | Rennes     | element     |
| 14 | 05/01/2001 | item A            | 50.00      | 5      | 250.00  | South  | Marseille  | element     |
| 15 | 05/01/2001 | item B            | 20.00      | 1      | 20.00   | North  | Lens       | element     |
| 16 | 05/01/2001 | item C            | 70.00      | 2      | 140.00  | East   | Strasbourg | element     |
| 17 | 05/01/2001 | item A            | 50.00      | 4      | 200.00  | South  | Nice       | element     |
| 18 | 05/01/2001 | item B            | 20.00      | 1      | 20.00   | North  | Lille      | element     |
| 19 | 06/01/2001 | Lens Week 1       |            |        | 1390.00 | North  | Lens       | town week   |
| 20 | 06/01/2001 | East Week         |            |        | 890.00  | East   |            | region week |
| 21 | 06/01/2001 | North Week        |            |        | 4640.00 | North  |            | region week |
| 22 | 06/01/2001 | South Week        |            |        | 2660.00 | South  |            | region week |
| 23 | 06/01/2001 | West Week         |            |        | 490.00  | West   |            | region week |
| 24 | 06/01/2001 | Total Week        |            |        | 8680.00 |        |            | week        |

FIG. 19G

SYSTEM IN AN ELECTRONIC SPREADSHEET FOR DISPLAYING AND/OR HIDING RANGE OF CELLS

The present application is a Continuation application under 35 U.S.C. 120 of commonly assigned prior U.S. application Ser. No. 10/299,744, filed Nov. 19, 2002 now U.S. Pat. No. 7,546,523 in the names of Jean-Jacques Aureglia et al., now allowed.

RELATED APPLICATIONS

This application claims foreign priority benefits under 35 U.S.C. §119(a)-(d) of European Patent Application No. 02368032.5, filed Mar. 28, 2002.

In addition, this application is one of four related applications filed on an even date herewith and commonly assigned, the subject matters of which are incorporated herein by reference for all purposes, including the following:

U.S. patent application Ser. No. 10/299,741, entitled "SYSTEM AND METHOD IN AN ELECTRONIC SPREADSHEET FOR DISPLAYING AND/OR HIDING RANGE OF CELLS";

U.S. patent application Ser. No. 10/299,485, entitled "SYSTEM AND METHOD IN AN ELECTRONIC SPREADSHEET FOR DISPLAYING AND/OR HIDING RANGE OF CELL"; and U.S. patent application Ser. No. 10/299,274, entitled "SYSTEM AND METHOD IN AN ELECTRONIC SPREADSHEET FOR COPYING AND PASTING DISPLAYED ELEMENTS OF A RANGE OF CELLS".

FIELD OF THE INVENTION

The present invention relates to the field of information processing by digital computers, and more particularly to a method and system in an electronic multi-dimensional spreadsheet, for displaying and/or hiding elements of range of cells, like rows, or columns, or sheets, according to the content of cells within the elements.

BACKGROUND OF THE INVENTION

Before computers, numerical analyses, particularly financial ones, were usually prepared on an accountant's columnar pad or spreadsheet, with pencil and calculator in hand. By organising data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerised replacement for the traditional financial modelling tools: the accountant's columnar pad, pencil, and calculator. In some regards, spreadsheet programs are to those tools what word processors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, and a letter to each column. To reference a location at column A and row 1 (i.e., the upper-left hand corner), for example, the user types in "A1". In this manner, the spreadsheet defines an addressable storage location or "cell" at each intersection of a row with a column.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. In this fashion, cell references can serve as variables in an equation, thereby allowing precise mathematical relationships to be defined between cells. The structure and operation of a spreadsheet program, including advanced functions such as functions and macros, are documented in the technical, trade, and patent literature. For an overview, see e.g., Cobb, S., *Using Quattro Pro* 2, Borland-OsbornelMcGraw-MII, 1990; and LeBlond, G. and Cobb, D., *Using* 1-2-3, Que corp., 1985. The disclosures of each of the foregoing are hereby incorporated by reference.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what-if" scenarios. After a set of computational relationships has been entered into a worksheet, thanks to imbedded formulas and/or built-in functions for instance, the spread of information can be recalculated using different sets of assumptions, with the results of each recalculation appearing almost instantaneously. Performing this operation manually, with paper and pencil, would require recalculating every relationship in the model with each change made. Thus, electronic spreadsheet systems were invented to solve "what-if" problems, that is, changing an input and seeing what happens to an output.

As explained above, one essential value of an electronic spreadsheet is to organise data into columns and rows, and to automate tedious calculations. A typical, common, and valuable example of data organised into columns and rows is a table or a range of cells. Ranges of cells therefore are quite useful objects. A range of cells or a table can be defined and processed as a whole entity. For example it can be copied from one place to another within a single spreadsheet file or from one spreadsheet file to another spreadsheet file.

It is a common operation in electronic spreadsheet environments, to create and manipulate quite large tables comprising a large numbers of rows and columns (or even sheets when such tables are organised according to a three dimensional structure). With conventional spreadsheet tools, the user interface displays a certain number of rows and columns. However large tables can easily occupy a space spanning beyond the limits of the user interface. As a result large tables cannot be easily entirely visualized. This can be detrimental from a user friendliness standpoint and for a matter of efficiency:

When different important pieces of information spread within a given large table cannot be visualized at the same time, the user may waste a lot of time switching between different views. The user is often obliged to take notes before swapping between these views.

When key information is spread over a large table comprising a lot of intermediate information, the user may waste a lot of time scanning the data to identify the relevant information.

When the user needs to summarize or synthesize key information in a smaller table, he may waste a lot of time performing manual copy-paste operation to obtain the expected synthesis.

Some conventional tools are available in electronic spreadsheet environments, to address this need, but unfortunately these tools present important limitations as detailed hereunder.

A first tool that can be used for visualizing a large table, is the zoom function. The zoom function is similar to an optical zoom in the sense that it applies a user-controlled scaling factor to the display device. By adjusting the zooming ratio, more elements of information (i.e. more rows or columns) can be displayed. Unfortunately, this is achieved by reducing the size (width and height) of the displayed elements. This operation can be done until the elements become unreadable on the display device. It is like attempting to display the whole map of the city of New York while wishing to read the name of each street or avenue. Moreover, within a huge amount of data, the user must sort which data deserve the attention and must be discarded to understand/address a given topic.

A second tool that can be used for visualizing a whole table is the Outline function. The Outline function is based on dominant-subordinate relationships (or summary-detail relationships) between either rows or columns. The spreadsheet user first specifies relationships between either rows and columns, to associate a set of contiguous "subordinate" (or "detail") rows (respectively columns) with a contiguous "dominant" (or "summary") row (respectively column). Although this kind of relationship may be easily defined in some conventional situations (for instance twelve monthly records associated with a yearly record), there are many cases where relationships can not be established between contiguous rows. The condition imposing that the "dominant" or (summary) row or column is contiguous to its related "subordinate" (or detail) rows or columns constitutes an important constraint with severe consequences on the structure of the table. Once the above relationships are established between different subsets of rows and/or columns, the electronic spreadsheet user can:

either collapse a subset of "subordinate" (or detail) rows or columns, so that only the associated "dominant" (or summary) row or column is displayed, or expand a "dominant" (or summary) row or column, so that the associated hidden set of "subordinate" (or detail) rows or columns is displayed again.

With the Outline function, the spreadsheet user can decide for each subset of rows or columns participating to a given relationship, to hide or display the "subordinate" rows or columns. When multiple relationships of that kind are defined, the hide/display operation can be done for each defined relationship, or for all subsets at a given level. However, this operation is time consuming for large tables. The Outline function allows to nest different levels of relationship. However, the definition and manipulation of different levels of relationship is relatively complex. Furthermore, once an Outline structure has been defined, it is quite complex to change the Outline level of a given row because this operation requires the suppression and the recreation of the Outline structure. Another strong limitation of the Outline function comes from the fact that it does not relate to a given table (or range of cells), but to a worksheet within the spreadsheet. The Outline function does not address the case where multiple tables, not necessarily of the same nature, belong to the same worksheet.

The Outline approach is described in U.S. Pat. No. 5,255,356 filed by Microsoft Corporation. The embodiment of the invention, as described in the present specification, provides a new method and system, in electronic spreadsheet environments, for hiding and showing on a display device, cells of a worksheet.

The embodiment of the invention offers a user-friendly solution to the same requirements, while getting rid of the limitations previously identified. The present invention is based on a new feature, referred to as the Synthetic Focus Manager (SFM for short) which allows to easily define and control the display or hiding to the spreadsheet user, of elements (rows/columns/sheets) of a range of cells or table. The invention is based on the following principles:

Each object defined and manipulated by the SFM, is associated with a given range of cells, so that two or more different ranges of cells (or tables), even if they belong to the same worksheet, can be managed independently.

The SFM defines, under the control of the spreadsheet user, for each managed range of cells, a set of focus levels arranged as a list of ordered levels, so that a "display hierarchy" can be defined and customized by the spreadsheet user.

The SFM associates with each element (row/column/sheet) of a managed range of cells, a defined focus level. This association can be explicit ("position based levels" in the description of the embodiment) or can be implicit, depending either on cell attributes ("attribute based levels" in the description of the embodiment), or on cell content ("content based levels" in the description of the embodiment).

In the first case, each element of a managed range of cells, points to a given focus level.

In the second case, a focus level is associated either with a set of display attributes (e.g. font type, or font color, or background color, or border line, etc.), or with a cell content criteria (e.g. a numerical value being larger than a predefined threshold). Then each element (row/column/sheet) of a managed range of cells is associated either with the focus level matching the display attribute of the heading cell of the element or with the focus level matching the content criteria of the cell within the element with a predefined relative offset.

The SFM defines a current display focus level.

The SFM, upon a user action, hides all the range of cells elements (rows/columns/sheets) having a focus level lower than the current display focus level.

All the above functions are accessible through a set of dedicated user interfaces that can be easily launched through conventional means like pushbuttons, keyboard short keys, menu or sub-menu entries.

In addition to the above function, the present invention offers the possibility to copy and paste the visible part of a range of cells managed by the SFM. In conventional spreadsheet environments, this operation cannot be done because any hidden row or column within a given range of cells is still treated like a visible element by the copy-and-paste method. With the "Copy visible part" function, only a Copy/Paste by Value is performed. According to the present invention, the SFM is aware of the display focus level that is currently selected. Therefore, the SFM can determine the elements that the spreadsheet user wishes to copy-and-paste onto a given destination range of cells. Specific attention is given to the way the paste operation is performed to keep as much information as possible, including formula defined relationships, while avoiding building a range of cells with unresolved references.

SUMMARY OF THE INVENTION

The present invention is directed to a method, system and program for displaying and/or hiding, in an electronic multi-dimensional spreadsheet on a user interface, elements of a range of cells, a range of cells comprising one or a plurality of contiguous elements aligned along a given spreadsheet dimension, an element of a range of cells comprising one or a plurality of cells along one or a plurality of spreadsheet dimensions. According to one aspect of the present invention, in an electronic multidimensional spreadsheet comprising a plurality of cells identified by a cell address along each dimension of the spreadsheet, a method for displaying and/or hiding on a user interface comprises: (A) detecting a command for hiding at least one element in a selected range of cells, the command comprising means for identifying the selected range of cells and means for identifying a display focus level selected among a plurality of ordered display focus levels defined for the selected range of cells; (B) identifying the selected range of cells comprising the element to hide; (C) identifying the selected display focus level; (D) identifying a table associated with the selected range of cells, the table associating each defined display focus level with at least one cell content criteria to apply to the content of the at least one cell; and (E) selectively displaying the element on the user interface based on the relationship of the selected display focus level with the display focus level associated with the element.

According to a second aspect of the present invention, a computer program product for use with a computer system capable of displaying an electronic multidimensional spreadsheet with a user interface, the computer program product comprising a computer useable medium having embodied therein program code comprises: (A) program code for detecting a command for hiding at least one element in a selected range of cells, the command comprising means for identifying the selected range of cells and means for identifying a display focus level selected among a plurality of ordered display focus levels defined for the selected range of cells; (B) program code for identifying the selected range of cells comprising the element; (C) program code for identifying the selected display focus level; (D) program code for identifying a table associated with the selected range of cells, the table associating each defined display focus level with at least one cell content criteria to apply to the content of at least one cell; and (E) program code for selectively displaying the element on the user interface based on the relationship of the selected display focus level with the display focus level associated with the element.

According to a third aspect of the present invention, an apparatus for use with a computer system capable of displaying an electronic multidimensional spreadsheet on a user interface, the apparatus comprises: (A) program logic for detecting a command for hiding at least one element in a selected range of cells, the command comprising means for identifying the selected range of cells and means for identifying a display focus level selected among a plurality of ordered display focus levels defined for the selected range of cells; (B) program logic for identifying the selected range of cells comprising the element; (C) program logic for identifying the selected display focus level; (D) program logic for identifying a table associated with the selected range of cells, the table associating each defined display focus level with at least one cell content criteria to apply to the content of at least one cell; and (E) program logic for selectively displaying the element on the user interface based on the relationship of the selected display focus level with the display focus level associated with the element.

The foregoing, together with other objects, features, and advantages of this invention can be better appreciated with reference to the following specification, claims and drawings.

BRIEF DESCRIPTION OF THE DRAWINGS

The above and further advantages of the invention may be better understood by referring to the following description in conjunction with the accompanying drawings in which:

FIGS. 19A, 19B, 19C, 19D, 19E, 19F and 19G illustrates the limitations of the Outline facility available in conventional spreadsheet environments.

DETAILED DESCRIPTION

System Hardware

Figure 1A:
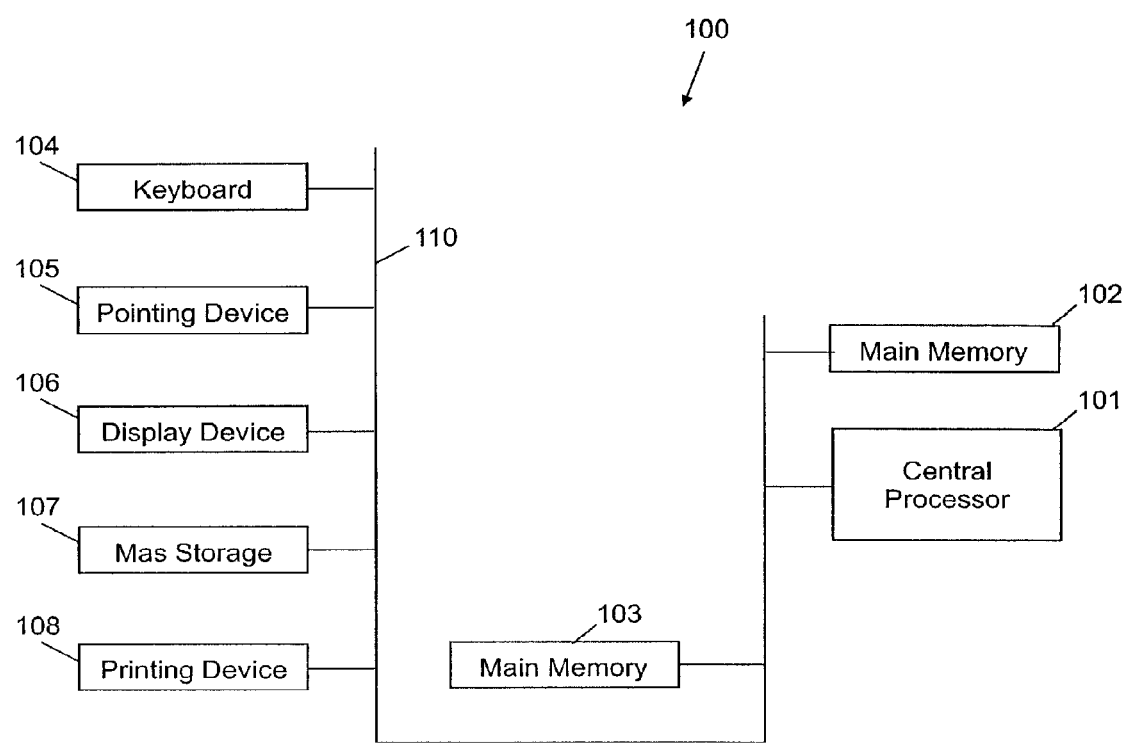
FIG. 1A is a schematic view of a computer system in which the present invention may be embodied.

As shown in FIG. 1A, the present invention may be embodied on a computer system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In an embodiment, the computer system 100 includes an IBM-compatible personal computer, which is available from several vendors (including International Business Machine—IBM Corporation of Armonk, N.Y.).

Figure 1B:
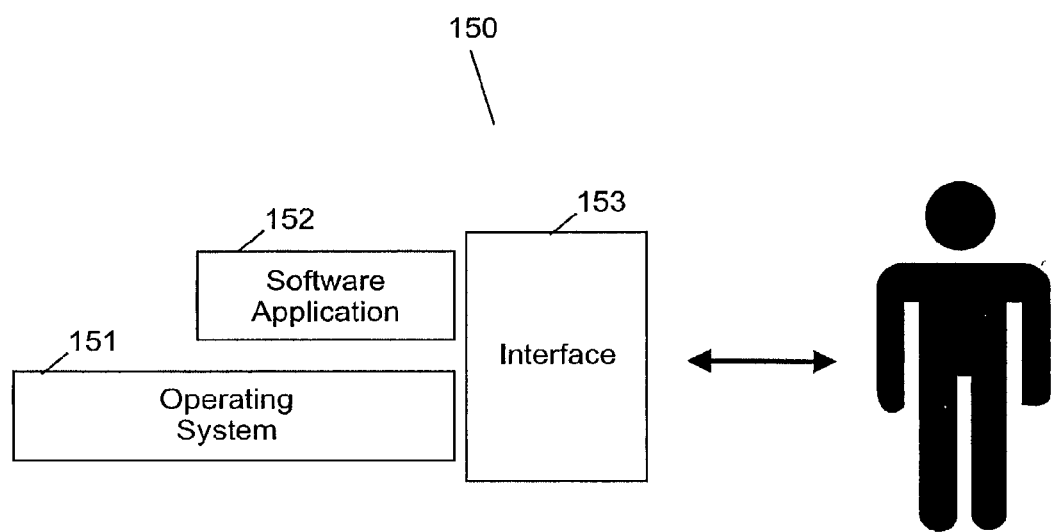
FIG. 1B is a schematic view of a software system including an operating system, an application software, and a user interface for carrying out the present invention.

Illustrated in FIG. 1B, a computer software system 150 is provided for directing the operation of the computer system 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the system 100. The system 100 receives user commands and data through user interface 153; these inputs may then be acted upon by the system 100 in accordance with instructions from operating module 151 and/or application module 152. The interface 153, which is preferably a graphical user interface (GUI), also serves to display results, whereupon the user may supply additional inputs or terminate the session. In an embodiment, operating system 151 and interface 153 are Microsoft Win95, available from Microsoft Corporation of Redmond, Wash. Application module 152, on the other hand, includes a spreadsheet notebook of the present invention as described in further detail herein below.

Interface

A. Introduction

The following description will focus on the presently embodiments of the present invention, which are embodied in spreadsheet applications operative in the Microsoft Win95 environment. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, NextStep, and the like. Therefore, the description of the exemplary embodiments which follows is for purposes of illustration and not limitation.

Figure 1C:
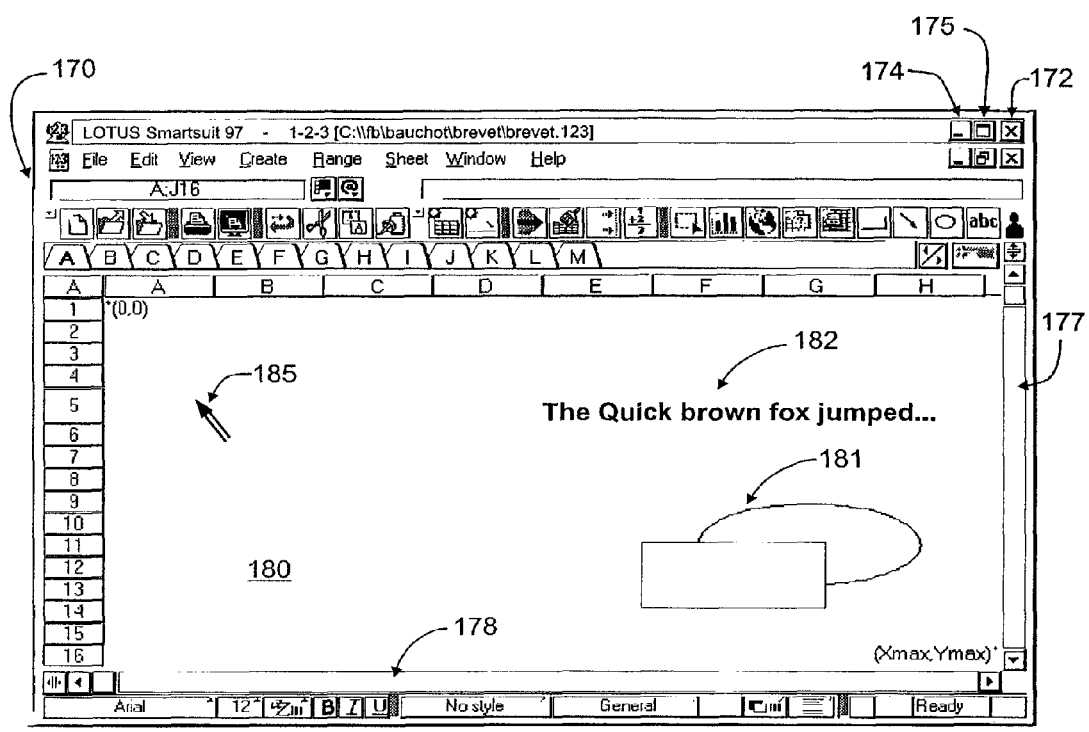
FIG. 1C illustrates the basic architecture and functionality of a graphical user interface in which the present invention may be embodied.

Referring now to FIG. 1C, the system 100 includes a windowing interface or workspace 160. Window 160 is a rectangular, graphical user interface (GUI) for display on screen 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace for the user to interact with data objects which reside within the computer system 100.

Windowing interface 160 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 160 may be closed, re-sized, or scrolled by "clicking" (selecting) screen components 172, 174/5, and 177/8, respectively.

In an embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons."

Programming techniques and operations for mouse devices are well documented in the programming and hardware literature; see e.g., *Microsoft Mouse Programmer's Reference*, Microsoft Press, 1989. The general construction and operation of a GUI event-driven system, such as Windows, is also known in the art: see, e.g., Petzold, C., *Programming Windows*, Second Edition, Microsoft Press, 1990. The disclosures of each are hereby incorporated by reference.

B. Interface

Figure 2A:
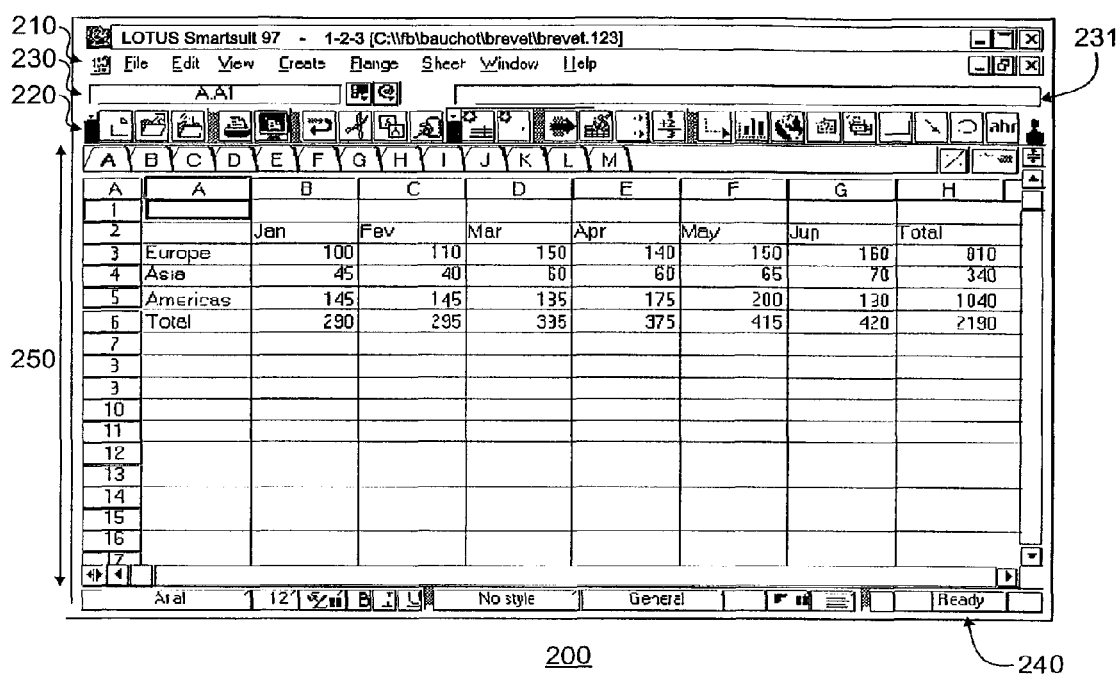
FIG. 2A shows a spreadsheet notebook interface according to the embodiment of the present invention.

As shown in FIG. 2A, a spreadsheet notebook interface of the present invention will now be described The spreadsheet notebook or workbook of the present invention includes a notebook workspace 200 for receiving, processing, and presenting information, including alphanumeric as well as graphic information. Notebook workspace 200 includes a menu bar 210, a toolbar 220, a current cell indicator 230, an input line 231, a status line 240, and a notebook window 250. The menu bar 210 displays and invokes, in response to user inputs, a main level of user commands. Menu 210 also invokes additional pull down menus, as is known in windowing applications. Input line 231 accepts user commands and information for the entry and editing of cell contents, which may include data, formulas, macros, and the like. Indicator 230 displays an address for the current cursor (i.e., active cell) position, or the address or name of a selected named range (i.e. active selection). At the status line 240, system 100 displays information about the current state of the workbook; for example, a "READY" indicator means that the system is ready for the user to select another task to be performed.

Figure 2B:
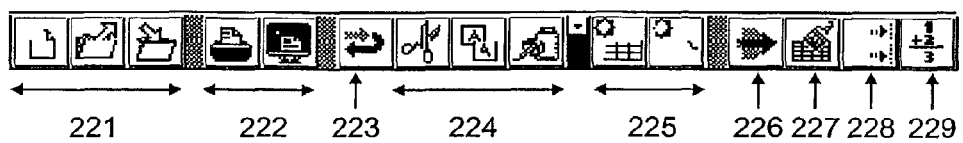
FIG. 2B shows the toolbar component of the notebook interface shown in FIG. 2A.

The toolbar 220, shown in further detail in FIG. 2B, comprises a row or palette of tools which provide a quick way for the user to choose commonly-used menu commands or properties. In an exemplary embodiment, toolbar 220 includes file manipulation buttons 221, printing buttons 222, an undo button 223, cut, copy, and paste buttons 224, information pop-up window buttons tool 225, a named range selection button 226, a style copy button 227, a column re-sizing button 228, and a sum button 229. The functions of these buttons are suggested by their names. For instance, buttons 224 cut, copy and paste data and objects to and from Windows' clipboard. The same actions are also available as corresponding commands in the Edit menu (available from menu bar 210).

The notebook, which provides an interface for entering and displaying information of interest, includes a plurality of spreadsheet pages. Each page may include conventional windowing features and operations, such as moving, re-sizing, and deleting. In an embodiment, the notebook includes 256 spreadsheet pages, all of which are saved as a single disk file on the mass storage 107. Workspace 200 may display one or more notebooks, each sized and positioned (e.g., tiled, overlapping, and the like) according to user-specified constraints.

Each spreadsheet page of a notebook includes a 2-D spread. Page A from the notebook 200, for example, includes a grid in row and column format, such as row 3 and column F. At each row/column intersection, a box or cell (e.g., cell C4) is provided for entering, processing, and displaying information in a conventional manner. Each cell is addressable, with a selector being provided for indicating a currently active one (i.e., the cell that is currently selected).

Figure 2C:
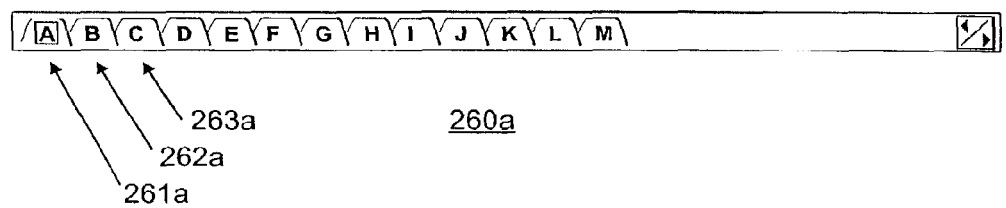
FIGS. 2C and 2D show page identifiers for rapidly accessing and manipulating individual pages of the notebook interface shown in FIG. 2A.
Figure 2D:
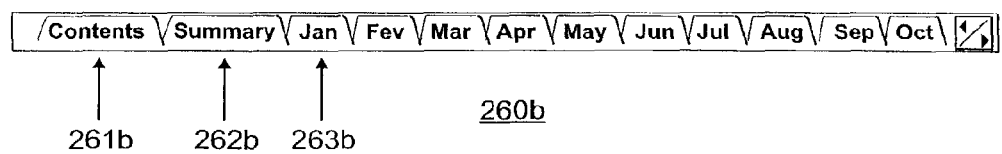

As shown in FIGS. 2C-D, individual notebook pages are identified by page identifiers 260, preferably located along one edge of a notebook. In an embodiment, each page identifier is in the form of a tab member (e.g., members 261*a*, 262*a*, 263*a*) situated along a top edge of the notebook. Each tab member may include representative indicia, such as textual or graphic labels, including user selected titles representing the contents of a corresponding page. In FIG. 2C, the tab members 260 are set to their respective default names. For example, the first three tab members (members 261*a*, 262*a*, 263*a*) are respectively set to A, B, and C. Tab members are typically given descriptive names provided by the user, however. As shown in FIG. 2D, for example, the first three tab members have now been set to "Contents" (tab member 261*b*), "Summary" (tab member 262*b*), and "Jan" (tab member 263*b*). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers serve aid in the entry of spreadsheet named range addresses. For example, when entering a formula referring to a named range of cells on another page, the user may simply use the descriptive page name in the named range address, thus making it easier for the user to understand the relationship of the cell(s) or information being referenced.

A general description of the features and operation of the spreadsheet notebook interface may be found in Quattro Pro for Windows (*Getting Started, User's Guide and Building Spreadsheet Applications*), available from Borland International.

Synthetic Focus Management
A. Introduction
The Concept of Synthetic Focus Management As explained above, one essential value of an electronic spreadsheet is to organise data into columns and rows, and to automate tedious calculations. A typical, common, and valuable example of data organised into columns and rows is a table or a range of cells. Ranges of cells therefore are quite useful objects. A range of cells or a table can be defined and processed as a whole entity. For example it can be copied from one place to another within a single spreadsheet file or from one spreadsheet file to another spreadsheet file.

It is a common operation in electronic spreadsheet environments, to create and manipulate quite large tables comprising a large numbers of rows and columns (or even sheets when such tables are organised according to a three dimensional structure). With conventional spreadsheet tools, the user interface displays a certain number of rows and columns. However, large tables can easily occupy a space spanning beyond the limits of the user interface. As a result, large tables cannot be easily entirely visualized. This can be detrimental from a user friendliness standpoint and for a matter of efficiency:

When different important pieces of information spread within a given large table cannot be visualized at the same time, the user may waste a lot of time switching between different views. The user is often obliged to take notes before swapping between these views.

When key information is spread over a large table comprising a lot of intermediate information, the user may waste a lot of time scanning the data to identify the relevant information.

When the user needs to summarize or synthesize key information in a smaller table, he may waste a lot of time performing manual copy-paste operation to obtain the expected synthesis.

Some conventional tools are available in electronic spreadsheet environments, to address this need, but unfortunately these tools present important limitations as detailed hereunder.

A first tool that can be used for visualizing a large table, is the zoom function. The zoom function is similar to an optical zoom in the sense that it applies a user-controlled scaling factor to the display device. By adjusting the zooming ratio, more elements of information (i.e. more rows or columns) can be displayed. Unfortunately, this is achieved by reducing the size (width and height) of the displayed elements. This operation can be done until the elements become unreadable on the display device. It is like attempting to display the whole map of the city of New York while wishing to read the name of each street or avenue. Moreover, within a huge amount of data, the user must sort which data deserve the attention and must be discarded to understand/address a given topic.

A second tool that can be used for visualizing a whole table is the Outline function. The Outline function is based on dominant-subordinate relationships (or summary-detail relationships) between either rows or columns. The spreadsheet user first specifies relationships between either rows and columns, to associate a set of contiguous "subordinate" (or "detail") rows (respectively columns) with a contiguous "dominant" (or "summary") row (respectively column). Although this kind of relationship may be easily defined in some conventional situations (for instance twelve monthly records associated with a yearly record), there are many cases where relationships can not be established between contiguous rows. The condition imposing that the "dominant" or "summary") row or column is contiguous to its related "subordinate" (or detail) rows or columns constitutes an important constraint with severe consequences on the structure of the table.

The first two limitations of the Outline function are the following:

The first limitation is the necessity to build a table with a structure defining contiguous "detail" and "summary" rows.

The second limitation comes from the fact that key functions are disabled in the sections of the spreadsheet where Outlines are defined.

Once the above relationships are established between different subsets of rows and/or columns, the electronic spreadsheet user has the possibility:

either to collapse a subset of "subordinate" (or detail) rows or columns, so that only the associated "dominant" (or summary) row or column is displayed, or to expand a "dominant" (or summary) row or column, so that the associated hidden set of "subordinate" (or detail) rows or columns is displayed again.

With the Outline function, the spreadsheet user can decide for each subset of rows or columns participating to a given relationship, to hide or display the "subordinate" rows or columns. When multiple relationships of that kind are defined, the hide/display operation can be done for each defined relationship, or for all subsets at a given level. However, this operation is time consuming for large tables. The Outline function allows to nest different levels of relationship. However, the definition and manipulation of the different levels of relationship is relatively complex. Furthermore, once an Outline structure has been defined, it is quite complex to change the Outline level of a given row because this operation requires the suppression and the recreation of the Outline structure.

The next limitations of the Outline function are the following:

The third limitation comes from the complexity to change the Outline level of a given row.

The fourth limitation comes from the fact it is impossible to change the order of the hierarchy of the different Outline levels. Changing this hierarchy, implies the suppression and recreation of the Outline structure according to a different hierarchy scheme.

Another strong limitation comes from the fact that the Outline function does not relate to a given table (or range of cells), but to a worksheet within the spreadsheet. The Outline function does not address the case where multiple tables, not necessarily of the same nature, belong to the same worksheet.

The fifth limitation comes from the fact that the Outline function is related to a sheet and not to a specific table. It is impossible, on a given sheet, to have two different tables with overlapping lines and/or columns.

The limitations mentioned above will be further explained, using the specific example of a Sales Journal, as described hereunder and illustrated in FIGS. 19A, 19B, 19C, 19D, 19E, 19F and 19G. FIG. 19A shows the first few lines of the Sales Journal. The Sales Journal comprises 8 fields, "Date" 1901, "Item" 1902, "Unit Price" 1903, "Number" 1904, "Total" 1905, "Region" 1906, "Town" 1907 and "Type" 1908. Each sale is recorded on a line of the journal such as 1909. At the end of each week, a summary 1910 of the sales performed during the week is included in the journal, as illustrated in FIG. 19B. This summary comprises several lines with the sales by town 1911 and by region 1912, and a total 1913. At the end of each month, a summary 1914 of the sales performed during the month is included in the journal, as illustrated in FIG. 19C. The summary comprises several lines with the sales by town 1915 and by region 1916, and a total 1917.

In the example described above and illustrated in FIGS. 19A, 19B and 19C, and now referring to the first limitation, it appears clearly that it not possible to establish details-summary relationships between contiguous rows. For example, the weekly summary for the town "Lille" 1911 is not contiguous to the list of sales in "Lille" for the given week. Sales are entered in a sequential order (journal) wherever the sale is performed.

For instance also, it is not possible to define a details-summary relationship between the weekly summary 1910 and the monthly summary 1914. Although it seems logical that months are made of weeks, we all know that month limits seldom match full weeks limits and that months seldom comprise an integer number of weeks. Bypassing this limitation implies the definition of details-summary relationships where they do not exist. This forces the spreadsheet user to imagine and implement relationships against the logic of the table. This also pollutes the presentation and impacts the readability. In our example, the user can, for example, define a details-summary relationship between all the sales records (such as 1909) of a given week and the first record of the following weekly summary 1918. This is illustrated inn FIGS. 19D and 19E, on a shortened example of the journal table. FIG. 19D shows a piece of the journal table with an Outline defined and expanded. FIG. 19E shows the same piece of the journal table with the same Outline defined and, this time, collapsed. In the margin 1919, the Outline levels are displayed, using indented dots Another consequence of the same constraint (details-summary relationships must be defined between contiguous rows) is that some functions (such as the Sort function) are either disabled or cannot work as expected because the spreadsheet software tries to protect the integrity of the defined Outline (of the contiguous details-summary relationship that has been established). This is the second limitation of the Outline function. In our example, a sort operation is performed on the table, using column G 1907 as sort field. Because one or more Outline sections are defined, unexpected results are provided. For example, in the LOTUS 123 spreadsheet software, the sort operation sorts all table records and keeps an Outline defined on the same rows, as before. The grouping of the Outline, in this case, has lost all meaning. FIG. 19F shows the result of a descending sort operation on column G 1907, using the LOTUS 123 spreadsheet software. The resulting table, sorted according to expectations comprises an Outline, defined on the same rows as before the sort operation, and which has lost all meaning. A different example can be considered using the MicroSoft Excel software. The descending sort operation excludes the Outline details rows from the sort. The sort is only executed on the higher Outline level rows. In our example, the descending sort operation on column G 1907, and performed with MicroSoft Excel software, results in the table as illustrated on FIG. 19G. This behavior protects the Outline setting when a real details-summary relationship exists. Unpredictable results can however be obtained when the details-summary relationship does not exist logically but has been defined for the sole purpose of hiding/displaying rows and/or columns. This is the case in our example, where details rows have been moved in the middle of the summary section, for the sole purpose of protecting the details-summary relationship with the "Lens" weekly summary row. This does not make any sense when the relationship has been artificially defined for the sole purpose of hiding/displaying rows and/or columns. In this particular example, it also clearly appears that the details rows are not sorted. The different behaviors of two of the major spreadsheet softwares, show, just by themselves, the limitations of the Outline approach, which relies on the much too restrictive logic of the details-summary relationship.

The third and fourth limitations of the Outline function both come from the fact that a complete sheet structure is defined when the Outline function is used. Therefore, making changes to the Outline definition will, most of the time, result in changing the structure of the Outline, which will, in turn, often require the reset and rebuilding of the Outline structure. Making such changes to the structure often requires the definition of further details-summary relationships with the danger of creating artificial relationships only for display purposes. This is the case when the user wants to change the Outline level of one or several rows. In our example, and now referring to FIG. 19D, when the user wants to display, among the detailed sales rows, only the rows recording sales performed in "Lille", he/she will have to group or demote line 1920, summarized by line 1921, and group or demote rows 1922 to 1923, summarized by row 1924. If the user now wants to display, among the detailed sales rows, only the rows recording sales performed in "Nantes", he/she will have to group or demote row 1925, summarized by row 1920, and group or demote rows 1921 to 1924, summarized by row 1926. This shows that if the user wants to change the Outline structure, then he has to recreate another Outline structure. It is also interesting to note that just the change of the display priority order, in our example from "Lille" to "Nantes", obliges the user to completely rebuild the Outline structure.

The need to easily change the hierarchy of the Outline structure becomes obvious when we consider in our example the following situation. A French sales manager is interested in the following display hierarchy:

first yearly total sales, and then
monthly total sales, and then
monthly sales by region, or
first yearly total sales, and then
yearly total sales by region, and then
yearly total sales by town, and then
monthly total sales by town.

The French sales manager may even be interested in having several hierarchies, hence the need to easily change the hierarchy structure. Each regional sales manager may be interested in a display hierarchy showing yearly total sales, and then yearly total sales by region, and then monthly total sales by region, and then monthly sales by town only in his own region. This shows again the need for different display hierarchies because different users may have different display needs.

The fifth limitation of the Outline function is that the Outline structure is related to the sheet rather than to a given table. This has two consequences:

the first one is that two different tables, partially sharing the same row and/or columns, cannot have different Outline structures;

the second one is that a table, when copied from one sheet to another, will not keep its Outline structure.

Further limits of the Outline function come from the manual operations required to define the Outline structure, while tables often comprise structural information. This is illustrated on FIGS. 19A, 19B and 19C, where sales records such as 1909 are recorded on a white background while summary records such as 1911, 1912, 1913, 1915, 1916 or 1917 are entered on a grey background. This implicit structural information can be used to automate the building of a display hierarchy. Rather than attributes information, contents information can also be used to automate the building of a display hierarchy. This limitation will be referred to as the sixth limitation.

Finally, the selective focus placed on a given table to display only the most useful information can also be used to exchange information with other people that either do not need the whole information or are not allowed to access the whole information (e.g. for confidentiality reasons). To this extent, the need to copy only the displayed information appears. More specifically, the hidden information must not be copied like it currently is in most spreadsheet software applications. All formulas that can be resolved with the information actually copied must be kept, unlike the "copy visible" function of the MicroSoft Excel spreadsheet software. This last identified limitation of the Outline function will be referred to as the seventh limitation.

The embodiment of the invention offers a user-friendly solution to these requirements, while getting rid of the limitations previously identified. The solution is based on a new feature called Synthetic Focus Manager (SFM for short). This features is defined for displaying or hiding elements (rows/columns/sheets) of a range of cells (or table) on a user interface window. The invention is based on the following principles:

Every object defined and manipulated by the SFM is associated with a given range of cells, so that two or more different ranges of cells (or tables)—even belonging to the same worksheet—can be managed independently. This approach eliminates the fifth limitation identified in the previous paragraphs.

The SFM defines, under the control of the spreadsheet user, for each managed range of cells, a set of focus levels. These focus levels are arranged as a list of ordered levels, so that a "display hierarchy" can be defined and customized by the spreadsheet user. The capability to define and change the display hierarchy eliminates the fourth limitation identified in the previous paragraph.

The SFM associates a defined focus level with each element (row/column/sheet) of a managed range of cells. This association can be explicit (referred to as "position based levels" type in the rest of the document) or implicit, depending either on cell attributes (referred to as "attribute based levels" type in the rest of the document), or on cell content (referred to as "content based levels" type in the rest of the document).

The capability to associate focus levels with elements eliminates the first and third limitation identified in the previous paragraphs. The second limitation also disappears with this approach since a focus level is now assigned to a specific element (row/column/sheet). The capability to use implicit focus level assignment eliminates the sixth limitation of the Outline function.

In the first case, each element of a managed range of cells points to a given focus level.

In the second case, a focus level is associated either with a set of display attributes (e.g. font type, or font color, or background color, or border line, etc.), or with a cell content criteria (e.g. a numerical value being larger than a predefined threshold). Then each element (row/column/sheet) of a managed range of cells is associated either with the focus level matching the display attribute of the heading cell of the element or with the focus level matching the content criteria of the cell within the element with a predefined relative offset.

The SFM defines a current display focus level.

The SFM, upon a user trigger, hides all elements (rows/columns/sheets) of the range of cells when the associated focus level is less than the current display focus level.

All the above facilities are accessible through a set of dedicated user interfaces that can be easily launched through conventional means like pushbuttons, keyboard short keys, menu or sub-menu entries.

In addition to the above facility, the proposed solution offers the possibility to copy and paste the visible part of a range of cells managed by the SFM. In conventional spreadsheet environments, this operation cannot be done because any hidden row or column within a given range of cells, is treated as a visible element by the copy-and-paste method. With the conventional "Copy visible part" function, only a Copy/Paste by value is performed. With the proposed solution, the SFM is aware of the currently selected display focus level and thus, can determine the elements that the spreadsheet user wishes to copy-and-paste onto a given destination range of cells. Specific attention is given to the way the paste operation is performed to keep as much information as possible, including formula defined relationships, while avoiding to build a range of cells with unresolved references. This new capability eliminates the seventh limitation identified in the previous paragraphs.

C. Tables Used for Synthetic Focus Management

As introduced in the previous section, the embodiment of the present invention relies on different types of objects for managing the display of elements of a range of cells like rows, columns and sheets. These objects are recorded in different repositories, so that they can be accessed and updated by the different methods which are part of the embodiment of the present invention. Such repositories are referred to as tables:

the Focus Manager Table or FMT for short,
the Horizontal Level Range Table or HLRange for short,
the Vertical Level Range Table or VLRange for short,
the Horizontal Range Table or HRange for short,
the Vertical Range Table or VRange for short.

The FMT, HLRange, VLRange, HRange and VRange tables are saved as part of the spreadsheet disk file on the mass storage 107, so that they can themselves be considered as ranges of cells.

C1. FMT Table

Figure 13:
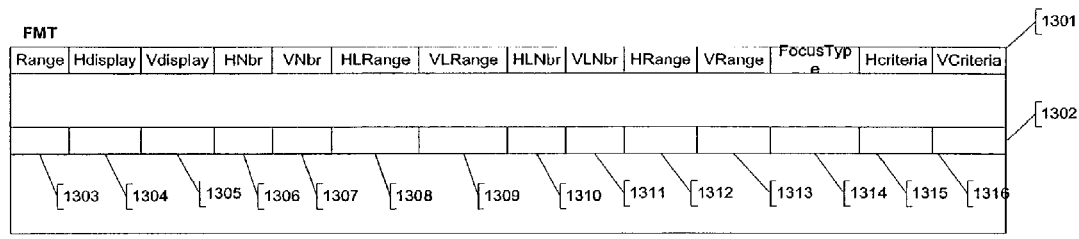
FIG. 13 illustrates the structure of the Focus Manager Table (FMT), of the Horizontal Level Range Table (HLRange), of the Vertical Level Range Table (VLRange), of the Horizontal Range Table (HRange), and of a Vertical Range Table (VRange), according to the embodiment of the present invention.
Figure 13:
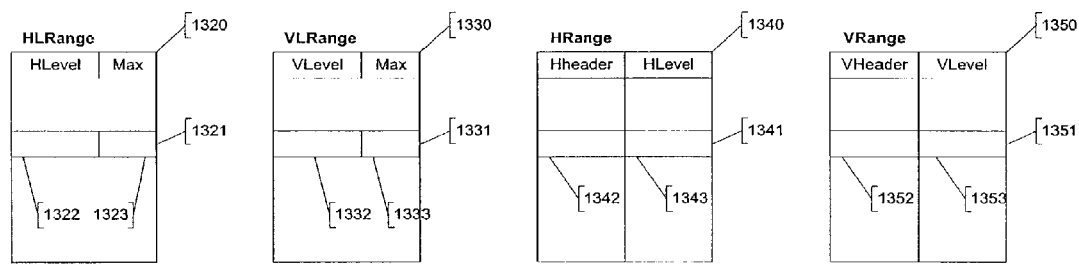

Referring now to FIG. 13, the FMT Table 1301 corresponds to a logical simple structure comprising several records 1302, each of them corresponding to a focus managed range of cells, according to the present invention. Each record includes fourteen fields:

The "Range" 1303 field is used to record the name of the focus managed range of cells described by the current record 1302.

The "HDisplay"1304 field is used to record the current Horizontal Display Level associated with the focus managed range of cells described by the current record 1302.

The "VDisplay"1305 field is used to record the current Vertical Display Level associated with the focus managed range of cells described by the current record 1302.

The "HNbr"1306 field is used to record the current number of horizontal levels defined for the focus managed range of cells described by the current record 1302. It corresponds to the number of rows of the HLRange table pointed by the "HLRange" field 1308.

The "VNbr" 1307 field is used to record the current number of vertical levels defined for the focus managed range of cells described by the current record 1302. It corresponds to the number of rows of the VLRange table pointed by the "VLRange" field 1309.

The "HLRange" 1308 field is used to record the name of the range of cells comprising the HLRange table associated with the focus managed range of cells described by the current record 1302.

The "VLRange"1309 field is used to record the name of the range of cells comprising the VLRange table associated with the focus managed range of cells described by the current record 1302.

The "HLNbr"1310 field is used to record the current number of horizontal level settings defined for the focus managed range of cells described by the current record 1302. It corresponds to the number of rows of the HRange table pointed by the "HRange" field 1312.

The "VLNbr" 1311 field is used to record the current number of vertical level settings defined for the focus managed range of cells described by the current record 1302. It corresponds to the number of rows of the VRange table pointed by the "VRange" field 1313.

The "HRange" 1312 field is used to record the name of the range of cells comprising the HRange table associated with the focus managed range of cells described by the current record 1302.

The "VRange"1313 field is used to record the name of the range of cells comprising the VRange table associated with the focus managed range of cells described by the current record 1302.

The "FocusType"1314 field is used to record the current type of the levels associated with the focus managed range of cells described by the current record 1302. It can take the values ADDRESS, ATTRIBUTE, and CONTENT, corresponding respectively to the types: "position based levels", "attribute based levels", and "content based levels".

The "HCriteria"1315 field is used to record a pointer to the header of the Horizontal Criteria column associated with the focus managed range of cells described by the current record 1302. This column comprises the cells which content is used to determine whether an horizontal element (a row) must be displayed or hidden when the "content based levels" are used.

The "VCriteria"1316 field is used to record a pointer to the header of the Vertical Criteria row associated with the focus managed range of cells described by the current record 1302. This row comprises the cells which content is used to determine if a vertical element (a column) must be displayed or hidden when the "content based levels" are used.

C2. HLRange Table

Referring to FIG. 13, the HLRange Table 1320 corresponds to a logical simple structure comprising several records 1321, each of them corresponding to a horizontal level defined for a focus managed range of cells, according to the present invention. Each record includes two fields:

The "HLevel" 1322 field is used to record the name of the horizontal level described by the current record 1321.

The "Max"1323 field is used to record the maximum value taken by the horizontal criteria, for the horizontal level described by the current record 1321.

C3. VLRange Table

Referring to FIG. 13, the VLRange Table 1330 corresponds to a logical simple structure comprising several records 1331, each of them corresponding to a vertical level defined for a focus managed range of cells, according to the present invention. Each record includes two fields:

The "VLevel" 1332 field is used to record the name of the vertical level described by the current record 1331.

The "Max" 1333 field is used to record the maximum value taken by the vertical criteria, for the vertical level described by the current record 1331.

C4. HRange Table

Referring to FIG. 13, the HRange Table 1340 corresponds to a logical simple structure comprising several records 1341, each of them corresponding to a horizontal level setting defined for a focus managed range of cells, according to the present invention. An horizontal level setting establishes an association between an horizontal element (a row identified by its header) and an horizontal level (identified by its name). Each record includes two fields:

The "HHeader"1342 field is used to point the horizontal header of a focus managed range of cells belonging to the horizontal level setting described by the current record 1341.

The "HLevel"1343 field is used to record the name of the horizontal level belonging to the horizontal level setting described by the current record 1341.

C5. VRange Table

Referring to FIG. 13, the VRange Table 1350 corresponds to a logical simple structure comprising several records 1351, each of them corresponding to a vertical level setting defined for a focus managed range of cells, according to the present invention. A vertical level setting establishes an association between a vertical element (a column identified by its header) and a vertical level (identified by its name). Each record includes two fields:

The "VHeader"1352 field is used to point the vertical header of a focus managed range of cells belonging to the vertical level setting described by the current record 1351.

The "VLevel"1353 field is used to record the name of the vertical level belonging to the vertical level setting described by the current record 1351.

D. Scenario

In contrast with just-described conventional tools, the embodiment of the present invention provides a more powerful, user-friendly and interactive approach for hiding and/or displaying elements of a range of cells, comprising for instance one or a plurality of rows, or columns, or sheets, when this range of cells is managed by a synthetic focus manager.

In an embodiment, the present invention is used according to a scenario comprising a plurality of operations:

1. First Operation: Synthetic Focus Manager

The first operation occurs when the spreadsheet user decides, based on some criteria not detailed here, to use the Synthetic Focus Manager to control how to hide or display the elements of a range of cells, like rows, columns and sheets. In an embodiment of the present invention, this operation comprises the following three steps:

a. Range of Cells Selection

First the spreadsheet user selects the relevant range of cells by using conventional means such as (but not limited to) the pointing device 105 or the keyboard 104. Without loosing any generality nor departing from the spirit of the present invention, it is assumed that the selected range of cells corresponds to a two dimensional (2D) structure comprised within a unique sheet.

b. Synthetic Focus Manager Invocation

Second the spreadsheet user invokes an original specific command called "SyntheticFocusMgr" thanks to conventional means available in spreadsheet environment, such as but not limited to the pointing device 105 or the keyboard 104. Then different cases are considered, depending on the relative position of the currently selected range of cells with respect to the various ranges of cells which have already been managed by the Synthetic Focus Manager, and which will be referred to as "Focus Managed Ranges of Cells" or FMROC for short.

b.1 If the currently selected range of cells is disjoint from any existing FMROC, then it becomes candidate for being a new FMROC. In this case an additional test is performed to check whether or not the currently selected range of cells comprises at least two rows and two columns.

If it is not the case, then a warning message is displayed on the display device 106 to the spreadsheet user through conventional means such as pop-up windows, status bar messages, or any other similar conventional means which can be used instead without departing from the spirit of the present invention.

Once the spreadsheet user has acknowledged this warning message, the SyntheticFocusMgr command completes without turning the selected range of cells into a FMROC.

Figure 14:
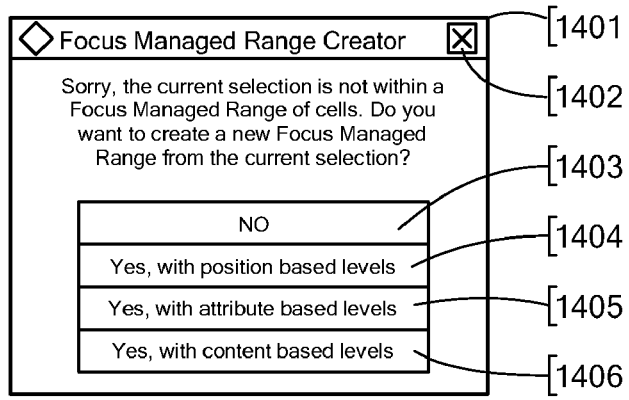
FIGS. 14, 15, 16, 17 and 18 show a spreadsheet user interface respectively for creating a focus managed range of cells, for selecting criteria elements within a focus managed range of cells of "content based levels" type, for managing focus managed range of cells, for managing focus levels, and for associating focus levels with focus managed range of cells elements according to the embodiment of the present invention.

If the selected range of cells comprises at least two rows and two columns, then it can become a new FMROC so that a specific user interface is displayed on the display device 106 to further prompt the spreadsheet user. This can be illustrated with the user interface described with the FIG. 14, showing the Focus Manager Range Creator Dialog Box 1401, as displayed on the display device 106. Within this Focus Manger Range Creator Dialog Box 1401, the spreadsheet user can click with the pointing device 105 on different push-buttons.

If the spreadsheet user clicks on the "NO" push-button 1403 or on the closing-window push-button 1402, then the SyntheticFocusMgr command completes without turning the selected range of cells into a FMROC.

If the spreadsheet user clicks on one of the three push-buttons "Yes, with position based levels" 1404, or "Yes, with attribute based levels" 1405, or "Yes, with content based levels" 1406, then the currently selected range of cells becomes a new FMROC, with a Focus Type taking respectively the values ADDRESS, or ATTRIBUTE, or CONTENT.

If Focus Type takes the value ADDRESS, then it means that the display of each FMROC element (row or column) will be based on a set of focus levels associated with each individual element.

If Focus Type takes the value ATTRIBUTE, then it means that the display of each FMROC element (row or column) will be based on a set of focus levels associated with the attributes (such as colour, font, size, etc.) of the element header cell (left most cell of a row, or top cell of a column).

If Focus Type takes the value CONTENT, then it means that the display of each FMROC element (row or column) will be based on a set of focus levels associated with the value taken by the element cell belonging to a "Horizontal Criteria" column (if the element is a row) or belonging to a "Vertical Criteria" row (if the element is a column).

Then the Focus Manager Range Creator Dialog Box 1401 is closed on the display device 106, and a new test is performed to check whether the new FMROC is a named range of cells or not.

If it is not the case, then the spreadsheet user is prompted to specify a valid name for the currently selected range of cells just turned as a new FMROC. This can be done by displaying on the display device 106 a pop-up entry field window, or any other similar conventional means which can be used instead without departing from the spirit of the present invention.

Once the new FMROC is named, or if it was named before invocation of the SyntheticFocusMgr command, then the currently selected range of cells is recorded within Synthetic Focus Manager internal working tables as a new FMROC with default characteristics.

Then a test is performed to determine whether the new FMROC has a Focus Type equal to CONTENT or not.

If it is the case, then the spreadsheet user is prompted to specify the "Horizontal Criteria" column and the "Vertical Criteria" row.

Figure 15:
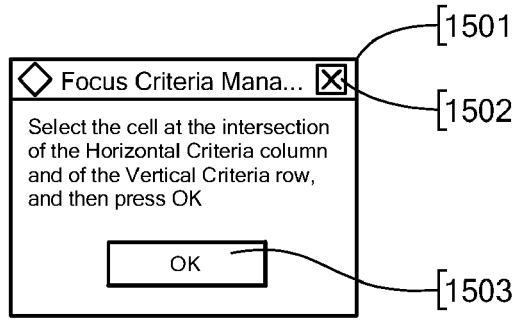
Figure 16:
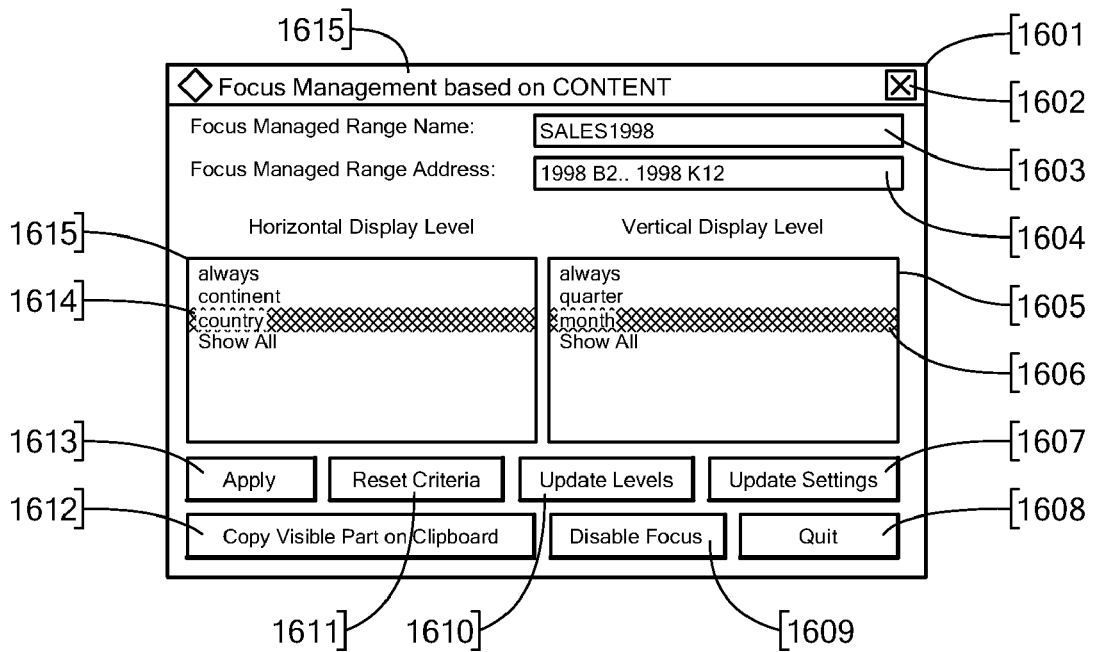

This can be illustrated with the user interface described with the FIG. 15, showing the Focus Criteria Manager Dialog Box 1501, as displayed on the display device 106. When this Focus Criteria Manager Dialog Box 1501 is displayed on the display device 106, the spreadsheet user must first select with the pointing device 105 the cell located at the intersection of the "Horizontal Criteria" column and of the "Vertical Criteria" row of his/her choice, and then must click with the pointing device 105 on the "OK" push-button 1503 or on the closing-window push-button 1502 to close the Focus Criteria Manager Dialog Box 1501, so that the "Horizontal Criteria" column and the "Vertical Criteria" row get recorded in the Synthetic Focus Manager internal working tables. Once this is done, or if the Focus Type value was equal to ADDRESS or to ATTRIBUTE, then the main user interface of the Synthetic Focus Manager is displayed on the display device 106. This can be illustrated with the user interface described with the FIG. 16, showing the Focus Manager Dialog Box 1601, as displayed on the display device 106, which displays the default characteristics assigned to any new FMROC. Then the third step of this first operation starts as the spreadsheet user can manage the elements of the new FMROC to be either displayed or hidden.

b.2 If the currently selected range of cells partially overlaps with an already existing FMROC, then a warning message is displayed on the display device 106 to the spreadsheet user through conventional means such as pop-up windows, status bar messages, or any other similar conventional means which can be used instead without departing from the spirit of the present invention. Indeed in an embodiment of the present invention, it is not possible to define two different FMROC which partially overlap, so that the spreadsheet user must be warned about this situation. Once the spreadsheet user has acknowledged this warning message, the SyntheticFocusMgr command completes without turning the selected range of cells into a FMROC.

b.3 If the currently selected range of cells is fully included within an already existing FMROC, then the Synthetic Focus Manager understands that the spreadsheet user wishes to take advantage of the present invention for this existing FMROC. Then the Synthetic Focus Manager internal working tables are visited to retrieve the characteristics of the identified FMROC, which are then displayed on the display device 106 within the Focus Manager Dialog Box 1601. Then the third step of this first operation starts as the spreadsheet user can manage the elements of the FMROC to display or hide.

c. Hiding/Displaying Elements of a FMROC

Within the Focus Manager Dialog Box 1601, the user can visualise different pieces of information related to the currently managed FMROC.

First the name of the range of cells corresponding to the currently managed FMROC is specified in the label box 1603.

Second the address of the range of cells corresponding to the currently managed FMROC is specified in the label box 1604.

Third the list of horizontal focus levels is displayed in the list box 1615, starting at the top with the default highest priority horizontal focus level "always" (associated with the rows which must be always displayed), and ending at the bottom with the default lowest priority horizontal focus level "Show All" (associated with the rows which are only displayed when the whole FMROC is displayed). Any other user defined horizontal focus level will appear between the "always" and "Show All" focus levels according to its relative priority. Within the list box 1615, the current horizontal display level is identified as being the selected entry in the list, as shown on FIG. 16 by the "country" focus level 1614. When a new FMROC is created, the default horizontal focus level list is constituted by the default "always" and "Show All" focus levels, and the default horizontal display level corresponds to the "always" horizontal focus level.

Fourth the list of vertical focus levels is displayed in the list box 1605, starting at the top with the default highest priority vertical focus level "always" (associated with the columns which must be always displayed), and ending at the bottom with the default lowest priority vertical focus level "Show All" (associated with the columns which are only displayed when the whole FMROC is displayed). Any other user defined vertical focus level will appear between the "always" and "Show All" focus levels according to its relative priority. Within the list box 1605, the current vertical display level is identified as being the selected entry in the list, as shown on FIG. 16 by the "month" focus level 1606. When a new FMROC is created, the default vertical focus level list is constituted by the default "always" and "Show All" focus levels, and the default vertical display level corresponds to the "always" vertical focus level.

Fifth the Focus Type associated with the currently managed FMROC is identified by the title of the Focus Manager Dialog Box 1601, which is displayed at the top of this dialog box 1601. If the Focus Type takes respectively the values ADDRESS, or ATTRIBUTE, or CONTENT, then the title of the Focus Manager Dialog Box 1601 is respectively "Focus Management based on POSITION", or "Focus Management based on ATTRIBUTE", or "Focus Management based on CONTENT".

Once the spreadsheet user has examined the different characteristics of the currently managed FMROC displayed within the Focus Manager Dialog Box 1601, he/she can take several different actions according to his/her specific needs.

First the spreadsheet user can change the current horizontal display level by selecting with the pointing device 105 an horizontal focus level different from the one previously selected as the horizontal display level. If it turns out that the number of defined horizontal focus levels is large enough not to entirely fit within the list box 1615, then conventional means such as but not limited to a scrolling bar can be used to navigate within the full set of horizontal focus levels appearing in the list box 1615.

Second the spreadsheet user can change the current vertical display level by selecting with the pointing device 105 a vertical focus level different from the one previously selected as the vertical display level. If it turns out that the number of defined vertical focus levels is large enough not to entirely fit within the list box 1605, then conventional means such as but not limited to a scrolling bar can be used to navigate within the full set of vertical focus levels appearing in the list box 1605.

Third the spreadsheet user can click with the pointing device 105 on the "Apply" push-button 1613. The resulting effect will be either to hide or to display the elements of the currently managed FMROC according to the horizontal and vertical display levels. For instance, if these levels take the respective values "country" and "month", as illustrated by the fields 1614 and 1606 in the list boxes 1615 and 1605 of the FIG. 16, then the rows which are associated with a lower priority horizontal focus level ("Show All") will be hidden while the other rows associated with an higher or equal priority horizontal focus level ("always", "continent", "country") will be displayed, and the columns which are associated with a lower priority vertical focus level ("Show All") will be hidden while the other rows associated with an higher or equal priority vertical focus level ("always", "quarter", "month") will be displayed. This management of the FMROC elements, both rows and columns, which are either displayed or hidden, relies on the associated horizontal and vertical focus levels, and on their relative position with respect to the horizontal and vertical display levels, whether this horizontal and vertical focus level association is based on ADDRESS, ATTRIBUTE or CONTENT, as recorded by the Focus Type parameter.

Fourth the spreadsheet user can click with the pointing device 105 on the "Reset Criteria" push-button 1611, if the currently managed FMROC has a Focus Type parameter taking the value CONTENT (for the other values ATTRIBUTE and CONTENT, the "Reset Criteria" push-button 1611 is disabled, so that clicking on it has no effect). The resulting effect is to display on the display device 106 the Focus Criteria Manager Dialog Box 1501, which allows the spreadsheet user, as already described, to redefine the "Horizontal Criteria" column and of the "Vertical Criteria" row. When done, the Focus Criteria Manager Dialog Box 1501 is closed and control is given back to the Focus Manager Dialog Box 1601 for processing any other spreadsheet user action.

Fifth the spreadsheet user can click with the pointing device 105 on the "Update Levels" push-button 1610. The resulting effect is to issue an original specific command called "FocusLevelMgr" in order to launch the second operation of the present scenario for updating the currently defined focus levels associated with the currently managed FMROC, as further described hereafter.

Sixth the spreadsheet user can click with the pointing device 105 on the "Update Settings" push-button 1607. The resulting effect is to issue an original specific command called "FocusSettingMgr" in order to launch the third operation of the present scenario for updating the currently defined associations between FMROC elements and FMROC focus levels, as further described hereafter.

Seventh the spreadsheet user can click with the pointing device 105 on the "Copy Visible Part on Clipboard" push-button 1612. The resulting effect is to issue an original specific command called "FocusCopyMgr" in order to launch the fourth operation of the present scenario for copying onto the clipboard the elements of the currently managed FMROC which would be displayed on the display device 106 after a click on the "Apply" push-button 1613 with the pointing device 105, as further described hereafter.

Eighth the spreadsheet user can click with the pointing device 105 on the "Disable Focus" push-button 1609. The resulting effect is to turn the currently managed FMROC as a 'standard' range of cells, by flushing out of the Synthetic Focus Manager internal working tables all the information related to this range of cells. As a consequence, the Focus Manager Dialog Box 1601 is closed on the display device 106, and the SyntheticFocusMgr command completes.

Ninth the spreadsheet user can click with the pointing device 105 on the "Quit" push-button 1608 or on the closing-window push-button 1602 in order to complete the execution of the SyntheticFocusMgr command by closing the Focus Manager Dialog Box 1601.

2. Second Operation: Update of the Existing Focus Levels

The second operation occurs when the spreadsheet user decides, based on his or her own criteria not detailed here:
  either to introduce a new focus level, or
  to delete an existing focus level, or
  to rename an existing focus level, or
  to update the relative priorities of existing focus levels.
in an embodiment of the present invention, this operation comprises the following steps:

Focus Level Manager

Figure 17:
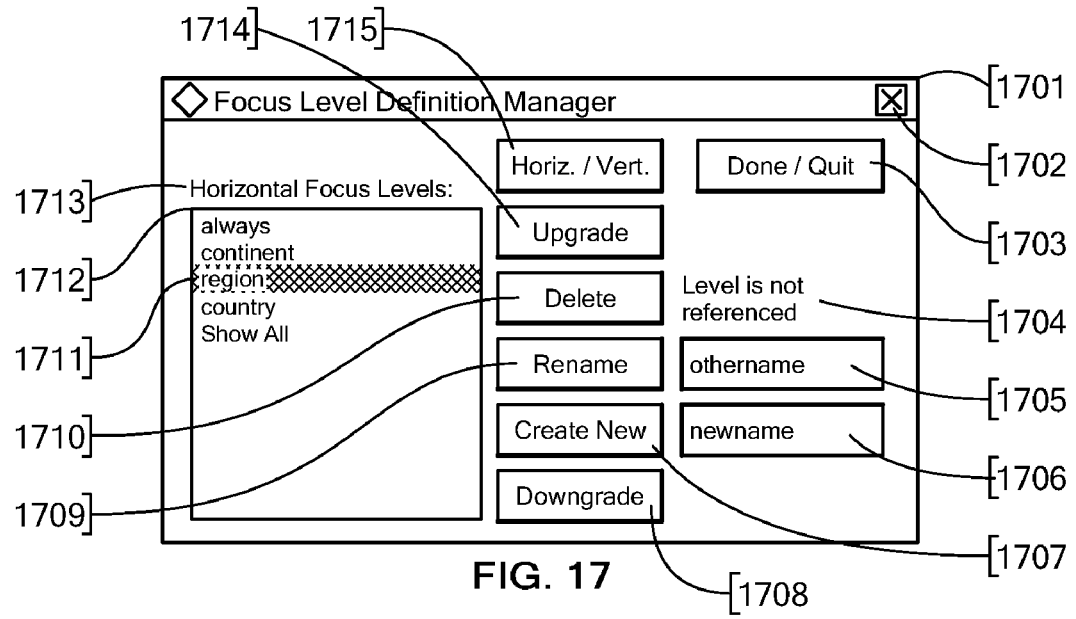

The spreadsheet user invokes thanks to conventional means available in spreadsheet environment, such as (but not limited to) dedicated push-buttons, keyboard entry short cuts, menu or sub-menu entries, an original specific command called "FocusLevelMgr" which manages through a dedicated user interface the definition of the focus levels associated with the currently managed FMROC. This can be illustrated with the user interface described with the FIG. 17, showing the Focus Level Manager Dialog Box 1701, as displayed on the display device 106. Within the Focus Level Manager Dialog Box 1701, the user can visualise different pieces of information corresponding to the focus levels of the currently managed FMROC.

First the label box 1713 specifies whether the information displayed in the list box 1712 corresponds either to horizontal focus levels (the label box 1713 displaying "Horizontal Focus Levels:") or to vertical focus levels (the label box 1713 displaying "Vertical Focus Levels:").

Second the list box 1712 displays the set of horizontal or vertical focus levels (according to the content of the label box 1713), with
  the highest priority focus level at the top of the list,
  the lowest priority focus level at the bottom of the list, and
  all the intermediary focus levels, if any, in the middle with the same order as their relative priority.

Within the list box 1712, one of the focus levels is set as the currently working focus level, and is recognised with a dark background colour, as shown by the entry "region" 1711 on FIG. 17.

Third the label box 1704 specifies whether the currently working focus level is referenced or not within the focus level setting of a FMROC element. If it is the case, then the label box 1704 displays "Level is referenced"; otherwise the label box 1704 displays "Level is referenced".

Once the spreadsheet user has examined the different pieces of information displayed within the Focus Level Manager Dialog Box 1701, he/she can take several different actions according to his/her specific needs.

First the spreadsheet user can click with the pointing device 105 on the "Horiz./Vert." push-button 1715. The resulting effect is to swap between the set of horizontal focus levels and the set of vertical focus levels, so that the label box 1713 alternatively displays "Horizontal Focus Levels:" and "Vertical Focus Levels:" and so that the list box 1712 alternatively comprises the set of horizontal focus levels and the set of vertical focus levels.

Second the spreadsheet user can change the currently working focus level by selecting with the pointing device 105 a focus level different from the one previously selected as the currently working focus level. If it turns out that the number of defined focus levels is large enough not to entirely fit within the list box 1712, then conventional means such as but not limited to a scrolling bar can be used to navigate within the full set of focus levels appearing in the list box 1712.

If the currently working focus level is the focus level of highest priority ("always"), then the push-buttons "Upgrade" 1714, "Downgrade" 1708, "Delete" 1710, "Rename" 1709, and "Create New" 1707 are disabled so that clicking on them with the pointing device 105 has no effect.

If the currently working focus level is the focus level of lowest priority ("Show All"), then the push-buttons "Upgrade" 1714, "Downgrade" 1708, "Delete" 1710, and "Rename" 1709 are disabled so that clicking on them with the pointing device 105 has no effect.

If the currently working focus level is the focus level of the highest priority below the priority of the "always" focus level (as it is the case with the focus level "continent" on FIG. 17), then the push-button "Upgrade" 1714 is disabled so that clicking on it with the pointing device 105 has no effect.

If the currently working focus level is the focus level of the lowest priority above the priority of the "Show All" focus level (as it is the case with the focus level "country" on FIG. 17), then the push-button "Downgrade" 1708 is disabled so that clicking on it with the pointing device 105 has no effect.

If the text box 1705 is left empty or comprises a character string equal to the name of an existing focus level, then the "Rename" push-button 1709 is disabled so that clicking on it with the pointing device 105 has no effect.

If the text box 1706 is left empty or comprises a character string equal to the name of an existing focus level, then the "Create New" push-button 1707 is disabled so that clicking on it with the pointing device 105 has no effect.

Third the spreadsheet user can click with the pointing device 105 on the "Upgrade" push-button 1714, if enabled. The resulting effect will be to move up by one priority position the currently working focus level. In the case described by the FIG. 17, the "region" focus level would be moved between "continent" and "always".

Fourth the spreadsheet user can click with the pointing device 105 on the "Downgrade" push-button 1708, if enabled. The resulting effect will be to move down by one priority position the currently working focus level. In the case described by the FIG. 17, the "region" focus level would be moved between "country" and "Show All".

Fifth the spreadsheet user can click with the pointing device 105 on the "Rename" push-button 1709, if enabled. The resulting effect will be to rename the currently working focus level with the name entered in the text box 1705. In the case described by the FIG. 17, the "region" focus level would be renamed as "othername".

Sixth the spreadsheet user can click with the pointing device 105 on the "Create New" push-button 1707, if enabled. The resulting effect will be create a new focus level with a priority just above the priority of the currently working focus level, and with the name entered in the text box 1706. In the case described by the FIG. 17, the "newname" focus level would be created between the "region" and the "continent" focus levels.

Seventh the spreadsheet user can click with the pointing device 105 on the "Delete" push-button 1710, if enabled. The resulting effect will be to remove the currently working focus level from the list of focus levels. In the case described by the FIG. 17, the "region" focus level would be deleted, so that the resulting list of focus levels only comprises four focus levels "always", "continent", "country", and "Show All".

Eighth the spreadsheet user can click with the pointing device 105 on the "Done/Quit" push-button 1703 or on the closing-window push-button 1702 in order to complete the execution of the FocusLevelMgr command by closing the Focus Level Manager Dialog Box 1701.

3. Third Operation: Update of the Focus Level Settings

The third operation occurs when the spreadsheet user decides, based on his or her own criteria not detailed here, to change the focus level associated with one element of the currently managed FMROC, either a row or a column. In an embodiment of the present invention, this operation comprises the following steps:

Focus Setting Manager

The spreadsheet user invokes thanks to conventional means available in spreadsheet environment, such as (but not limited to) dedicated push-buttons, keyboard entry short cuts, menu or sub-menu entries, an original specific command called "FocusSettingMgr" which manages through a dedicated user interface the definition of the focus levels associated with the elements of the currently managed FMROC.

Figure 18:
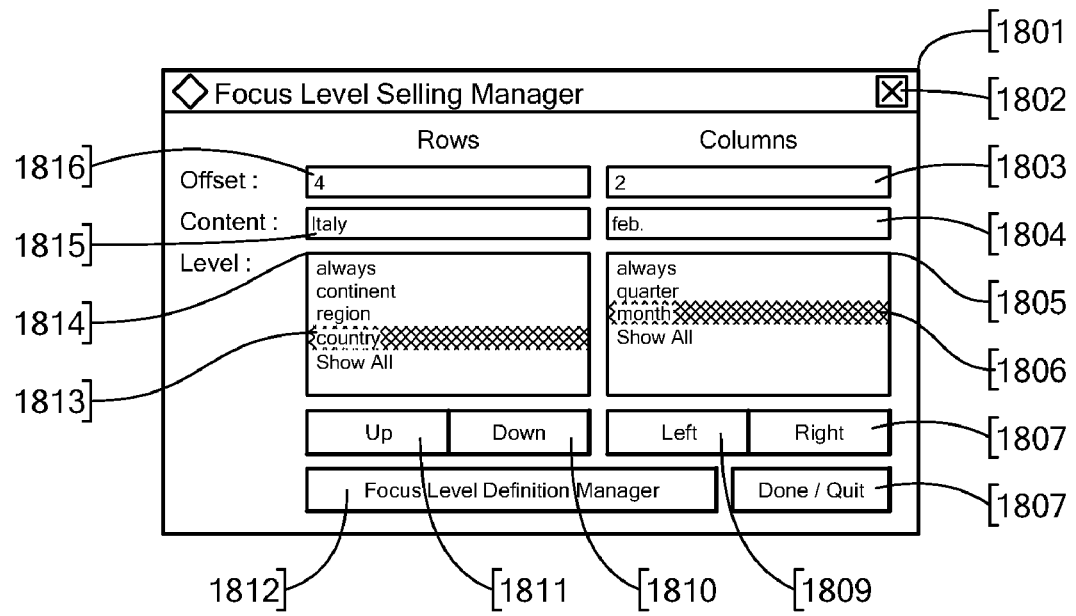

This can be illustrated with the user interface described with the FIG. 18, showing the Focus Setting Manager Dialog Box 1901, as displayed on the display device 106. Within the Focus Setting Manager Dialog Box 1901, the user can visualise different pieces of information which correspond to the horizontal and vertical focus level settings of each element of the currently managed FMROC.

First the "Offset" label box 1816 specifies the relative offset within the currently managed FMROC of a row element. For instance the top row of the currently managed FMROC is identified by an "Offset" label box 1816 taking a value equal to 0 (zero). If the value taken by the "Offset" label box 1816 is equal to 0 (zero), then the push-button "Up" 1811 is disabled. If the value taken by the "Offset" label box 1816 is equal to the number of rows of the currently managed FMROC, decremented by 1 (one), then the push-button "Down" 1810 is disabled.

Second the "Content" label box 1815 specifies the value taken by the header cell of the row element which offset within the currently managed FMROC is specified by the "Offset" label box 1816.

Third the list box 1814 shows the different horizontal focus levels defined for the currently managed FMROC.

Fourth the horizontal focus level currently associated with the row element which offset within the currently managed FMROC is identified by the "Offset" label box 1816, is specified as being the selected entry in the list box 1814, and is identified by a dark background colour, as it is the case for instance in the FIG. 18 for the "country" horizontal focus level 1813. Thus with the example shown on FIG. 18, the horizontal focus level setting of the row with offset 4 (1816), which header's value is "Italy" (1815), is equal to "country" (1813).

Fifth the "Offset" label box 1803 specifies the relative offset within the currently managed FMROC of a column element. For instance the leftmost column of the currently managed FMROC is identified by an "Offset" label box 1803 taking a value equal to 0 (zero).

If the value taken by the "Offset" label box 1803 is equal to 0 (zero), then the push-button "Left" 1809 is disabled.

If the value taken by the "Offset" label box 1803 is equal to the number of columns of the currently managed FMROC, decremented by 1 (one), then the push-button "Right" 1807 is disabled.

Sixth the "Content" label box 1804 specifies the value taken by the header cell of the column element which offset within the currently managed FMROC is specified by the "Offset" label box 1803.

Seventh the list box 1805 shows the different vertical focus levels defined for the currently managed FMROC.

Eighth the vertical focus level currently associated with the column element which offset within the currently managed FMROC is identified by the "Offset" label box 1803, is specified as being the selected entry in the list box 1805, and is identified by a dark background colour, as it is the case for instance in the FIG. 18 for the "month" vertical focus level 1806. Thus with the example shown on FIG. 18, the vertical focus level setting of the column with offset 2 (1803), which header's value is "feb." (1804), is equal to "month" (1806).

Once the spreadsheet user has examined the different pieces of information displayed within the Focus Setting Manager Dialog Box 1801, he/she can take several different actions according to his/her specific needs.

First the spreadsheet user can click with the pointing device 105 on the "Up" push-button 1811, if enabled. The resulting effect will be to decrement by 1 (one) the "Offset" label box 1816, so that the row element under study is replaced by the preceding one, the information displayed in the "Content" label box 1815 is updated accordingly, and the horizontal focus level setting identified within the list box 1814 as being the selected item 1813 with dark background colour is also updated accordingly.

Second the spreadsheet user can click with the pointing device 105 on the "Down" push-button 1810, if enabled. The resulting effect will be to increment by 1 (one) the "Offset" label box 1816, so that the row element under study is replaced by the following one, the information displayed in the "Content" label box 1815 is updated accordingly, and the horizontal focus level setting identified within the list box 1814 as being the selected item 1813 with dark background colour is also updated accordingly.

Third the spreadsheet user can change the horizontal focus level setting by selecting with the pointing device 105 in the list box 1814 an horizontal focus level different from the one previously selected as the horizontal focus level setting. If it turns out that the number of defined horizontal focus levels is large enough not to entirely fit within the list box 1814, then conventional means such as but not limited to a scrolling bar can be used to navigate within the full set of horizontal focus levels appearing in the list box 1814.

Fourth the spreadsheet user can click with the pointing device 105 on the "Left" push-button 1809, if enabled. The resulting effect will be to decrement by 1 (one) the "Offset" label box 1803, so that the column element under study is replaced by the preceding one (on the left), the information displayed in the "Content" label box 1804 is updated accordingly, and the vertical focus level setting identified within the list box 1805 as being the selected item 1806 with dark background colour is also updated accordingly.

Fifth the spreadsheet user can click with the pointing device 105 on the "Right" push-button 1807, if enabled. The resulting effect will be to increment by 1 (one) the "Offset" label box 1803, so that the column element under study is replaced by the following one (on the right), the information displayed in the "Content" label box 1804 is updated accordingly, and the vertical focus level setting identified within the list box 1805 as being the selected item 1806 with dark background colour is also updated accordingly.

Sixth the spreadsheet user can change the vertical focus level setting by selecting with the pointing device 105 in the list box 1805 a vertical focus level different from the one previously selected as the vertical focus level setting. If it turns out that the number of defined vertical focus levels is large enough not to entirely fit within the list box 1805, then conventional means such as but not limited to a scrolling bar can be used to navigate within the full set of vertical focus levels appearing in the list box 1805.

Seventh the spreadsheet user can click with the pointing device 105 on the "Focus Level Definition Manager" push-button 1812. The resulting effect will be to issue the FocusLevelMgr command, so that the second operation of the present scenario be launched by displaying the Focus Level Manager Dialog Box 1701 to update the definition of horizontal and vertical focus levels associated with the currently managed FMROC.

Eighth the spreadsheet user can click with the pointing device 105 on the "Done/Quit" push-button 1808 or on the closing-window push-button 1802 in order to complete the execution of the FocusSettingMgr command by closing the Focus Setting Manager Dialog Box 1801.

4. Fourth Operation: Copy to Clipboard the Visible Part of a Range of Cells

The fourth operation occurs when the spreadsheet user decides, based on his or her own criteria not detailed here, to copy onto the clipboard the elements of the currently managed FMROC, which are displayed according to the focus level settings associated with this FMROC. In an embodiment of the present invention, this operation comprises the following steps:

Focus Copy Manager

The spreadsheet user invokes thanks to conventional means available in spreadsheet environment, such as (but not limited to) dedicated push-buttons, keyboard entry short cuts, menu or sub-menu entries, an original specific command called "FocusCopyMgr" which manages the copy onto the clipboard of the visible elements of the currently managed FMROC.

The horizontal row elements (respectively vertical column elements) which will be copied onto the clipboard are the ones which horizontal (respectively vertical) focus level setting is found greater than or equal to the horizontal (respectively vertical) display focus level. This means that some horizontal (respectively vertical) elements can be left out the copy operation, resulting potentially into unresolved references in the copied elements if they refer to elements not copied. This situation is common for instance when an element of a given focus level priority level corresponds to the sum or the average of elements of a lower focus level priority. To get rid of this unresolved reference situation, the Focus Copy Manager command operates according to the following steps:

First the currently managed FMROC is entirely copied by value on a temporary working sheet. This results in a temporary range of cells named SOURCERANGE which comprises as many rows and as many columns as the currently managed FMROC, and which does not comprises any reference to any cell (because the copy operation has been performed by value).

Second the focus level definitions associated with the currently managed FMROC are applied to the SOURCERANGE range of cells on the temporary working sheet, so that the horizontal and vertical elements of the SOURCERANGE range of cells are accordingly either displayed or hidden.

Third the hidden elements (rows and columns) of the SOURCERANGE range of cells, if any, are deleted from the temporary working sheet.

Fourth the resulting updated range of cells SOURCERANGE is copied onto the clipboard, completing the execution of the FocusCopyMgr command.

E. Methods

E1. Synthetic Focus Manager Method

Figure 3:
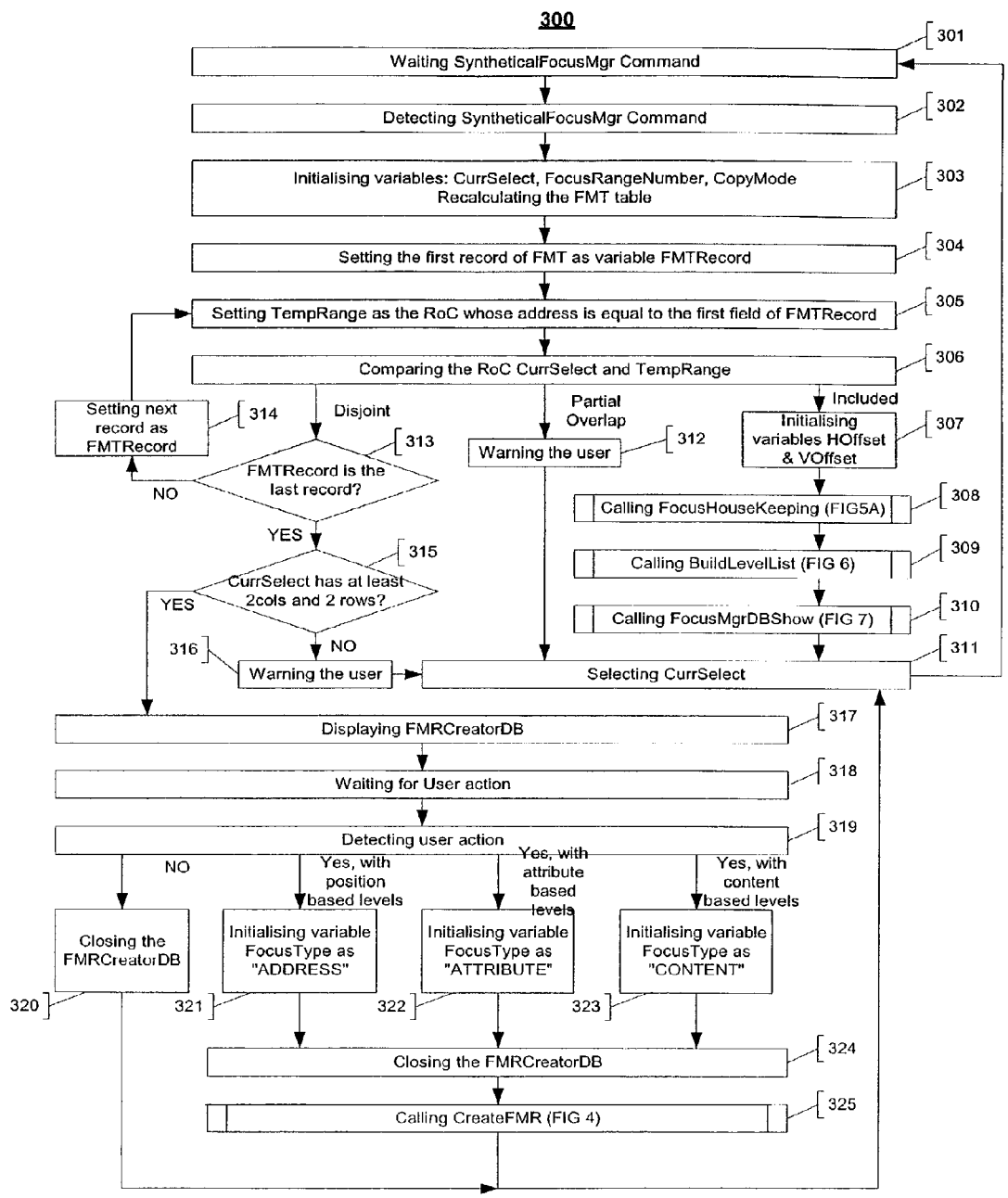
FIG. 3 is a flow chart illustrating a method for processing the "FocusMgr" command according to an embodiment of the present invention.

The method for managing FMROC used in the embodiment of the present invention is summarised in flowchart 300 of FIG. 3. This method can be seen as the processing of the SyntheticFocusMgr command.

At step 301, the method is in its default state, waiting for an event to initiate the process.

At step 302, the SyntheticFocusMgr command is detected, as a result of a user action. This action can be for instance:

a specific combination of key on the keyboard 104, or the click of the pointing device 105 on a specific button, or any other similar means not further specified here.

At step 303, some local variables are initialised:

the local variable CurrSelect is set to the currently selected range of cells, the local variable FocusRangeNumber is set to the number of already existing FMROC (the number of records 1302 within the FMT table 1301), The local variable CopyMode is set to the default value FALSE, and then the FMT table is recalculated to get rid of any remaining formula not yet refreshed.

At step 304, the first record 1302 of the FMT table 1301 is memorised under the local variable FMTRecord.

At step 305, the variable TempRange is set as the range of cells which name is the one found in the field "Range" 1303 of the record FMTRecord 1302.

At step 306, a comparison is performed between the range of cells CurrSelect and the range of cells TempRange.

If the range of cells CurrSelect is included or equal to the range of cells TempRange, then control is given to step 307.

If the range of cells CurrSelect is overlapping partially but not entirely the range of cells TempRange, then control is given to step 312.

If the ranges of cells CurrSelect and TempRange are disjoint, then control is given to step 313.

At step 307, the local variable HOffset is initialised with the relative horizontal offset of the CurrSelect range of cells within the TempRange range of cells, and the local variable VOffset is initialised with the relative vertical offset of the CurrSelect range of cells within the TempRange range of cells.

At step 308, the command FocusHouseKeeping is issued so that the corresponding Focus House Keeping method be launched. When this FocusHouseKeeping command returns control to the SyntheticFocusMgr command, control is given to step 309.

At step 309, the command BuildLevelList is issued to launch the corresponding method building the focus level lists. When this BuildLevelList command returns control to the SyntheticFocusMgr command, control is given to step 310.

At step 310, the command FocusMgrDBShow is issued to launch the corresponding method displaying the Focus Manager Dialog Box 1601. When this FocusMgrDBShow command returns control to the SyntheticFocusMgr command, control is given to step 311.

At step 311, the range of cells CurrSelect is selected and then control is given to the initial step 301 for handling any future SyntheticFocusMgr command.

At step 312, a warning message notification is issued to inform the user that the current selection is partially overlapping an existing FMROC, so that none existing FMROC could be identified and so that none new FMROC could be created. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 311.

At step 313, a test is perform to check whether the local variable FMTRecord corresponds to the last record 1302 of the FMT table 1301 or not. If it is the case, then control is given to step 315; otherwise control is given to step 314.

At step 314, the local variable FMTRecord is updated to point to the record 1302 following in the FMT table 1301 the previous record recorded in the local variable FMTRecord. Then control is given to the step 305.

At step 315, a test is performed to check whether or not the range of cells CurrSelect comprises at least two rows and at least two columns. If it is the case, then control is given to step 317; otherwise control is given to step 316.

At step 316, a warning message notification is issued to inform the user that the current selection does not comprise enough elements to be turned into a FMROC. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 311.

At step 317, the Focus Manager Range Creator Dialog Box 1401 is displayed on the display device 106.

At step 318, the method is in a wait state, waiting for a user action on the Focus Manager Range Creator Dialog Box 1401. Such user action typically results of a click with the pointing device 105, but can take other similar forms such as, but not limited to a specific combination of key on the keyboard 104, or any other similar means not further specified here.

At step 319, an event is detected, as a result of a user action.

If the user action is a click on the "NO" push-button 1403, then control is given to step 320.

If the user action is a click on the "Yes, with position based levels" push-button 1404, then control is given to step 321.

If the user action is a click on the "Yes, with attribute based levels" push-button 1405, then control is given to step 322.

If the user action is a click on the "Yes, with content based levels" push-button 1406, then control is given to step 323.

At step 320, the Focus Manager Range Creator Dialog Box 1401 is closed on the display device 106, and then control is given to step 311.

At step 321, the local variable Focus Type is initialised with the value ADDRESS, and then control is given to step 324.

At step 322, the local variable Focus Type is initialised with the value ATTRIBUTE, and then control is given to step 324.

At step 323, the local variable Focus Type is initialised with the value CONTENT, and then control is given to step 324.

At step 324, the Focus Manager Range Creator Dialog Box 1401 is closed on the display device 106.

At step 325, the command CreateFMR is issued to launch the corresponding method for creating a new FMROC. When this CreateFMR command returns control to the SyntheticFocusMgr command, control is given to step 311.

E2. Create FMROC Method

Figure 4:
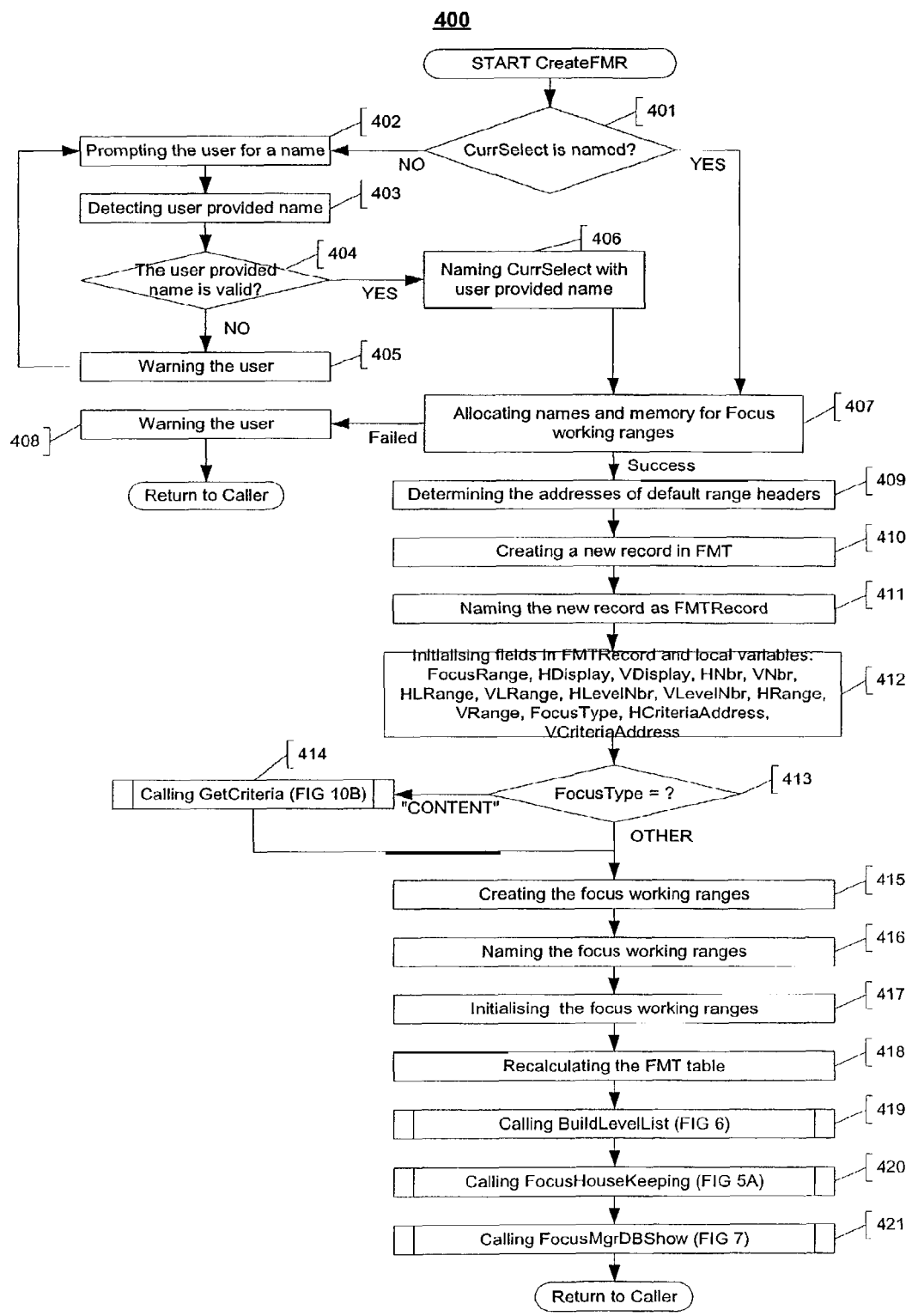
FIG. 4 is a flow chart illustrating a method for executing the "CreateFMR" routine according to an embodiment of the present invention.

The method for creating a FMROC used in the embodiment of the present invention is summarised in flowchart 400 of FIG. 4. This method can be seen as the processing of the CreateFMR command.

At step 401, a test is performed to check whether the range of cells CurrSelect is already named or not. If it is the case, then control is given to step 407; otherwise control is given to step 402.

At step 402, the user is prompted to specify a valid name for the range of cells CurrSelect. This can typically be done by displaying on the display device 106 a prompting message in a pop-up window comprising a text entry field, but any other similar means can be used instead, without departing from the spirit of the invention. Once the user has specified a name for the range of cells CurrSelect through conventional means such as typing with the keyboard 104 a name in the text entry field of a pop-up window, or any other similar means without departing from the spirit of the invention, control is given to step 403.

At step 403, the method detects that the user has specified a range name for the CurrSelect range of cells.

At step 404, a test is performed to check whether the user specified range name for the CurrSelect range of cells is valid or not. The validity criteria are the ones conventionally used in electronic spreadsheet environments. If the specified name is found as valid, then control is given to step 406; otherwise control is given to step 405.

At step 405, a warning message notification is issued to inform the user that the specified range name is invalid. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 402.

At step 406, the range of cells identified by the local variable CurrSelect is named with the name provided by the user at step 403.

At step 407, the method allocates internal resources (names and memory) for building the focus manager internal working tables and records that will be used to manage the FMROC. This includes for instance the memory space needed to build and name the tables HLRange 1320, VLRange 1330, HRange 1340, VRange 1350, and the memory space needed to build a new record 1302 within the FMT table 1301. If this resource allocation fails due for instance to a shortage of memory, then control is given to step 408; otherwise control is given to step 409.

At step 408, a warning message notification is issued to inform the user that the FMROC creation operation has failed due to lack of required system resources. This can typically be done by displaying on the display device 106 a warning message in a pop-up window, or in a status bar area, but any other similar means could be used instead, without departing from the spirit of the invention. This step completes the execution of the CreateFMR command as control is returned back to the calling method having issued the CreateFMR command.

At step 409, the addresses of the default headers of the FMROC being created are determined. They are recorded in three local variables: the local variable TopLeft comprises the address of the cell located within the range of cells CurrSelect at the intersection of the top row and of the left most column; the local variable TopRight comprises the address of the cell located within the range of cells CurrSelect at the intersection of the top row and of the right most column; and the local variable BottomLeft comprises the address of the cell located within the range of cells CurrSelect at the intersection of the bottom row and of the left most column.

At step 410, a new record 1302 is created in the FMT table 1301.

At step 411, the new record 1302 is named as FMTRecord.

At step 412, some local variables are initialised, as well as the fields in the new record FMTRecord 1302:

The local variable FocusRange is initialised with the name of the range of cells CurrSelect, and then the "Range" field 1303 of the FMTRecord 1302 is filled with the value of the local variable FocusRange.

The local variable HDisplay is initialised with the default value "always", and then the "HDisplay" field 1304 of the FMTRecord 1302 is filled with the value of the local variable HDisplay.

The local variable VDisplay is initialised with the default value "always", and then the "VDisplay" field 1305 of the FMTRecord 1302 is filled with the value of the local variable VDisplay.

The local variable HNbr is initialised with the default content "@rows(@@(HLRange))", that is the number of rows in the HLRange table 1320, and then the "HNbr" field 1306 of the FMTRecord 1302 is filled with the value of the local variable HNbr.

The local variable VNbr is initialised with the default content "@rows(@@(VLRange))", that is the number of rows in the VLRange table 1330, and then the "VNbr" field 1307 of the FMTRecord 1302 is filled with the value of the local variable VNbr.

The local variable HLRange is initialised with the name allocated at step 407 for the HLRange table 1320, and then the "HLRange" field 1308 of the FMTRecord 1302 is filled with the value of the local variable HLRange.

The local variable VLRange is initialised with the name allocated at step 407 for the VLRange table 1330, and then the "VLRange" field 1309 of the FMTRecord 1302 is filled with the value of the local variable VLRange.

The local variable HLevelNbr is initialised with the default content "@rows(@@(HRange))", that is the number of rows in the HRange table 1340, and then the "HLNbr" field 1310 of the FMTRecord 1302 is filled with the value of the local variable HLevelNbr.

The local variable VLevelNbr is initialised with the default content "@rows(@@(VRange))", that is the number of rows in the VRange table 1350, and then the "VLNbr" field 1311 of the FMTRecord 1302 is filled with the value of the local variable VLevelNbr.

The local variable HRange is initialised with the name allocated at step 407 for the HRange table 1340, and then the "HRange" field 1312 of the FMTRecord 1302 is filled with the value of the local variable HRange.

The local variable VRange is initialised with the name allocated at step 407 for the VRange table 1350, and then the "VRange" field 1313 of the FMTRecord 1302 is filled with the value of the local variable VRange.

The "FocusType" field 1314 of the FMTRecord 1302 is filled with the value of the local variable Focus Type.

The local variable HCriteriaAddress is initialised with the default value "N/A"; and then the "HCriteria" field 1315 of the FMTRecord 1302 is filled with the value of the local variable HCriteriaAddress.

The local variable VCriteriaAddress is initialised with the default value "N/A"; and then the "VCriteria" field 1316 of the FMTRecord 1302 is filled with the value of the local variable VCriteriaAddress.

At step 413, a test is performed to determine the value of the local variable FocusType. If found equal to CONTENT, then control is given to step 414 otherwise control is given to step 415.

At step 414, the command GetCriteria is issued to launch the corresponding method for retrieving the "Horizontal Criteria" column and "Vertical Criteria" row. When this GetCriteria command returns control to the CreateFMR command, control is given to step 415.

At step 415, the new four focus manager internal working tables HLRange 1320, VLRange 1330, HRange 1340, and VRange 1350 are created as being conventional ranges of cells in an hidden sheet of the active spreadsheet file, so that they get recorded when the active spreadsheet will be filed on the system mass storage 107. These four working ranges of cells comprise each two rows and two columns.

At step 416, the four ranges of cells created at the previous steps are named with the names allocated at step 407, and recorded in the local variables HLRange, VLRange, HRange and VRange.

At step 417, the four ranges of cells created at step 415 are initialised as follows:

The top left cell of the HLRange working range of cells 1320 is filled with the focus level "always".

The bottom left cell of the HLRange working range of cells 1320 is filled with the focus level "Show All".

The top right cell of the HLRange working range of cells 1320 is left void.

The bottom right cell of the HLRange working range of cells 1320 is left void.

The top left cell of the VLRange working range of cells 1330 is filled with the focus level "always".

The bottom left cell of the VLRange working range of cells 1330 is filled with the focus level "Show All".

The top right cell of the VLRange working range of cells 1330 is left void.

The bottom right cell of the VLRange working range of cells 1330 is left void.

The top left cell of the HRange working range of cells 1340 is filled with the value of the local variable TopLeft.

The bottom left cell of the HRange working range of cells 1340 is filled with the value of the local variable BottomLeft.

The top right cell of the HRange working range of cells 1340 is filled with the focus level "always".

The bottom right cell of the HRange working range of cells 1340 is filled with the focus level "always".

The top left cell of the VRange working range of cells 1350 is filled with the value of the local variable TopLeft.

The bottom left cell of the VRange working range of cells 1350 is filled with the value of the local variable TopRight.

The top right cell of the VRange working range of cells 1350 is filled with the focus level "always".

The bottom right cell of the VRange working range of cells 1350 is filled with the focus level "always".

At step 418, the FMT table 1301 is recalculated so that the formulas it comprises get resolved (for instance for the fields "HNbr" 1306, "Vnbr" 1307, "HLNbr" 1310, and "VLNbr" 1311 of the FMTRecord 1302).

At step 419, the command BuildLevelList is issued to launch the corresponding method for building the focus level list. When this BuildLevelList command returns control to the CreateFMR command, control is given to step 420.

At step 420, the command FocusHouseKeeping is issued to launch the corresponding method for house keeping the focus manager internal working tables. When this FocusHouseKeeping command returns control to the CreateFMR command, control is given to step 421.

At step 421, the command FocusMgrDBShow is issued to launch the corresponding method for displaying the Focus Manager Dialog Box 1601. When this FocusMgrDBShow command returns control to the CreateFMR command, the execution of the CreateFMR command is completed as control is returned back to the calling method having issued the CreateFMR command.

E3. Focus House Keeping Method

Figure 5A:
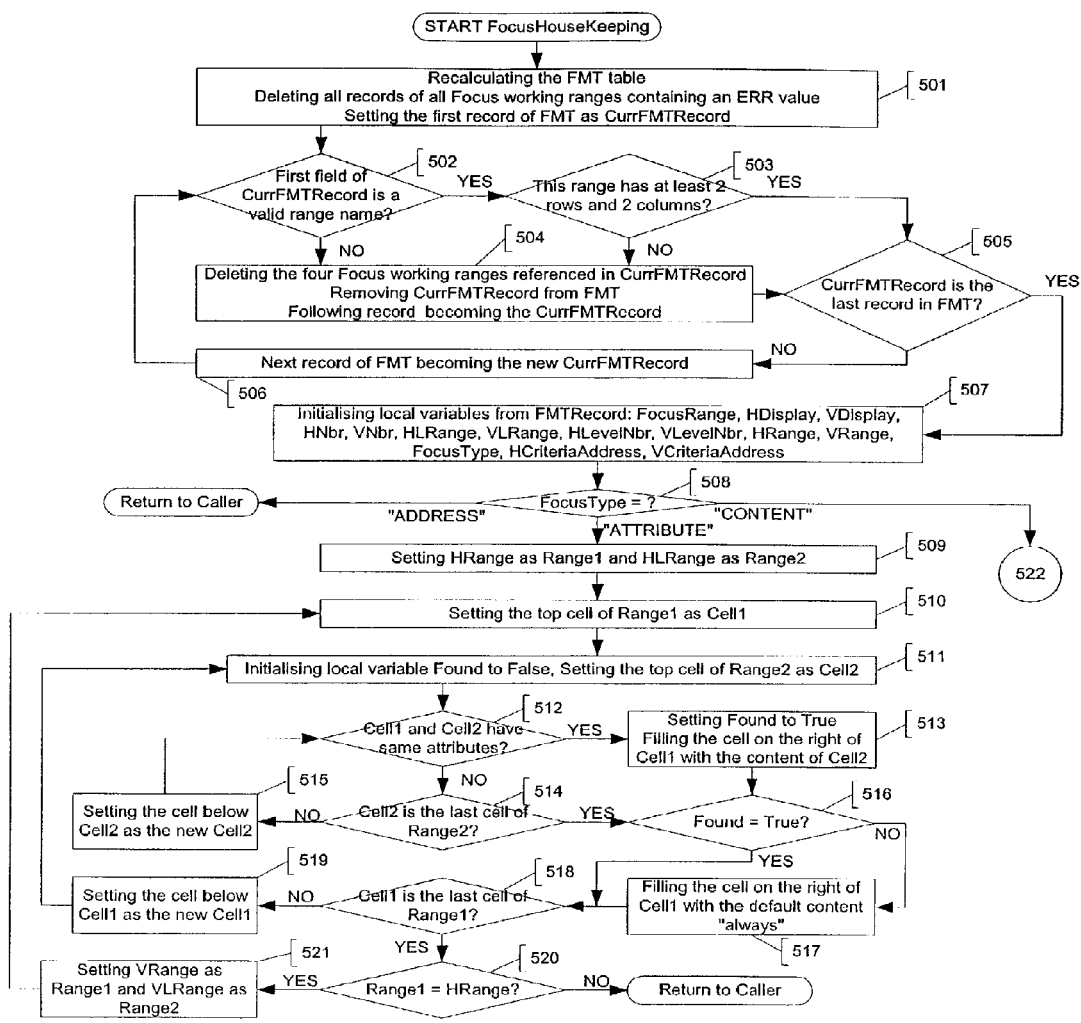
FIGS. 5A and 5B are a flow chart illustrating a method for executing the "FocusHouseKeeping" routine according to an embodiment of the present invention.
Figure 5B:
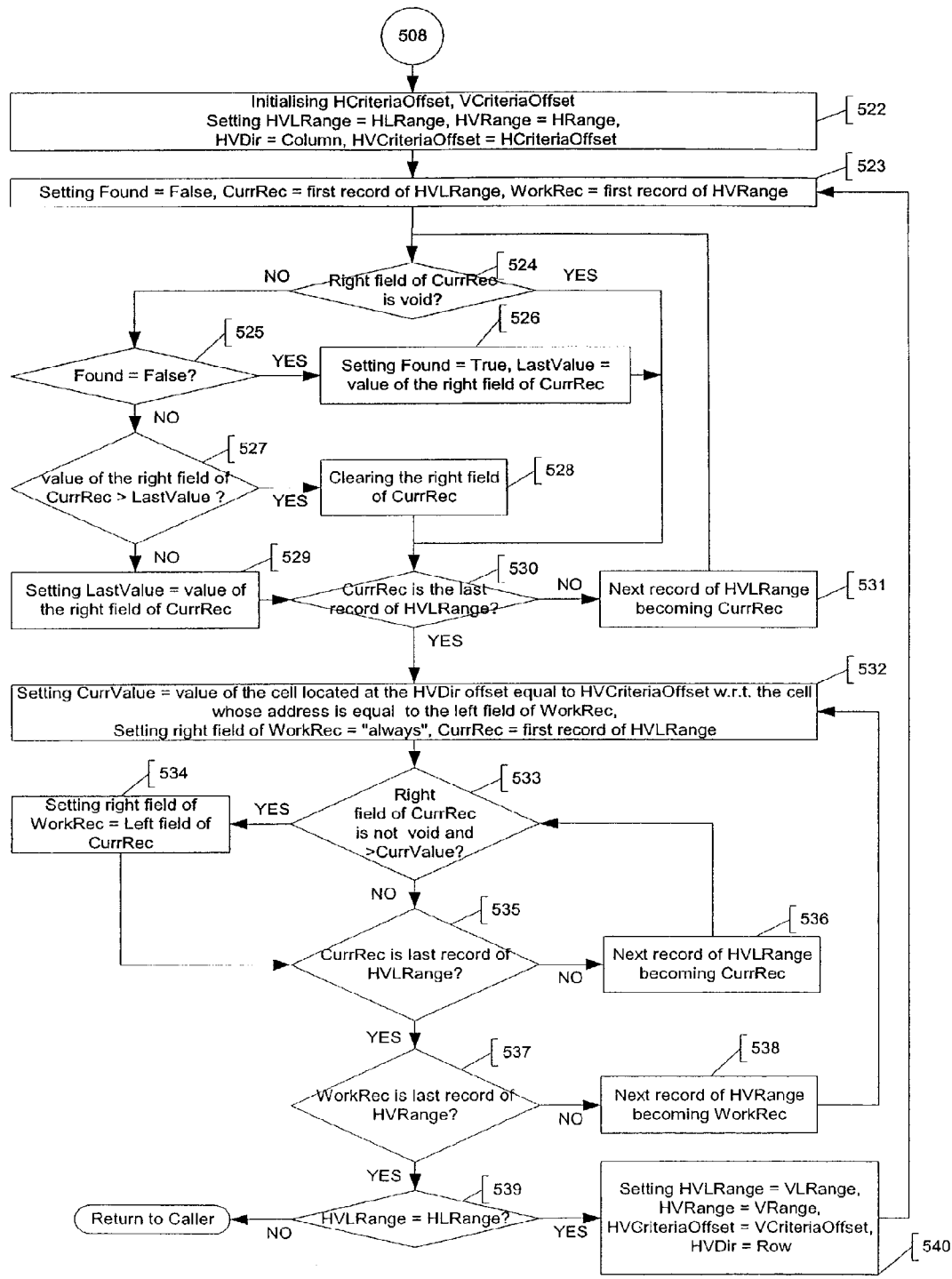

The method for house keeping the focus level manager internal working tables used in the embodiment of the present invention is summarised in flowcharts 500 (1/2) of FIGS. 5A and 500 (2/2) of FIG. 5B. This method can be seen as the processing of the FocusHouseKeeping command.

At step 501, the FMT table 1301 is recalculated to get rid of any remaining formula not refreshed. Then each record 1302 of the FMT table 1301 is deleted if and only if it comprises a field with an "ERR" value. Then the local variable CurrFMTRecord is set as being the first record 1301 of the FMT table 1302.

At step 502, a test is performed to check whether or not the "Range" field 1303 of the CurrFMTRecord record 1302 comprises the name of an existing range of cells. If it is the case, then control is given to step 503; otherwise control is given to step 504.

At step 503, a test is performed to check whether or not the range of cells which name is comprised in the "Range" field 1303 of the CurrFMTRecord record 1302, comprises at least 2 rows and 2 columns. If it is the case, then control is given to step 505; otherwise control is given to step 504.

At step 504, the four focus manager working tables HLRange 1320, VLRange 1330, HRange 1340 and VRange 1350 which respective names are comprised in the "HLRange" field 1308, "VLRange" field 1309, "HRange" field 1312 and "VRange" field 1313 of the CurrFMTRecord record 1302, are deleted. Then the CurrFMTRecord record 1302 is removed from the FMT table 1301. Then the local variable CurrFMTRecord becomes the next record 1302 of the FMT table 1301, if it exists, or the previous one otherwise.

At step 505, a test is performed to check whether the CurrFMTRecord record 1302 is the last record 1302 of the FMT table 1301 or not. If it is the case, then control is given to step 507; otherwise control is given to step 506.

At step 506, the local variable CurrFMTRecord becomes the next record 1302 of the FMT table 1301. Then control is given to step 502.

At step 507, local variables are initialised from the content of the fields of the record FMTRecord 1302:

The local variable FocusRange is initialised with the content of the "Range" field 1303 of the FMTRecord 1302.
The local variable HDisplay is initialised with the content of the "HDisplay" field 1304 of the FMTRecord 1302.
The local variable VDisplay is initialised with the content of the "VDisplay" field 1305 of the FMTRecord 1302.
The local variable HNbr is initialised with the value of the "HNbr" field 1306 of the FMTRecord 1302.
The local variable VNbr is initialised with the value of the "VNbr" field 1307 of the FMTRecord 1302.
The local variable HLRange is initialised with the content of the "HLRange" field 1308 of the FMTRecord 1302.
The local variable VLRange is initialised with the content of the "VLRange" field 1309 of the FMTRecord 1302.
The local variable HLevelNbr is initialised value of the "HLNbr" field 1310 of the FMTRecord 1302.
The local variable VLevelNbr is initialised with the value of the "VLNbr" field 1311 of the FMTRecord 1302.
The local variable HRange is initialised with the content of the "HRange" field 1312 of the FMTRecord 1302.
The local variable VRange is initialised with the content of the "VRange" field 1313 of the FMTRecord 1302.
The local variable FocusType is initialised with the content of the "FocusType" field 1314 of the FMTRecord 1302.
The local variable HCriteriaAddress is initialised with the content of the "HCriteria" field 1315 of the FMTRecord 1302.
The local variable VCriteriaAddress is initialised with the content of the "VCriteria" field 1316 of the FMTRecord 1302.

At step 508, a test is performed to determine the value of the FocusType local variable.

If the FocusType local variable is found equal to ADDRESS, then the execution of the FocusHouseKeeping command completes as control is returned back to the calling method having issued the FocusHouseKeeping command.

If the FocusType local variable is found equal to ATTRIBUTE, then control is given to step 509. If the FocusType local variable is found equal to CONTENT, then control is given to step 522.

At step 509, the local variable Range1 is set to the range of cells which name is equal to the value of the local variable HRange and the local variable Range2 is set to the range of cells which name is equal to the value of the local variable HLRange.

At step 510, the local variable Cell1 is set to the top left cell of the range of cells Range1.

At step 511, the local variable Found is initialised to the value FALSE, and the local variable Cell2 is set to the top left cell of the range of cells Range2.

At step 512, a test is performed to check whether the two cells Cell1 and Cell2 have the same display attributes or not. In an embodiment of the present invention, these display attributes correspond to the background colour,
the background pattern,
the font size,
the font name,
the font colour,
the font bold attribute,
the font underline attribute,
the font italic attribute,
the text horizontal alignment,
the text vertical alignment,
the text orientation,
the text rotation and
the text wrapped attribute, but any other similar display attributes could be used instead without departing from the spirit of the present invention. If the two cells Cell1 and Cell2 share the same display attributes, then control is given to step 513; otherwise control is given to step 514.

At step 513, the local variable Found is set to the value TRUE. Then the cell located immediately at the right of the cell Cell1 is filled with the content of the cell Cell2. Then control is given to step 516.

At step 514, a test is performed to determine whether the cell Cell2 is the bottom left cell of the Range2 range of cells or not. If it is the case, then control is given to step 516; otherwise control is given to step 515.

At step 515, the local variable Cell2 becomes the cell located below the former position of Cell2.

At step 516, a test is performed to check whether the local variable Found is equal to TRUE or not. If it is the case, then control is given to step 518; otherwise control is given to step 517.

At step 517, the cell 1343 located immediately at the right of the cell Cell1 is filled with the default content "always".

At step 518, a test is performed to determine whether the cell Cell1 is the bottom left cell of the Range1 range of cells or not. If it is the case, then control is given to step 520; otherwise control is given to step 519.

At step 519, the local variable Cell1 becomes the cell located below the former position of Cell1.

At step 520, a test is performed to check whether or not the local variable Range1 is set to the range of cells which name is equal to the value of the local variable HRange. If it is the case, then control is given to step 521; otherwise the execution of the FocusHouseKeeping command completes as control is returned back to the calling method having issued the FocusHouseKeeping command.

At step 521, the local variable Range1 is set to the range of cells which name is equal to the value of the local variable VRange and the local variable Range2 is set to the range of cells which name is equal to the value of the local variable VLRange. Then control is given to step 510.

At step 522, the local variable HCriteriaOffset is set equal to the column offset of the "Horizontal Criteria" column with respect to the FocusRange FMROC, and the local variable VCriteriaOffset is set equal to the row offset of the "Vertical Criteria" row with respect to the FocusRange FMROC. Then the local variable HVLRange is set equal to the local variable HLRange, the local variable HVRange is set equal to the local variable HRange, the local variable HVDir is set equal to "Column", the local variable HVCriteriaOffset is set equal to the local variable HCriteriaOffset.

At step 523, the local variable found is initialised to the value FALSE, the local variable CurrRec is set to the first record of the range of cells HVLRange, and the local variable WorkRec is set as the first top record of the range of cells HVRange.

At step 524, a test is performed to determine whether or not the right field of the CurrRec record is void. If it is the case, then control is given to step 530; otherwise control is given to step 525.

At step 525, a test is performed to determine whether or not the local variable Found is equal to FALSE. If it is the case, then control is given to step 526; otherwise control is given to step 527.

At step 526, the local variable Found is set equal to TRUE, and the local variable LastValue is set equal to the value of the right field of the CurrRec record. Then control is given to step 530.

At step 527, a test is performed to check whether or not the value of the right field of the CurrRec record is greater than the value of the local variable LastValue. If it is the case, then control is given to step 528; otherwise control is given to step 529.

At step 528, the right field of the CurrRec record is cleared (content left as void).

At step 529, the local variable LastValue is set equal to the value of the right field of the CurrRec record.

At step 530, a test is performed to check whether or not the CurrRec record is the last record of the range of cells HVLRange. If it is the case, then control is given to step 532; otherwise control is given to step 531.

At step 531, the local variable CurrRec becomes the record following the CurrRec record in the range of cells HVLRange.

At step 532, the local variable CurrValue is set equal to the value of the cell which is located along the HVDir direction at an offset equal to the value of the local variable HVCriteriaOffset with respect to the cell which address is equal to the left field of the WorkRec record. For instance when HVDir is equal to "Column", this cell is located at the intersection of the "Horizontal Criteria" column and of the row comprising the header cell which address is given by the "HHeader" field 1342 of the WorkRec record 1341. Then the right field of the WorkRec record is set equal to "always" and the local variable CurrRec is set to the first record of the range of cells HVLRange.

At step 533, a test is performed to check whether or not the right field of the CurrRec record is not void and has a value greater than the value of the local variable CurrValue. If it is the case, then control is given to step 534; otherwise control is given to step 535.

At step 534, the right field of the WorkRec record is set equal to the value of the left field of the CurrRec record.

At step 535, a test is performed to check whether or not the CurrRec record is the last record of the range of cells HVLRange. If it is the case, then control is given to step 537; otherwise control is given to step 536.

At step 536, the local variable CurrRec becomes the record following the CurrRec record in the range of cells HVLRange. Then control is given to step 533.

At step 537, a test is performed to check whether or not WorkRec record is the last record of the range of cells HVRange. If it is the case, then control is given to step 539; otherwise control is given to step 538.

At step 538, the local variable WorkRec becomes the record following the WorkRec record in the range of cells HVRange. Then control is given to step 532.

At step 539, a test is performed to check whether or not the range of cells HVLRange is equal to the range of cells HLRange. If it is the case, then control is given to step 540; otherwise the execution of the FocusHouseKeeping command completes as control is returned back to the calling method having issued the FocusHouseKeeping command.

At step 540, the local variable HVLRange is set equal to the local variable VLRange, the local variable HVRange is set equal to the local variable VRange, the local variable HVDir is set equal to "Row", the local variable HVCriteriaOffset is set equal to the local variable VCriteriaOffset. Then control is given to step 523.

E4. Build Level List Method

Figure 6:
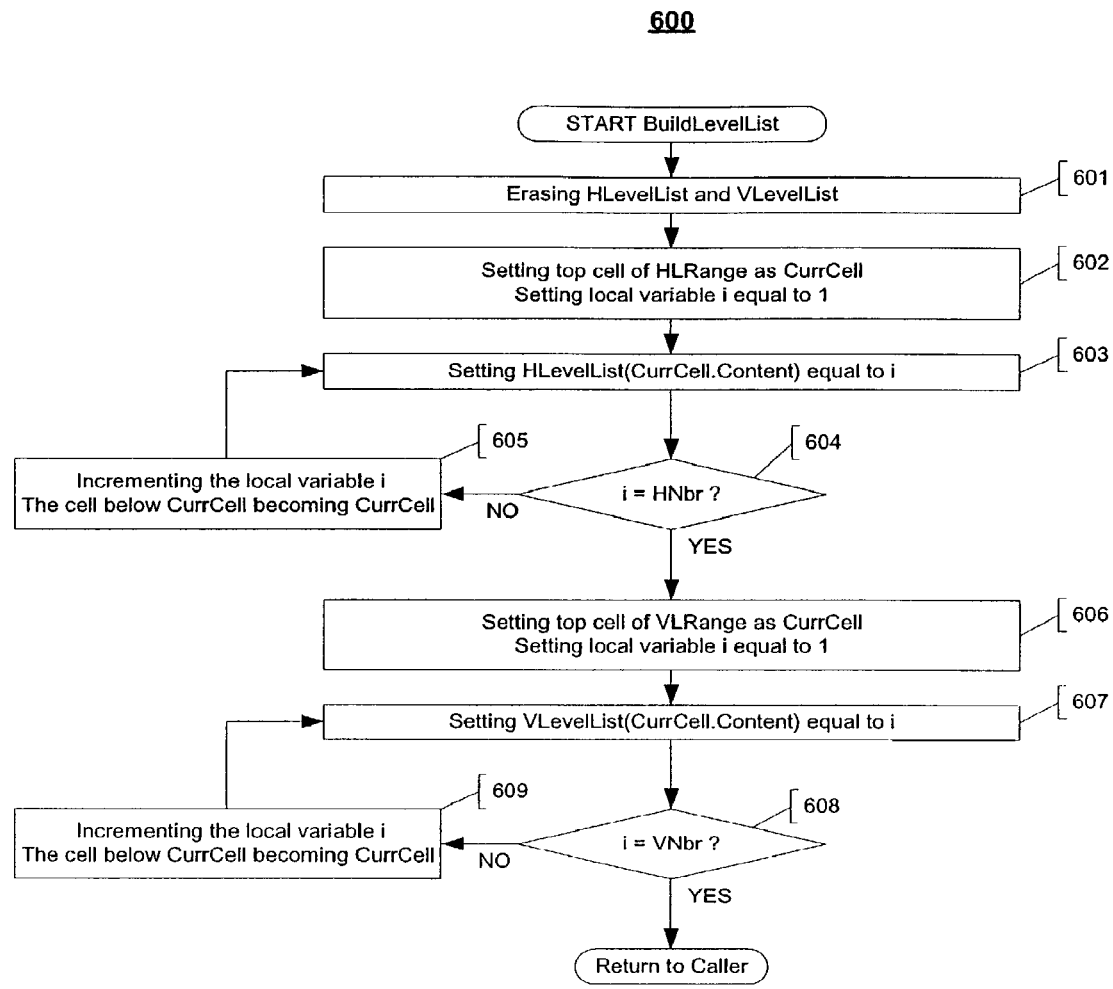
FIG. 6 is a flow chart illustrating a method for executing the "BuildLevelList" routine according to an embodiment of the present invention.

The method for building the focus level lists associated with a FMROC used in the embodiment of the present invention is summarised in flowchart 600 of FIG. 6. This method can be seen as the processing of the BuildLevelList command.

At step 601, the local lists HLevelList and VLevelList are cleared.

At step 602, the local variable CurrCell is set as the top left cell of the range of cells HLRange, and the local variable i is initialised to the value 1 (one).

At step 603, the content of the local variable CurrCell is added as an element of local list HLevelList taking the value i.

At step 604, a test is performed to check whether or not the local variable i is equal to the value of the local variable HNbr. If it is the case, then control is given to step 606; otherwise control is given to step 605.

At step 605, the local variable i is incremented by 1 (one) and the local variable CurrCell is set to the cell below the former position of CurrCell. Then control is given to step 603.

At step 606, the local variable CurrCell is set as the top left cell of the range of cells VLRange, and the local variable i is initialised to the value 1 (one).

At step 607, the content of the local variable CurrCell is added as an element of local list VLevelList taking the value i.

At step 608, a test is performed to check whether or not the local variable i is equal to the value of the local variable VNbr. If it is the case, then the execution of the BuildLevelList command completes as control is returned back to the calling method having issued the BuildLevelList command; otherwise control is given to step 609.

At step 609, the local variable i is incremented by 1 (one) and the local variable CurrCell is set to the cell below the former position of CurrCell. Then control is given to step 607.

E5. Focus Manager Dialog Box Show Method

Figure 7:
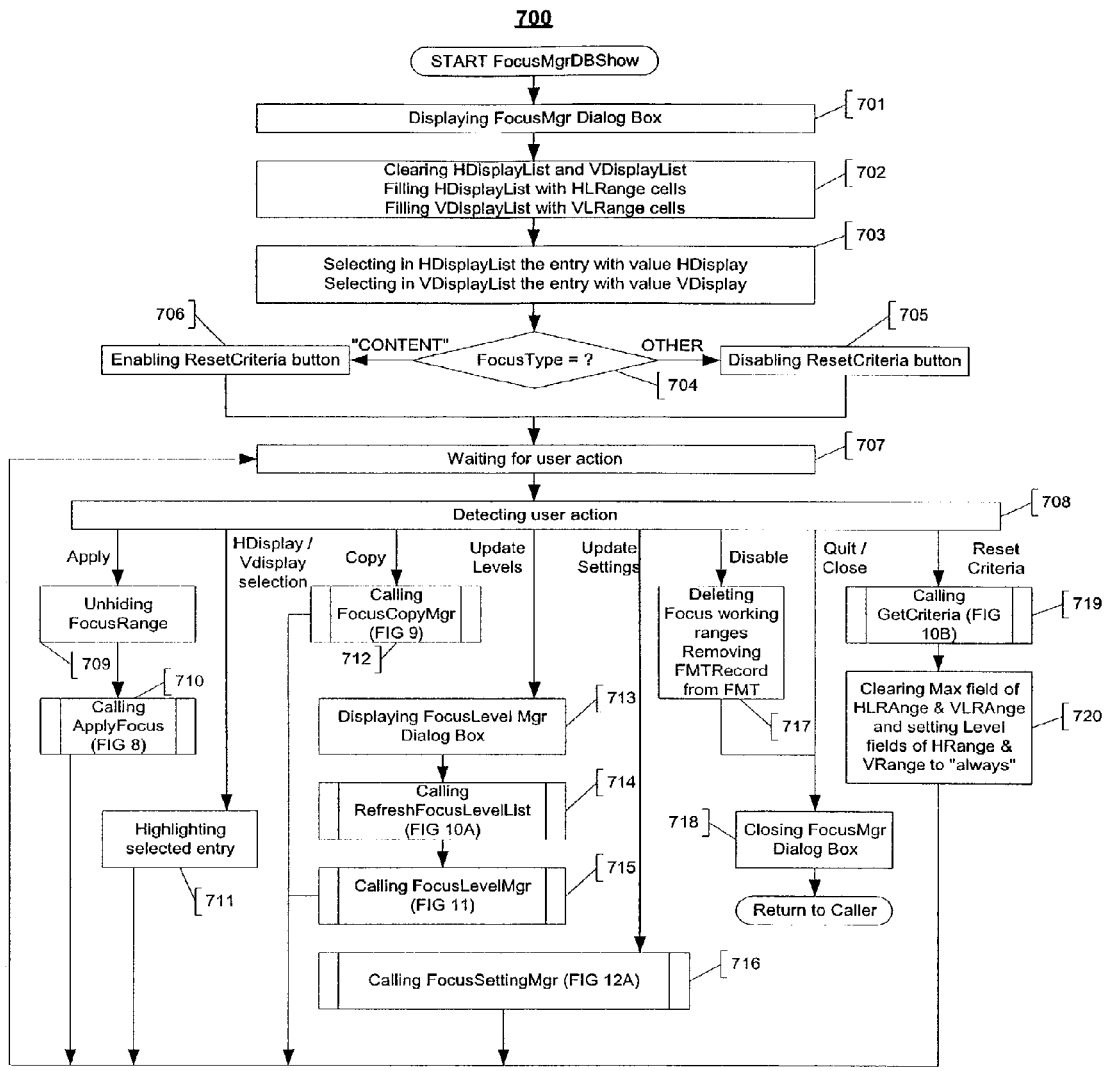
FIG. 7 is a flow chart illustrating a method for executing the "FocusMgrDBShow" routine according to an embodiment of the present invention.

The method for handling the Focus Manager Dialog Box 1601 used in the embodiment of the present invention is summarised in flowchart 700 of FIG. 7. This method can be seen as the processing of the FocusMgrDBShow command.

At step 701, the Focus Manager Dialog Box 1601 is displayed on the display device 106.

At step 702, the local lists HDisplayList and VDisplayList respectively appearing in the list boxes 1615 and 1605 of the Focus Manager Dialog Box 1601 are cleared. Then the local list HDisplayList is initialised with the values of the cells belonging to the range of cells HLRange, so that the list box 1615 displays the horizontal focus levels recorded in the range of cells HLRange. Then the local list VDisplayList is initialised with the values of the cells belonging to the range of cells VLRange, so that the list box 1605 displays the vertical focus levels recorded in the range of cells VLRange.

At step 703, the entry of the local list HDisplayList which value is equal to the value of the local variable HDisplay is selected, so that the horizontal display focus level be selected in the list box 1615. Then the entry of the local list VDisplayList which value is equal to the value of the local variable VDisplay is selected, so that the vertical display focus level be selected in the list box 1605.

At step 704, a test is performed to check whether or not the local variable Focus Type is equal to CONTENT. If it is the case, then control is given to step 706 otherwise control is given to step 705.

At step 705, the "Reset Criteria" push-button 1611 is disabled so that any future click on it with the pointing device 105 will not be recognised as a valid event. Then control is given to step 707.

At step 706, the "Reset Criteria" push-button 1611 is enabled so that any future click on it with the pointing device 105 will be recognised as a valid event At step 707, the method is in a wait state, waiting for a user action on the Focus Manager Dialog Box 1601. Such user action is typically resulting from a click with the pointing device 105, but can take other similar forms such as, but not limited to a specific combination of key on the keyboard 104, or any other similar means not further specified here.

At step 708, an event is detected, as a result of a user action.

If the user action is a click on the "Apply" push-button 1403, then control is given to step 709.

If the user action is the selection of a new horizontal display focus level in the list box 1615 or of a new vertical display focus level in the list box 1605, then control is given to step 711.

If the user action is a click on the "Copy Visible art on Clipboard" push-button 1612, then control is given to step 712.

If the user action is a click on the "Update levels" push-button 1610, then control is given to step 713.

If the user action is a click on the "Disable Focus" push-button 1609, then control is given to step 717.

If the user action is a click on the "Reset Criteria" push-button 1611, then control is given to step 719.

If the user action is a click on the "Quit" push-button 1608, or on the closing-window push-button 1602, then control is given to step 713.

If the user action is a click on the "Update Settings" push-button 1607, then control is given to step 716.

At step 709, the range of cells FocusRange is fully displayed, so that it does not comprise any hidden elements, rows or columns.

At step 710, the command ApplyFocus is issued to launch the corresponding method for applying the defined focus levels on the currently managed FMROC. When this ApplyFocus command returns control to the FocusMgrDBShow command, control is given to step 707.

At step 711, the selected entry within the list box 1615 or 1605 is highlighted, so that the spreadsheet user can easily recognised that this is the currently selected entry in the list box 1615 or 1605.

At step 712, the command FocusCopyMgr is issued to launch the corresponding method for copying onto the clipboard the visible part of the range of cells FocusRange. When this FocusCopyMgr command returns control to the FocusMgrDBShow command, control is given to step 715.

At step 713, the Focus Level Manager Dialog Box 1701 is displayed on the display device 106.

At step 714, the command RefreshFocusLevelList is issued to launch that the corresponding method for refreshing the focus level lists of the currently managed FMROC. When this RefreshFocusLevelList command returns control to the FocusMgrDBShow command, control is given to step 715.

At step 715, the command FocusLevelMgr is issued to launch the corresponding method for managing the focus levels of the currently managed FMROC. When this FocusLevelMgr command returns control to the FocusMgrDBShow command, control is given to step 707.

At step 716, the command FocusSettingMgr is issued to launch the corresponding method for managing the focus level settings defined for the currently managed FMROC. When this FocusSettingMgr command returns control to the FocusMgrDBShow command, control is given to step 707.

At step 717, the four focus manager working tables HLRange 1320, VLRange 1330, HRange 1340 and VRange 1350 which respective names are comprised in the "HLRange" field 1308, "VLRange" field 1309, "HRange" field 1312 and "VRange" field 1313 of the FMTRecord record 1302, are deleted. Then the FMTRecord record 1302 is removed from the FMT table 1301.

At step 718, the Focus Level Manager Dialog Box 1701 is closed on the display device 106. Then the execution of the FocusMgrDBShow command completes as control is returned back to the calling method having issued the FocusMgrDBShow command.

At step 719, the command GetCriteria is issued to launch the corresponding method for retrieving the "Horizontal Criteria" columns and the "Vertical Criteria" row. When this GetCriteria command returns control to the FocusMgrDBShow command, control is given to step 720.

At step 720, all the "Max" fields 1323 of the range of cells HLRange are cleared (content set to void), and all the "Max" fields 1333 of the range of cells VLRange are cleared (content set to void). Then all the "Hlevel" fields 1343 of the range of cells HRange are set to "always", and all the "Vlevel" fields 1343 of the range of cells VRange are set to "always". Then control is given to step 707.

E6. Apply Focus Method

Figure 8:
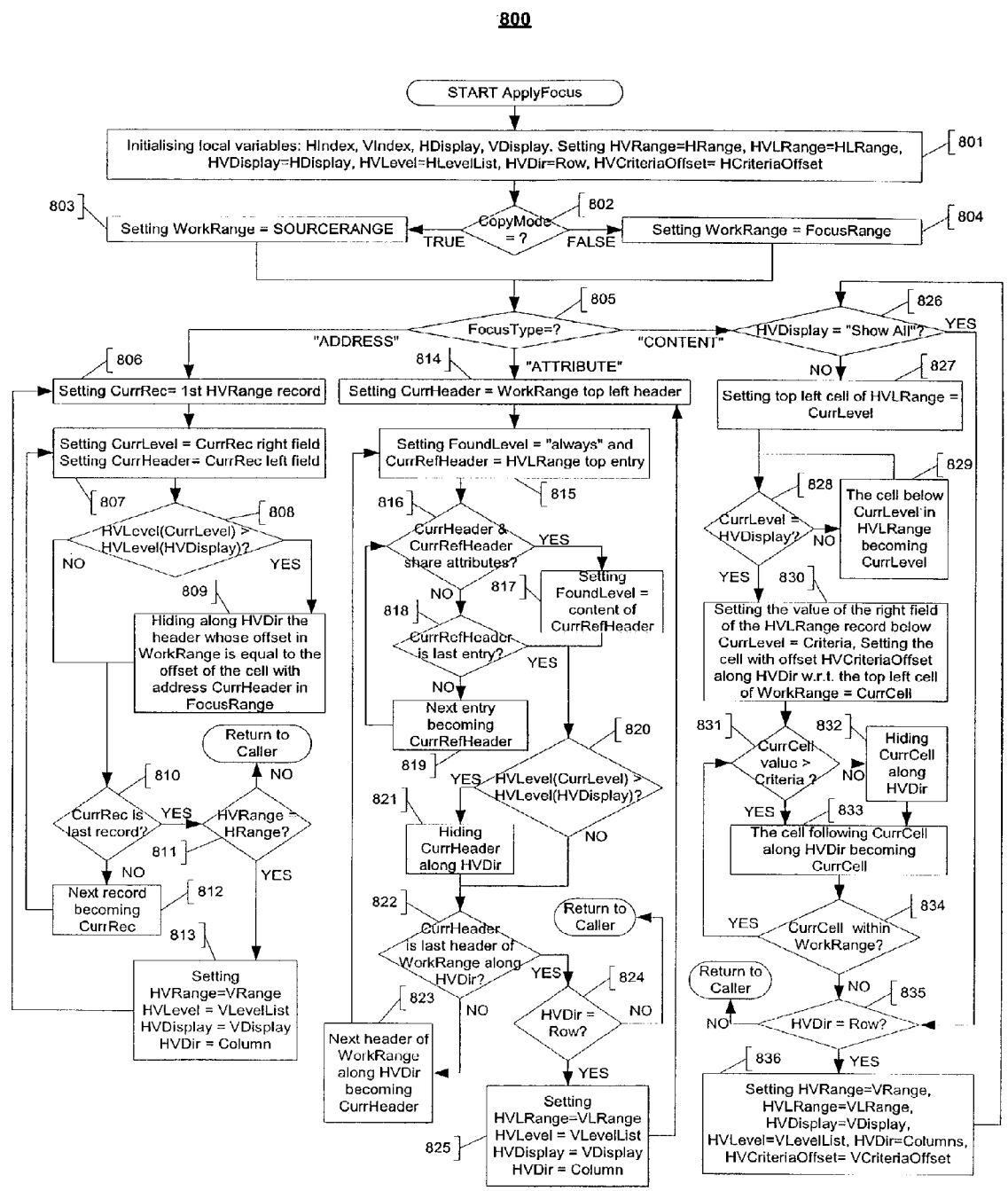
FIG. 8 is a flow chart illustrating a method for executing the "ApplyFocus" routine according to an embodiment of the present invention.

The method for applying on a FMROC the focus level settings in order to either display or hide FMROC elements used in the embodiment of the present invention is summarised in flowchart 800 of FIG. 8. This method can be seen as the processing of the ApplyFocus command.

At step 801, some local variables are initialised:
the local variable HIndex is initialised as being the index of the horizontal focus display level selected within the list box 1615 showing the horizontal focus levels.
the local variable VIndex is initialised as being the index of the vertical focus display level selected within the list box 1605 showing the vertical focus levels.
the local variable HDisplay is initialised as being the name of the horizontal focus display level selected within the list box 1615 showing the horizontal focus levels.
the local variable VDisplay is initialised as being the name of the vertical focus display level selected within the list box 1605 showing the vertical focus levels.
Then the local variable HVLRange is set equal to the local variable HLRange, the local variable HVRange is set equal to the local variable HRange, the local variable HVDisplay is set equal to the local variable HDisplay, the local list HVLevel is set equal to the local list HLevelList, the local variable HVDir is set equal to "Row", and the local variable HVCriteriaOffset is set equal to the local variable HCriteriaOffset.

At step 802, a test is performed to check whether or not the local variable CopyMode is equal to TRUE. If it is the case, then control is given to step 803; otherwise control is given to step 804.

At step 803, the local variable WorkRange is set equal to the range of cells named SOURCERANGE. Then control is given to step 805.

At step 804, the local variable WorkRange is set equal to the range of cells FocusRange.

At step 805, a test is performed to determine the value of the local variable Focus Type.

If the value of the local variable Focus Type is equal to ADDRESS, then control is given to step 806.

If the value of the local variable Focus Type is equal to ATTRIBUTE, then control is given to step 814. If the value of the local variable Focus Type is equal to CONTENT, then control is given to step 826.

At step 806, the local variable CurrRec is set as the first record of the range of cells HVRange.

At step 807, the local variable CurrLevel is set as the right field of the record CurrRec, and the local variable CurrHeader is set as the left field of the record CurrRec.

At step 808, a test is performed to check whether or not the element CurrLevel of the local list HVLevel has a value greater than the element HVDisplay of the local list HVLevel. If it is the case, then control is given to step 809; otherwise control is given to step 810.

At step 809, the method hides along the direction HVDir the header cell which offset within the range of cells WorkRange is equal to the offset within the range of cells FocusRange of the cell which address is equal to the content of the local variable CurrHeader.

At step 810, a test is performed to check whether or not the record CurrRec is the last record of the range of cells HVRange. If it is the case, then control is given to step 811; otherwise control is given to step 812.

At step 811, a test is performed to check whether or not the local variable HVRange is equal to the range of cells HRange. If it is the case, then control is given to step 813; otherwise the execution of the ApplyFocus command completes as control is returned back to the calling method having issued the ApplyFocus command.

At step 812, the local variable CurrRec becomes the record following the previous position of the record CurrRec in the range of cells HVRange.

At step 813, the local variable HVRange is set equal to the local variable VRange, the local variable HVDisplay is set equal to the local variable VDisplay, the local list HVLevel is set equal to the local list VLevelList, the local variable HVDir is set equal to "Column". Then control is given to step 806.

At step 814, the local variable CurrHeader is set as the top left header cell of the range of cells WorkRange.

At step 815, the local variable FoundLevel is initialised with the value "always" and the local variable CurrRefHeader is set as the top left cell of the range of cells HVLRange.

At step 816, a test is performed to check whether or not the cells CurrHeader and CurrRefHeader share the same display attributes. In an embodiment of the present invention, these display attributes correspond to the background colour,
the background pattern,
the font size, the font name,
the font colour,
the font bold attribute,
the font underline attribute,
the font italic attribute,
the text horizontal alignment,
the text vertical alignment,
the text orientation,
the text rotation and
the text wrapped attribute,
but any other similar display attributes could be used instead without departing from the spirit of the present invention. If it is the case, then control is given to step 817; otherwise control is given to step 818.

At step 817, the local variable FoundLevel is set equal to the content of the cell CurrRefHeader. Then control is given to step 820.

At step 818, a test is performed to check whether or not the cell CurrRefHeader is on the last record of the range of cells HVLRange. If it is the case, then control is given to step 820; otherwise control is given to step 819.

At step 819, the local variable CurrRefHeader becomes the cell just below the former position of the CurrRefHeader cell. Then control is given to step 816.

At step 820, a test is performed to check whether or not the element CurrLevel of the local list HVLevel has a value greater than the element HVDisplay of the local list HVLevel. If it is the case, then control is given to step 821; otherwise control is given to step 822.

At step 821, the method hides along the direction HVDir the cell CurrHeader.

At step 822, a test is performed to check whether or not the cell CurrHeader is the last header of the range of cells WorkRange along the HVDir direction. If it is the case, then control is given to step 824; otherwise control is given to step 823.

At step 823, the local variable CurrHeader becomes the header cell of the range of cells WorkRange following along the direction HVDir the former position of the local variable CurrHeader.

At step 824, a test is performed to check whether or not the local variable HVDir is equal to "Row". If it is the case, then control is given to step 825; otherwise the execution of the ApplyFocus command completes as control is returned back to the calling method having issued the ApplyFocus command.

At step 825, the local variable HVLRange is set equal to the local variable VLRange, the local variable HVDisplay is set equal to the local variable VDisplay, the local list HVLevel is set equal to the local list VLevelList, the local variable HVDir is set equal to "Column". Then control is given to step 814.

At step 826, a test is performed to check whether or not the local variable HVDisplay is equal to "Show All". If it is the case, then control is given to step 835; otherwise control is given to step 827.

At step 827, the local variable CurrLevel is set equal to the top left cell of the range of cells HVLRange.

At step 828, a test is performed to check whether or not the local variable HVDisplay is equal to the value of the local variable CurrLevel. If it is the case, then control is given to step 830; otherwise control is given to step 829.

At step 829, the local variable CurrLevel is set equal to the cell immediately below the former position of the local variable CurrLevel. Then control is given to step 828.

At step 830, the local variable Criteria is set equal to the value of the right field of the record of the range of cells HVLRange located immediately below the local variable CurrLevel. Then the local variable CurrCell is set equal to the cell which offset along the direction HVDir with respect to the top left cell of the range of cells WorkRange is equal to the local variable HVCriteriaOffset.

At step 831, a test is performed to check whether or not the value of the cell CurrCell is greater than the value of the local variable Criteria. If it is the case, then control is given to step 833; otherwise control is given to step 832.

At step 832, the method hides along the direction HVDir the cell CurrCell.

At step 833, the local variable CurrCell is set to the cell immediately below the former position of the local variable CurrCell.

At step 834, a test is performed to check whether or not the cell CurrCell is located within the range of cells WorkRange. If it is the case, then control is given to step 831; otherwise control is given to step 835.

At step 835, a test is performed to check whether or not the local variable HVDir is equal to "Row". If it is the case, then control is given to step 836; otherwise the execution of the ApplyFocus command completes as control is returned back to the calling method having issued the ApplyFocus command.

At step 836, the local variable HVRange is set equal to the local variable VRange, the local variable HVLRange is set equal to the local variable VLRange, the local variable HVDisplay is set equal to the local variable VDisplay, the local list HVLevel is set equal to the local list VLevelList, the local variable HVDir is set equal to "Column", and the local variable HVCriteriaOffset is set equal to the local variable VCriteriaOffset. Then control is given to step 826.

E7. Focus Copy Manager Method

Figure 9:
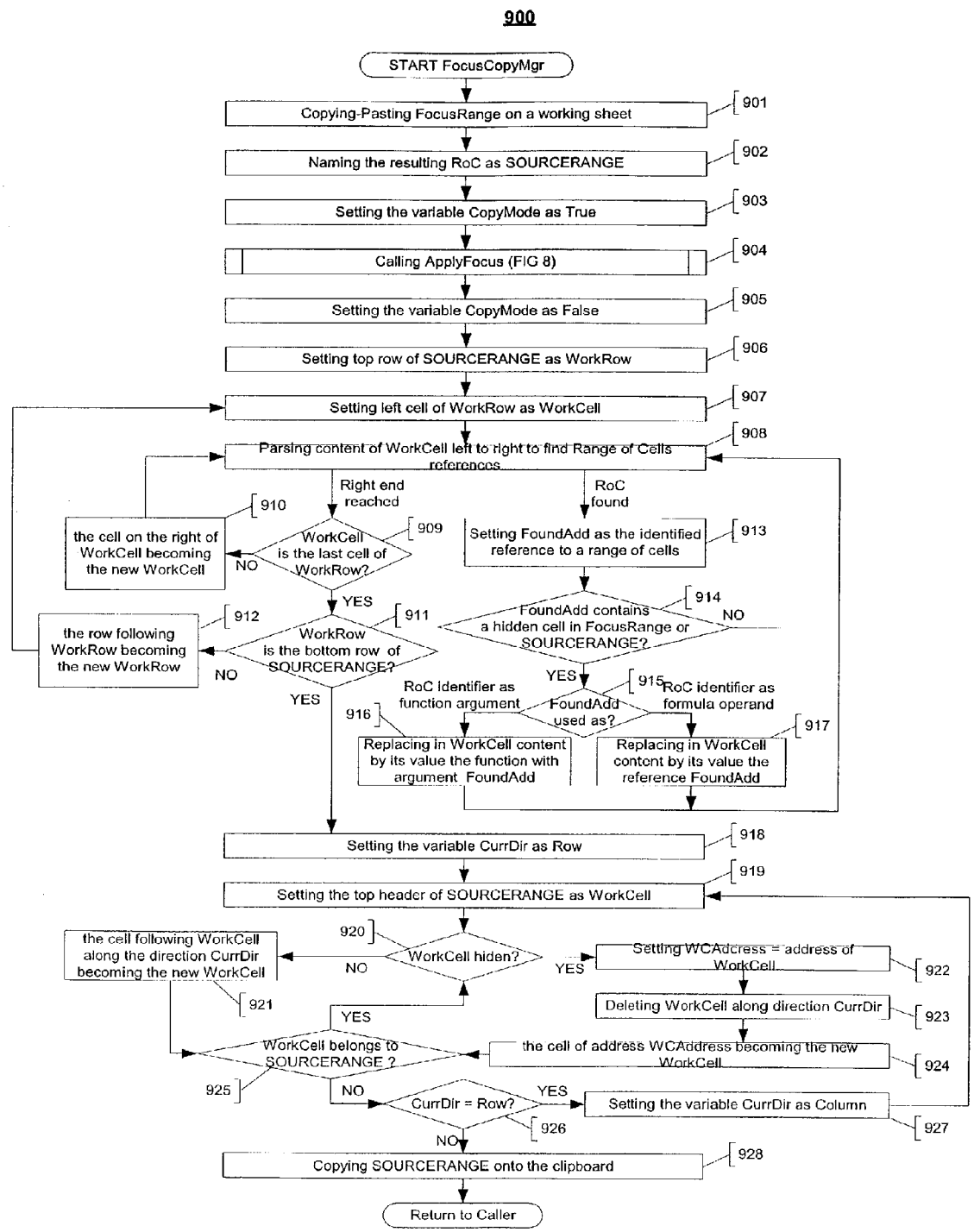
FIG. 9 is a flow chart illustrating a method for executing the "FocusCopy" routine according to an embodiment of the present invention.

The method for copying onto the clipboard the visible part of a FMROC used in the embodiment of the present invention is summarised in flowchart 900 of FIG. 9. This method can be seen as the processing of the FocusCopyMgr command.

At step 901, the range of cells FocusRange is copy-pasted on a working sheet using conventional copy-paste tools available in spreadsheet environments.

At step 902, the range of cells resulting from the copy-paste operation performed at step 901 is named as the range of cells SOURCERANGE.

At step 903, the local variable CopyMode is set equal to TRUE.

At step 904, the command ApplyFocus is issued to launch the corresponding method for applying the defined focus levels on the range of cells SOURCERANGE. When this ApplyFocus command returns control to the FocusCopyMgr command, control is given to step 905.

At step 905, the local variable CopyMode is set equal to FALSE.

At step 906, the local variable WorkRow is set equal to the top row of the range of cells SOURCERANGE.

At step 907, the local variable WorkCell is set equal to the left most cell of the row WorkRow.

At step 908, the content of the cell represented by the local variable WorkCell is parsed in the left-to-right direction to identify any reference to a range of cells. Such a reference can either be the address of a range of cells, or the name of a named range of cells. Such a referenced range of cells can either comprise a single individual cell, or a collection of individual cells.

If the right end of the content of the cell represented by the local variable WorkCell is reached without identify any reference to a range of cells not yet identified, then control is given to step 909.

If a reference to a range of cells not yet identified is found while parsing the content of the cell represented by the local variable WorkCell, then control is given to step 913.

It must be noted that any future parsing operation of the content of the same cell will resume for this step 908 at the position reached during the last parsing operation (to avoid parsing multiple times the same part of the cell content).

At step 909, a test is performed to check whether or not the cell represented by the local variable WorkCell is the last cell (the right most cell) of the row WorkRow. If it is the case, then control is given to step 911; otherwise control is given to step 910.

At step 910, the cell located immediately on the right of the cell represented by the local variable WorkCell becomes the new cell represented by the local variable WorkCell. Then control is given to step 908.

At step 911, a test is performed to check whether or not the row represented by the local variable WorkRow is the bottom row of the range of cells SOURCERANGE. If it is the case, then control is given to step 918; otherwise control is given to step 912.

At step 912, the row located immediately below the row represented by the local variable WorkRow becomes the new row represented by the local variable WorkRow. Then control is given to step 907.

At step 913, the local variable FoundAdd is set equal to the range of cells identified through a reference while parsing at step 908 the content of the cell represented by the local variable WorkCell.

At step 914, a test is performed to determine:

if the range of cells FoundAdd comprises at least a hidden cells belonging to the range of cells SOURCERANGE, or if there is at least a hidden cell in the range of cells which relative offset within the range of cells SOURCERANGE is equal to the relative offset of FoundAdd within the range of cells FocusRange.

In other words, this test determines whether or not the range of cells FoundAdd comprises at least a cell which would not displayed on the display device 106, as a result of the ApplyFocus operation. If it is the case, then control is given to step 915; otherwise control is given to step 908 for continuing the parsing of the cell represented by the local variable WorkCell at the position occupied by the previous parsing operation of step 908.

At step 915, a test is performed to determine how the range of cells FoundAdd is referenced in the content of the cell represented by the local variable WorkCell. If FoundAdd is referenced as a range of cells identifier in an argument of a function (for example as a database table identifier in a database function), then control is given to step 916; otherwise FoundAdd is referenced as a range of cells identifier as a formula operand, and control is given to step 917.

At step 916, the content of the cell represented by the local variable WorkCell is updated by replacing by its value the function which one of the arguments is equal to FoundAdd. As an example:

if the content of the cell represented by the local variable WorkCell is equal to "@DSUM(SALES;"COMM"; BROKER="Smith")* CURRENCY", and if FoundAdd is equal to the range of cells named SALES, then the content of the cell represented by the local variable WorkCell becomes "12300*CURRENCY" if the value of the function @DSUM(SALES;"COMM"; BROKER="Smith") is equal to 12300. Then control is given to step 908 for continuing the parsing of the cell represented by the local variable WorkCell at the position occupied by the previous parsing operation of step 908.

At step 917, the content of the cell represented by the local variable WorkCell is updated by replacing by its value the operand FoundAdd. As an example:

if the content of the cell represented by the local variable WorkCell is equal to "@DSUM(SALES;"COMM"; BROKER="Smith")*CURRENCY" and if FoundAdd is equal to the cell named CURRENCY, then the content of the cell represented by the local variable WorkCell becomes "©DSUM(SALES;"COMM"; BROKER="Smith")*1.106" if the value of the cell named CURRENCY is equal to 1.106. Then control is given to step 908 for continuing the parsing of the cell represented by the local variable WorkCell at the position occupied by the previous parsing operation of step 908.

At step 918, the local variable CurrDir is set equal to "Row"

At step 919, the local variable WorkCell is set equal to the top left header cell of the range of cells SOURCERANGE.

At step 920, a test is performed to check whether or not the cell WorkCell is hidden. If it is the case, then control is given to step 922; otherwise control is given to step 921.

At step 921, the local variable WorkCell becomes the cell following, along the direction CurrDir, the previous position of the cell WorkCell. Then control is given to step 925.

At step 922, the local variable WCAddress is set equal to the address of the cell WorkCell.

At step 923, the cell WorkCell is deleted along the direction CurrDir.

At step 924, the local variable WorkCell is set equal to the cell which address is equal to the local variable WCAddress.

At step 925, a test is performed to check whether or not the cell WorkCell belongs to the range of cells SOURCERANGE. If it is the case, then control is given to step 920; otherwise control is given to step 926.

At step 926, a test is performed to check whether or not the local variable CurrDir is equal to "Row". If it is the case, then control is given to step 927; otherwise control is given to step 928.

At step 927, the local variable CurrDir is set equal to "Column". Then control is given to step 907.

At step 928, the range of cells SOURCERANGE is copied onto the clipboard. This completes the execution of the FocusCopyMgr command as control is returned back to the calling method having issued the FocusCopyMgr command.

E8. Refresh Focus Level List Method

Figure 10A:
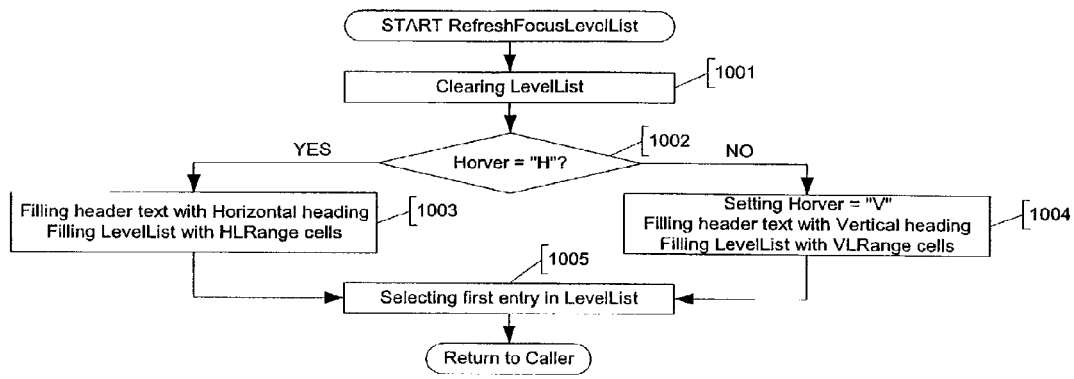
FIG. 10A is a flow chart illustrating a method for executing the "RefreshFocusLevelList" routine according to an embodiment of the present invention.

The method for refreshing the focus level list of a FMROC, displayed within the Focus Level Manager Dialog Box 1701 used in the embodiment of the present invention is summarised in flowchart 1000 of FIG. 10A. This method can be seen as the processing of the RefreshFocusLevelList command.

At step 1001, the local list LevelList appearing in the list box 1712 of the Focus Level Manager Dialog Box 1701 is cleared.

At step 1002, a test is performed to determine the value of the local variable Horver. If it is equal to "H", then control is given to step 1003; otherwise control is given to step 1004.

At step 1003, the label box 1713 of the Focus Level Manager Dialog Box 1701 is filled with the text "Horizontal Focus Levels". Then the local list LevelList is initialised with the values of the cells belonging to the range of cells HLRange, so that the list box 1712 displays the horizontal focus levels recorded in the range of cells HLRange. Then control is given to step 1005.

At step 1004, the local variable Horver is initialised to the value "V". Then the label box 1713 of the Focus Level Manager Dialog Box 1701 is filled with the text "Vertical Focus Levels". Then the local list LevelList is initialised with the values of the cells belonging to the range of cells VLRange, so that the list box 1712 displays the vertical focus levels recorded in the range of cells VLRange At step 1005, the first entry of the local list LevelList is selected, so that it appears in the list box 1712 with dark background colour. This completes the execution of the RefreshFocusLevelList command as control is returned back to the calling method having issued the RefreshFocusLevelList command.

E9. Get Criteria Method

Figure 10B:
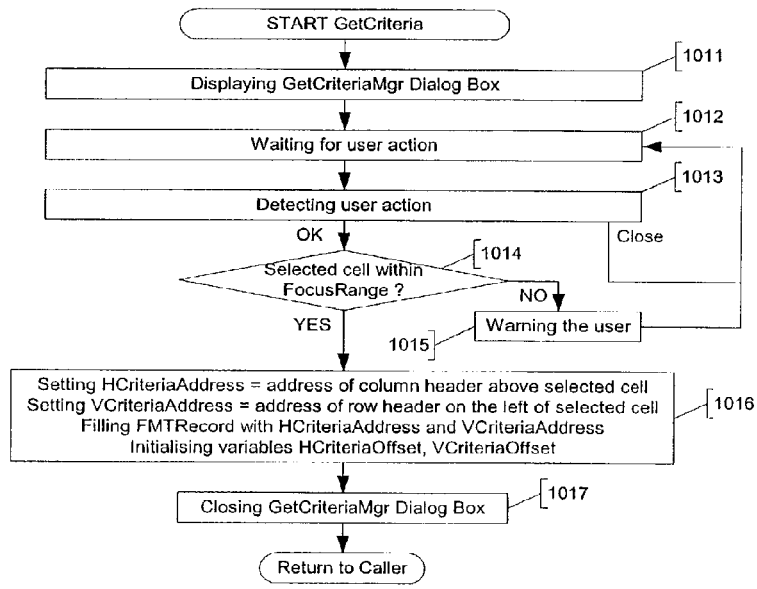
FIG. 10B is a flow chart illustrating a method for executing the "GetCriteria" routine according to an embodiment of the present invention.

The method for interfacing the spreadsheet user to get the "Horizontal Criteria" column and the "Vertical Criteria" row for a FMROC having a FocusType equal to CONTENT, used in the embodiment of the present invention is summarised in flowchart 1010 of FIG. 10B. This method can be seen as the processing of the GetCriteria command.

At step 1011, the Focus Criteria Manager Dialog Box 1501 is displayed on the display device 106.

At step 1012, the method is in a wait state, waiting for a user action on the Focus Criteria Manager Dialog Box 1501. Such user action is typically resulting from a click with the pointing device 105, but take other similar forms such as, but not limited to a specific combination of key on the keyboard 104, or any other similar means not further specified here.

At step 1013, an event is detected, as a result of a user action.

If the user action is a click on the "OK" push-button 1503, then control is given to step 1014.

If the user action is a click on the closing-window push-button 1502, then control is given to step 1012.

At step 1014, a test is performed to check whether or not the currently selected cell is located within the range of cells FocusRange. If it is the case, then control is given to step 1016; otherwise control is given to step 1015.

At step 1015, a warning message notification is issued to inform the user that the currently selected cell must be located within the currently managed FMROC. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 1012.

At step 1016, the local variable HCriteriaAddress is initialised with the address of the cell ("Horizontal Criteria") column header located above the selected cell within the range of cells FocusRange. Then the local variable VCriteriaAddress is initialised with the address of the cell ("Vertical Criteria") row header located on the left of the selected cell within the range of cells FocusRange. Then the field "HCriteria" 1315 of the FMTRecord 1302 is initialised with the value of the local variable HCriteriaAddress. Then the field "VCriteria" 1316 of the FMTRecord 1302 is initialised with the value of the local variable VCriteriaAddress. Then the local variable HCriteriaOffset is set equal to the column offset of the "Horizontal Criteria" column with respect to the range of cells FocusRange, and the local variable VCriteriaOffset is set equal to the row offset of the "Vertical Criteria" row with respect to the range of cells FocusRange.

At step 1017, the Focus Criteria Manager Dialog Box 1501 is closed on the display device 106. This completes the execution of the GetCriteria command as control is returned back to the calling method having issued the GetCriteria command.

E10. Focus Level Manager Method

Figure 11:
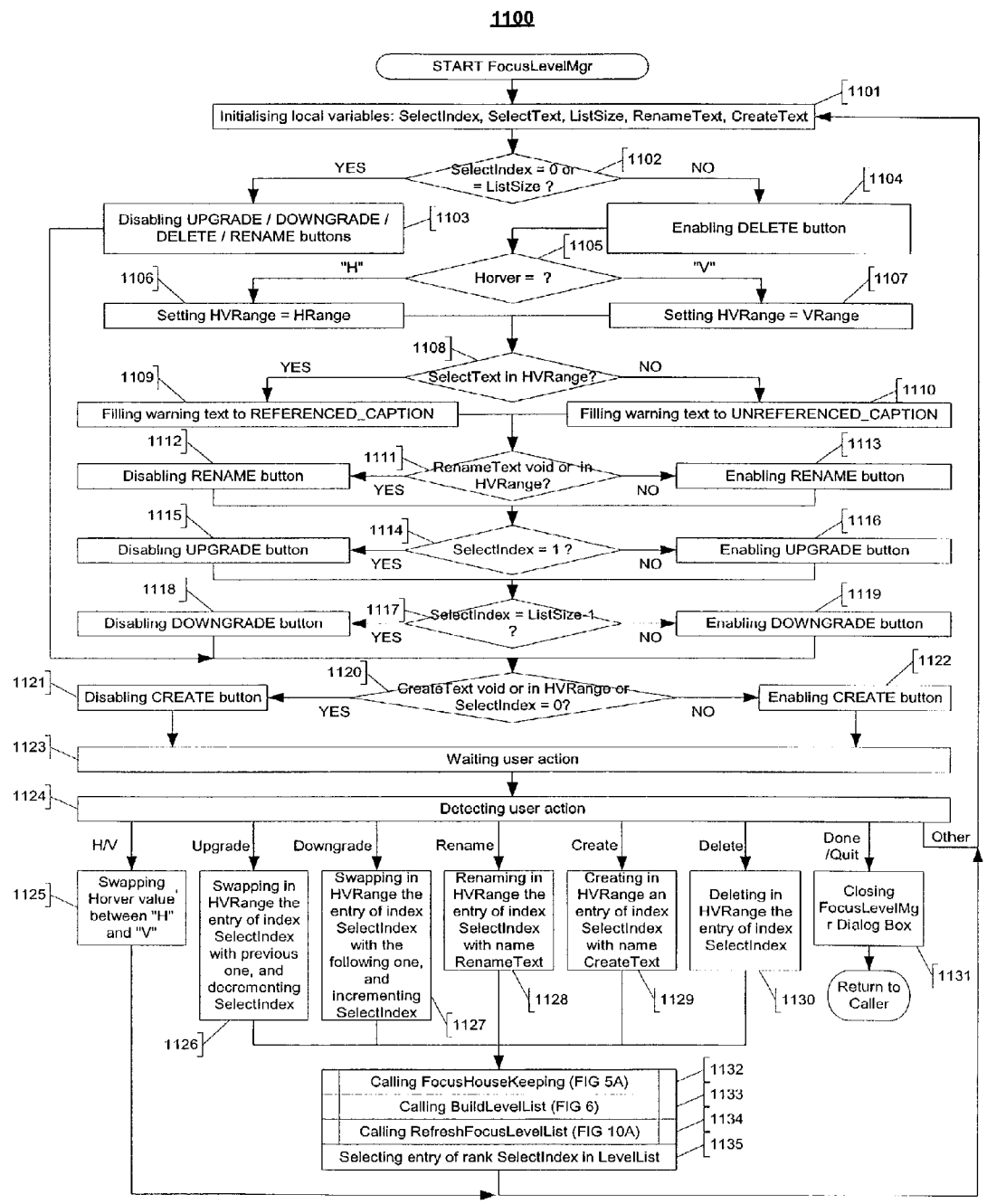
FIG. 11 is a flow chart illustrating a method for executing the "RefreshFocusLevelButton" routine according to an embodiment of the present invention.

The method for managing focus levels associated with a FMROC used in the embodiment of the present invention is summarised in flowchart 1100 of FIG. 11. This method can be seen as the processing of the FocusLevelMgr command.

At step 1101, some local variables are initialised:

The local variable SelectIndex is set equal to the index of the selected focus level entry in the list box 1712 of the Focus Level Manager Dialog Box 1701.

The local variable SelectText is set equal to the name of the selected focus level entry in the list box 1712 of the Focus Level Manager Dialog Box 1701.

The local variable ListSize is set equal to the number of focus levels in the list box 1712 of the Focus Level Manager Dialog Box 1701.

The local variable RenameText is set equal to the content of the text box 1705 of the Focus Level Manager Dialog Box 1701.

The local variable CreateText is set equal to the content of the text box 1706 of the Focus Level Manager Dialog Box 1701.

At step 1102, a test is performed to check whether the value of the local variable SelectIndex is either equal to 0 (zero) or to the value of the local variable ListSize. If it is the case, then control is given to step 1103; otherwise control is given to step 1104.

At step 1103, the push-buttons "Upgrade" 1714, "Downgrade" 1708, "Delete" 1710 and "Rename" 1709 are disabled so that any future click on them with the pointing device 105 will not be recognised as an event. Then control is given to step 1120.

At step 1104, the push-button "Delete" 1710 is enabled, so that any future click on it with the pointing device 105 will be recognised as an event.

At step 1105, a test is performed to check the value of the local variable Horver. If it is found equal to "H", then control is given to step 1106; if it is found equal to "V", then control is given to step 1107.

At step 1106, the local variable HVRange is set equal to the local variable HRange. Then control is given to step 1108.

At step 1107, the local variable HVRange is set equal to the local variable VRange.

At step 1108, a test is performed to determine whether or not the local variable SelectText appears in HVRange. If it is the case, then control is given to step 1109; otherwise control is given to step 1110.

At step 1109, the label box 1704 is filled with the UNREFERENCED_CAPTION text taking the value "Level is referenced". Then control is given to step 1111.

At step 1110, the label box 1704 is filled with the UNREFERENCED_CAPTION text taking the value "Level is not referenced".

At step 1111, a test is performed to check whether the local variable RenameText is either void or belonging to HVRange. If it is the case, then control is given to step 1112; otherwise control is given to step 1113.

At step 1112, the push-button "Rename" 1709 is disabled so that any future click on it with the pointing device 105 will not be recognised as an event. Then control is given to step 1114.

At step 1113, the push-button "Rename" 1709 is enabled so that any future click on it with the pointing device 105 will be recognised as an event.

At step 1114, a test is performed to check whether or not the local variable SelectIndex is equal to 1 (one). If it is the case, then control is given to step 1115; otherwise control is given to step 1116.

At step 1115, the push-button "Upgrade" 1714 is disabled so that any future click on it with the pointing device 105 will not be recognised as an event. Then control is given to step 1117.

At step 1116, the push-button "Upgrade" 1714 is enabled so that any future click on it with the pointing device 105 will be recognised as an event.

At step 1117, a test is performed to check whether or not the local variable SelectIndex is equal to the value of the local variable ListSize decremented by 1 (one). If it is the case, then control is given to step 1118; otherwise control is given to step 1119.

At step 1118, the push-button "Downgrade" 1708 is disabled so that any future click on it with the pointing device 105 will not be recognised as an event. Then control is given to step 1120.

At step 1119, the push-button "Downgrade" 1708 is enabled so that any future click on it with the pointing device 105 will be recognised as an event.

At step 1120, a test is performed to check:
if the local variable Create Text is either void or belonging to HVRange, or
if the local variable SelectIndex is equal to 0 (zero).
If one or both of the above conditions are met, then control is given to step 1121, otherwise control is given to step 1122.

At step 1121, the push-button "Create New" 1707 is disabled so that any future click on it with the pointing device 105 will not be recognised as an event. Then control is given to step 1123.

At step 1122, the push-button "Create New" 1707 is enabled so that any future click on it with the pointing device 105 will be recognised as an event.

At step 1123, the method is in a wait state, waiting for a user action on the Focus Level Manager Dialog Box 1701. Such user action is typically resulting from a click with the pointing device 105, but take other similar forms such as, but not limited to a specific combination of key on the keyboard 104, or any other similar means not further specified here.

At step 1124, an event is detected, as a result of a user action.

If the user action is a click on the "Horiz./Vert." push-button 1715, then control is given to step 1125.

If the user action is a click on the "Upgrade" push-button 1714, then control is given to step 1126.

If the user action is a click on the "Downgrade" push-button 1708, then control is given to step 1127.

If the user action is a click on the "Rename" push-button 1709, then control is given to step 1128.

If the user action is a click on the "Create New" push-button 1707, then control is given to step 1129.

If the user action is a click on the "Delete" push-button 1710, then control is given to step 1130.

If the user action is a click on the "Done/Quit" push-button 1703, or on the closing-window push-button 1702, then control is given to step 1131.

For all the other possible user actions like for instance the selection of a focus level in the list box 1712, control is given to step 1101.

At step 1125, the local variable Horver swaps between the value "H" and the value "V". Then control is given to step 1101.

At step 1126, the entry of HVRange which index is equal to the local variable SelectIndex, is swapped with the previous entry of HVRange, and the local variable SelectIndex is decremented by 1 (one). Then control is given to step 1132.

At step 1127, the entry of HVRange which index is equal to the local variable SelectIndex is swapped with the following entry of HVRange, and the local variable SelectIndex is incremented by 1 (one). Then control is given to step 1132.

At step 1128, the entry of HVRange which index is equal to the local variable SelectIndex is renamed with the name equal to the local variable RenameText. Then control is given to step 1132.

At step 1129, a new entry is created in HVRange, with an index equal to the local variable SelectIndex and a name equal to the local variable Create Text. Then control is given to step 1132.

At step 1130, the entry of HVRange which index is equal to the local variable SelectIndex is deleted. Then control is given to step 1132.

At step 1131, the Focus Level Manager Dialog Box 1701 is closed on the display device 106. This completes the execution of the FocusLevelMgr command as control is returned back to the calling method having issued the FocusLevelMgr command.

At step 1132, the command FocusHouseKeeping is issued to launch the corresponding Focus House Keeping method. When this FocusHouseKeeping command returns control to the FocusLevelMgr command, control is given to step 1133.

At step 1133, the command BuildLevelList is issued to launch the corresponding method building the focus level lists. When this BuildLevelList command returns control to the FocusLevelMgr command, control is given to step 1134.

At step 1134, the command RefreshFocusLevelList is issued to launch the corresponding method for refreshing the focus level lists of the currently managed FMROC. When this RefreshFocusLevelList command returns control to the FocusLevelMgr command, control is given to step 1135.

At step 1135, the focus level which index is equal to the value of the local variable SelectIndex is selected in the list box 1712, so that it is displayed with a dark background colour. Then control is given to step 1101.

E11. Focus Setting Manager Method

Figure 12A:
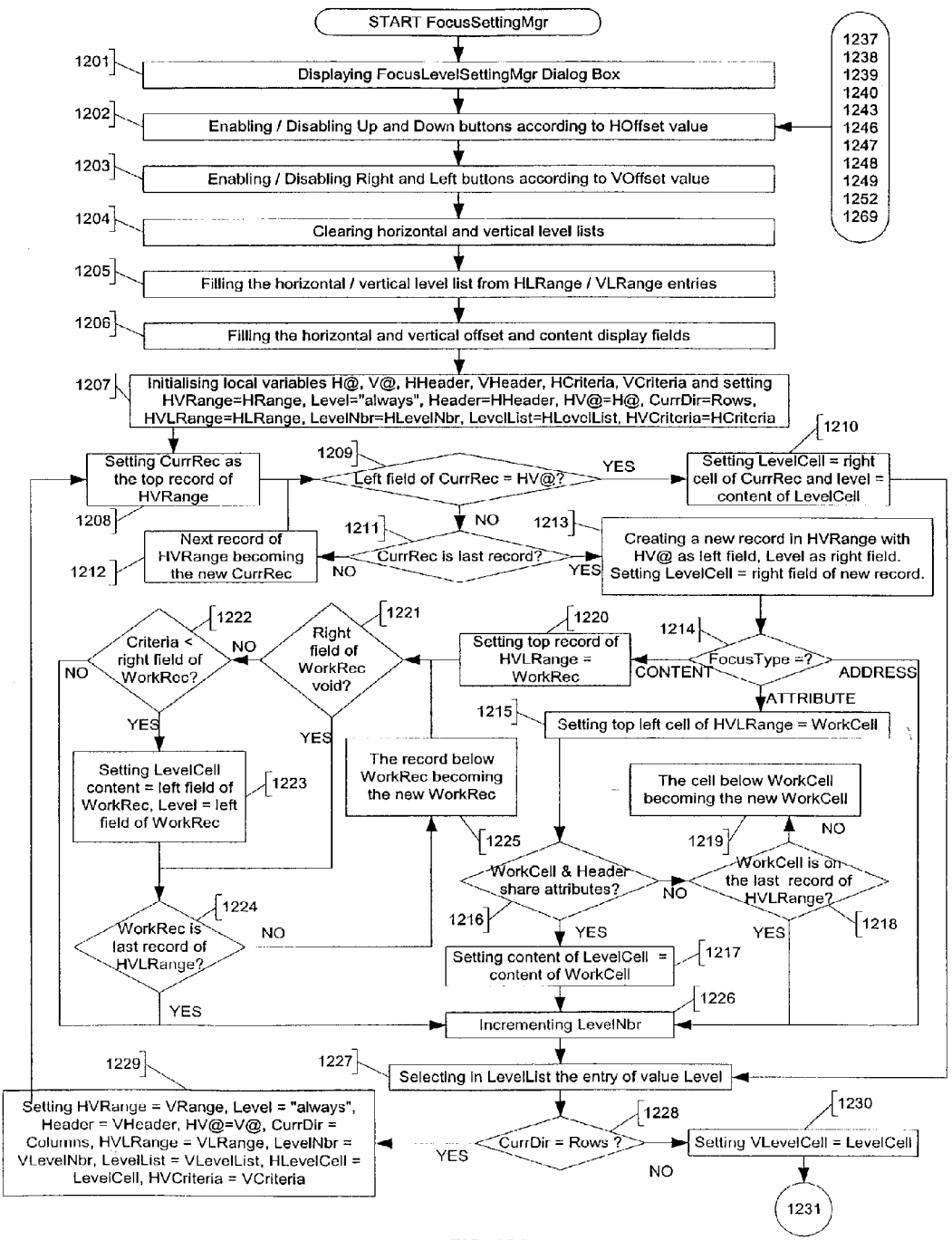
FIGS. 12A and 12B are a flow chart illustrating a method for executing the "FocusLevelSettingMgrDBShow" command according to an embodiment of the present invention.
Figure 12B:
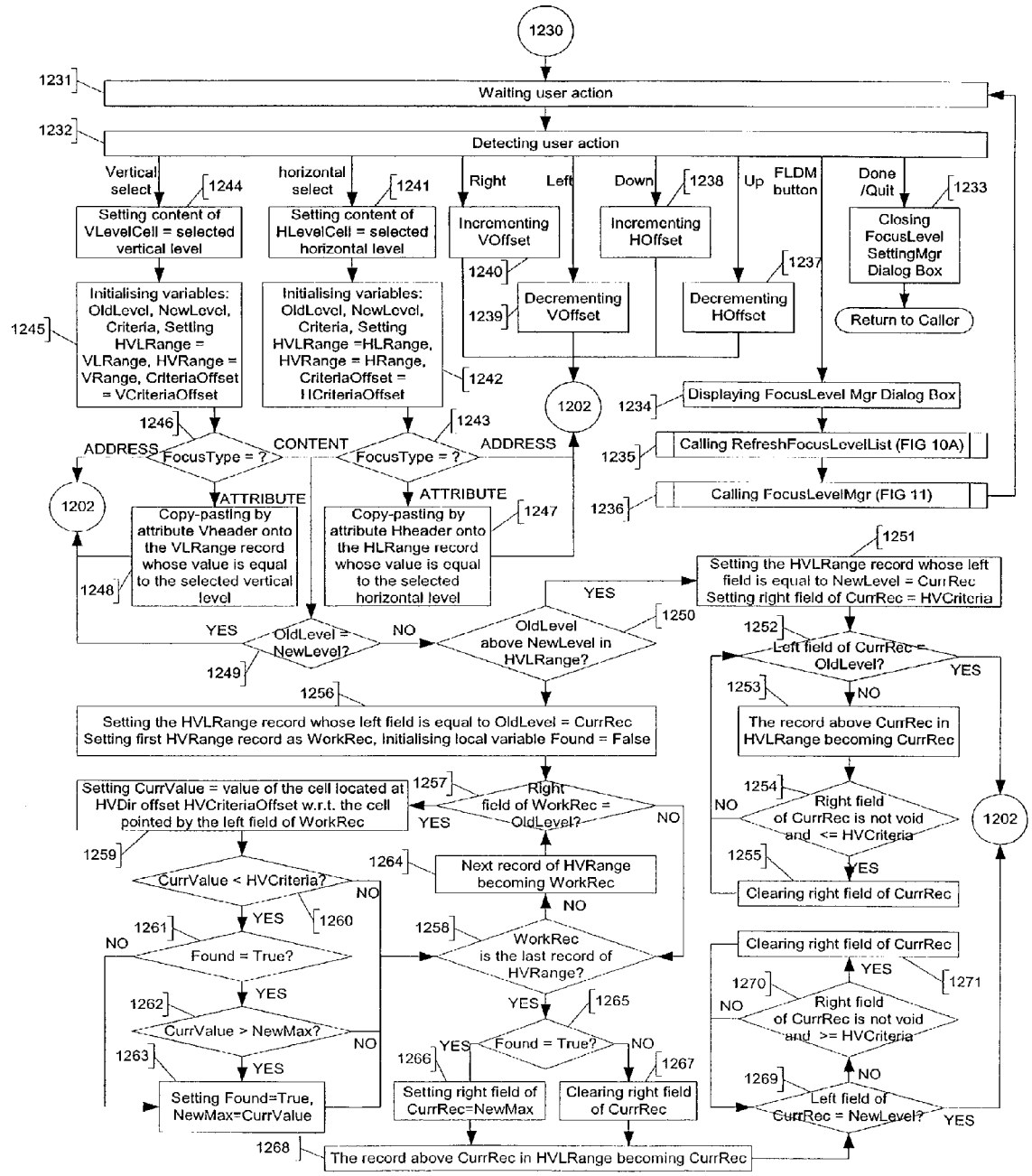

The method for managing the focus level settings associated with a FMROC used in the embodiment of the present invention is summarised in flowcharts 1200 (1/2) of FIGS. 12A and 1200 (2/2) of FIG. 12B. This method can be seen as the processing of the FocusSettingMgr command.

At step 1201, the Focus Setting Manager Dialog Box 1801 is displayed on the display device 106.

At step 1202, several tests are performed on the local variable HOffset to determine whether the push-buttons "Up" 1811 and "Down" 1810 have to be either enabled or disabled.

If the local variable HOffset is found equal to 0 (zero), then the push-button "Up" 1811 is disabled, so that any future click on it with the pointing device 105 will not be treated as a valid event.

If the local variable HOffset is found different from 0 (zero), then the push-button "Up" 1811 is enabled, so that any future click on it with the pointing device 105 will be treated as a valid event.

If the local HOffset is found equal to the number of rows in the range of cells FocusRange, then the push-button "Down" 1810 is disabled, so that any future click on it with the pointing device 105 will not be treated as a valid event.

If the local variable HOffset is found different from the number of rows in the range of cells FocusRange, then the push-button "Down" 1810 is enabled, so that any future click on it with the pointing device 105 will be treated as a valid event.

At step 1203, several tests are performed on the local variable VOffset to determine whether the push-buttons "Right" 1807 and "Left" 1809 have to be either enabled or disabled.

If the local variable VOffset is found equal to 0 (zero), then the push-button "Left" 1809 is disabled, so that any future click on it with the pointing device 105 will not be treated as a valid event.

If the local variable VOffset is found different from 0 (zero), then the push-button "Left" 1809 is enabled, so that any future click on it with the pointing device 105 will be treated as a valid event.

If the local VOffset is found equal to the number of columns in the range of cells FocusRange, then the push-button "Right" 1807 is disabled, so that any future click on it with the pointing device 105 will not be treated as a valid event.

If the local variable VOffset is found different from the number of columns in the range of cells FocusRange, then the push-button "Right" 1807 is enabled, so that any future click on it with the pointing device 105 will be treated as a valid event.

At step 1204, the horizontal and vertical level lists, respectively displayed in the list boxes 1814 and 1805 are cleared, so that these list boxes display an empty content on the display device 106.

At step 1205, the list box 1814 of the Focus Setting Manager Dialog Box 1801 is filled with the horizontal levels defined within the range of cells HLRange 1320 as the ordered set of "HLevel" fields 1322 within the records 1321. Then the list box 1805 of the Focus Setting Manager Dialog Box 1801 is filled with the vertical levels defined within the range of cells VLRange 1330 as the ordered set of "VLevel" fields 1332 within the records 1331.

At step 1206, the "Offset" label box 1816 is filled with the value of the local variable HOffset, and the "Offset" label box 1803 is filled with the value of the local variable VOffset. Then the "Content" label box 1815 is filled with the content of the header cell which horizontal offset with respect to the top left cell of the range of cells FocusRange is equal to the value of the local variable HOffset, and the "Content" label box 1804 is filled with the content of the header cell which vertical offset with respect to the top left cell of the range of cells FocusRange is equal to the value of the local variable VOffset.

At step 1207, several local variables are initialised:

The local variable H@ is set equal to a character string pointing to the address of the header cell which horizontal offset with respect to the top left cell of the range of cells FocusRange is equal to the value of the local variable HOffset.

The local variable V@ is set equal to a character string pointing to the address of the header cell which vertical offset with respect to the top left cell of the range of cells FocusRange is equal to the value of the local variable VOffset.

The local variable HHeader is set equal to the cell pointed by the local variable H@.

The local variable VHeader is set equal to the cell pointed by the local variable V@.

The local variable HCriteria is set equal to the value of the cell located at the intersection of the row which offset with respect to the top row of the range of cells FocusRange is equal to the local variable HOffset, and of the "Horizontal Criteria" column which offset with respect to the leftmost column of the range of cells FocusRange is equal to the local variable HCriteriaOffset.

The local variable VCriteria is set equal to the value of the cell located at the intersection of the column which offset with respect to the leftmost column of the range of cells FocusRange is equal to the local variable VOffset, and of the "Vertical Criteria" row which offset with respect to the top row of the range of cells FocusRange is equal to the local variable VCriteriaOffset.

The local variable Level is initialised with the value "always".

The local variable CurrDir is initialised with the value "Rows".

Then the local variable HVLRange is set equal to the local variable HLRange, the local variable HVRange is set equal to the local variable HRange, the local variable Header is set equal to the local variable HHeader, the local variable HV@ is set equal to the local variable H@, the local list LevelList is set equal to the local list HLevelList, the local variable LevelNbr is set equal to the local variable HLevelNbr, and the local variable HVCriteria is set equal to the local variable HCriteria.

At step 1208, the local variable CurrRec is set as being the top record of the range of cells HVRange.

At step 1209, a test is performed to check whether or not the left field of the record CurrRec is equal to the local variable HV@. If it is the case, then control is given to step 1210; otherwise control is given to step 1211.

At step 1210, a local variable LevelCell is initialised as being the right field of the record CurrRec, and the local variable Level is set equal to the content of the right field of the record CurrRec. Then control is given to step 1227.

At step 1211, a test is performed to check whether or not the local variable CurrRec is the last record of the range of cells HVRange. If it is the case, then control is given to step 1213; otherwise control is given to step 1212.

At step 1212, the record following CurrRec in the range of cells HVRange becomes the new record CurrRec. Then control is given to step 1209.

At step 1213, a new record is created within the range of cells HVRange, with the left field set equal to the value of the local variable HV@, and with the right field set equal to the value of the local variable Level. Then the local variable LevelCell is initialised as being the right field of this new record.

At step 1214, a test is performed to determine the value of the local variable FocusType. If found equal to ADDRESS, then control is given to step 1226; if found equal to ATTRIBUTE, then control is given to step 1215, if found equal to CONTENT, then control is given to step 1220.

At step 1215, the local variable WorkCell is set as being the top left cell of the range of cells HVLRange.

At step 1216, a test is performed to check whether or not the cells Header and Workcell share the same display attributes. In an embodiment of the present invention, these display attributes correspond to:

the background colour,
the background pattern,
the font size,
the font name,
the font colour,
the font bold attribute,
the font underline attribute,
the font italic attribute,
the text horizontal alignment,
the text vertical alignment,
the text orientation,
the text rotation and
the text wrapped attribute, but any other similar display attributes could be used instead without departing from the spirit of the present invention. If it is the case, then control is given to step 1217; otherwise control is given to step 1218.

At step 1217, the content of the cell represented by the local variable LevelCell is set equal to the content of the cell represented by the local variable WorkCell. Then control is given to step 1226.

At step 1218, a test is performed to check whether or not the cell represented by the local variable WorkCell belongs to the last record of the range of cells HVLRange. If it is the case, then control is given to step 1226; otherwise control is given to step 1219.

At step 1219, the cell located immediately below the cell represented by the local variable WorkCell becomes the new WorkCell cell. Then control is given to step 1216.

At step 1220, the local variable WorkRec is initialised as being the top record of the range of cells HVLRange.

At step 1221, a test is performed to check whether or not the right field of the record WorkRec is void (that is an empty cell). If it is the case, then control is given to step 1224; otherwise control is given to step 1222.

At step 1222, a test is performed to check whether or not the value of the local variable Criteria is less than the value of the right field of the record WorkRec. If it is the case, then control is given to step 1223; otherwise control is given to step 1226.

At step 1223, the content of the cell represented by the local variable LevelCell is set equal to the value of the left field of the record WorkRec and the local variable Level is set equal to the value of the left field of the record WorkRec.

At step 1224, a test is performed to check whether or not the record WorkRec is the last record of the range of cells HVLRange. If it is the case, then control is given to step 1226; otherwise control is given to step 1225.

At step 1225, the record following the record WorkRec in the range of cells HVLRange becomes the new record WorkRec. Then control is given to step 1221.

At step 1226, the local variable LevelNbr is incremented by 1 (one) to reflect that a new level setting has been created.

At step 1227, the entry of the local list LevelList which value is equal to the local variable Level is selected, so that it appears with a dark background colour in the Focus Setting Manager Dialog Box 1801.

At step 1228, a test is performed to check whether or not the local variable CurrDir is equal to "Rows". If it is the case, then control is given to step 1229; otherwise control is given to step 1230.

At step 1229, the local variable HVLRange is set equal to the local variable VLRange, the local variable Level is initialised with the value "always", the local variable HVRange is set equal to the local variable VRange, the local variable Header is set equal to the local variable VHeader, the local variable HV@ is set equal to the local variable V@, the local variable CurrDir is initialised with the value "Columns", the local list LevelList is set equal to the local list VLevelList, the local variable LevelNbr is set equal to the local variable VLevelNbr, the local variable HLevelCell is set equal to the local variable LevelCell, and the local variable HVCriteria is set equal to the local variable VCriteria. Then control is given to step 1208.

At step 1230, the local variable VLevelCell is set equal to the local variable LevelCell.

At step 1231, the method is in a wait state, waiting for a user action on the Focus Setting Manager Dialog Box 1801. Such user action is typically resulting from a click with the pointing device 105, but take other similar forms such as, but not limited to a specific combination of key on the keyboard 104, or any other similar means not further specified here.

At step 1232, an event is detected, as a result of a user action.

If the user action is a selection with the pointing device 105 within the list box 1805 of a vertical level, then control is given to step 1244.

If the user action is a selection with the pointing device 105 within the list box 1814 of an horizontal level, then control is given to step 1241.

If the user action is a click on the "Right" push-button 1807, then control is given to step 1240.

If the user action is a click on the "Left" push-button 1809, then control is given to step 1239.

If the user action is a click on the "Down" push-button 1810, then control is given to step 1238.

If the user action is a click on the "Up" push-button 1811, then control is given to step 1237.

If the user action is a click on the "Focus Level Definition Manager" push-button 1812, then control is given to step 1234.

If the user action is a click on the "Done/Quit" push-button 1808, or on the closing-window push-button 1802, then control is given to step 1233.

At step 1233, the Focus Setting Manager Dialog Box 1801 is closed on the display device 106. This completes the execution of the FocusSettingMgr command as control is returned back to the calling method having issued the FocusSettingMgr command.

At step 1234, the Focus Level Manager Dialog Box 1701 is displayed on the display device 106.

At step 1235, the command RefreshFocusLevelList is issued to launch the corresponding method for refreshing the focus level lists of the currently managed FMROC. When this RefreshFocusLevelList command returns control to the FocusSettingMgr command, control is given to step 1236.

At step 1236, the command FocusLevelMgr is issued to launch the corresponding method for managing the focus levels of the currently managed FMROC. When this FocusLevelMgr command returns control to the FocusSettingMgr command, control is given to step 1231.

At step 1237, the local variable HOffset is decremented by 1 (one). Then control is given to step 1202.

At step 1238, the local variable HOffset is incremented by 1 (one). Then control is given to step 1202.

At step 1239, the local variable VOffset is decremented by 1 (one). Then control is given to step 1202.

At step 1240, the local variable VOffset is incremented by 1 (one). Then control is given to step 1202.

At step 1241, the content of the cell represented by he local variable HLevelCell is set equal to the horizontal level selected within the list box 1814.

At step 1242, some local variables are initialised:
The local variable OldLevel is initialised with the content of the cell HLevelCell.
The local variable NewLevel is initialised as being the content of the cell HLevelCell. It is therefore the horizontal level which has been selected at the step 1232.
The local variable Criteria is set equal to the local variable HCriteria.
The local variable HVLRange is set equal to the local variable HLRange.
The local variable HVRange is set equal to the local variable HRange.
The local variable Criteria Offset is set equal to the local variable HCriteriaOffset.

At step 1243, a test is performed to determine the value of the local variable FocusType. If found equal to ADDRESS, then control is given to step 1202; if found equal to ATTRIBUTE, then control is given to step 1247; if found equal to CONTENT, then control is given to step 1249.

At step 1244, the content of the cell represented by he local variable VLevelCell is set equal to the vertical level selected within the list box 1805.

At step 1245, some local variables are initialised:
The local variable OldLevel is initialised with the content of the cell VLevelCell.
The local variable NewLevel is initialised as being the content of the cell VLevelCell. It is therefore the vertical level which has been selected at the step 1232.
The local variable Criteria is set equal to the local variable VCriteria.
The local variable HVLRange is set equal to the local variable VLRange.
The local variable HVRange is set equal to the local variable V Range.
The local variable CriteriaOffset is set equal to the local variable VCriteriaOffset.

At step 1246, a test is performed to determine the value of the local variable Focus Type. If found equal to ADDRESS, then control is given to step 1202; if found equal to ATTRIBUTE, then control is given to step 1248; if found equal to CONTENT, then control is given to step 1249.

At step 1247, the HHeader cell is copy-pasted by display attribute onto the record 1321 of the HLRange table 1320 which "HLevel" field 1322 is equal to the selected horizontal level NewLevel. Then control is given to step 1202.

At step 1248, the VHeader cell is copy-pasted by display attribute onto the record 1331 of the VLRange table 1330 which "VLevel" field 1332 is equal to the selected vertical level NewLevel. Then control is given to step 1202.

At step 1249, a test is performed to check whether or not the local variable OldLevel is equal to the local variable NewLevel. If it is the case, then control is given to step 1202; otherwise control is given to step 1250.

At step 1250, a test is performed to check whether or not the focus level represented by the local variable OldLevel is located above the focus level represented by the local variable NewLevel in the HVLRange table (meaning that OldLevel has a higher display priority than NewLevel). If it is the case, then control is given to step 1251; otherwise control is given to step 1256.

At step 1251, the local variable CurrRec is set equal to the HVLRange record which left field is equal to the value of the local variable NewLevel. Then the right field of the record CurrRec is set equal to the value of the local variable HVCriteria.

At step 1252, a test is performed to check whether or not the value of the left field of the record CurrRec is equal to the value of the local variable OldLevel. If it is the case, then control is given to step 1202; otherwise control is given to step 1253.

At step 1253, the record located above the record CurrRec in the range of cells HVLRange becomes the new record CurrRec.

At step 1254, a test is performed to check whether or not the right field of the record CurrRec is not void and less than or equal to the value of the local variable HVCriteria. If it is the case, then control is given to step 1255; otherwise control is given to step 1252.

At step 1255, the right field of the record CurrRec is cleared so that it becomes void. Then control is given to step 1252.

At step 1256, the local variable CurrRec is set equal to the HVLRange record which left field is equal to the value of the local variable OldLevel. Then the local variable WorkRec is set equal to the top record of the range of cells HVRange, and the local variable Found is initialised to the value FALSE.

At step 1257, a test is performed to check whether or not the right field of the record WorkRec is equal to the local variable OldLevel. If it is the case, then control is given to step 1259; otherwise control is given to step 1258.

At step 1258, a test is performed to check whether or not the record WorkRec is the last record of the range of cells HVRange. If it is the case, then control is given to step 1265; otherwise control is given to step 1264.

At step 1259, the local variable CurrValue is set equal to the value of the cell which is located along the direction HVDir at an offset equal to the value of the local variable HVCriteriaOffset with respect to the cell which address is pointed by the left field of the record WorkRec.

At step 1260, a test is performed to check whether or not the value of the local variable CurrValue is less than the value of the local variable HVCriteria. If it is the case, then control is given to step 1261; otherwise control is given to step 1258.

At step 1261, a test is performed to check whether or not the value of the local variable Found is equal to TRUE. If it is the case, then control is given to step 1262; otherwise control is given to step 1263.

At step 1262, a test is performed to check whether or not the value of the local variable CurrValue is greater than the value of the local variable NewMax. If it is the case, then control is given to step 1263; otherwise control is given to step 1258.

At step 1263, the local variable Found is set equal to TRUE, and the local variable NewMax is set equal to the value of the local variable CurrValue. Then control is given to step 1258.

At step 1264, the record following WorkRec in the range of cells HVRange becomes the new record WorkRec. Then control is given to step 1257.

At step 1265, a test is performed to check whether or not the local variable Found is equal to TRUE. If it is the case, then control is given to step 1266; otherwise control is given to step 1267.

At step 1266, the right field of the CurrRec record is set equal to the value of the local variable NewMax. Then control is given to step 1268.

At step 1267, the right field of the CurrRec record is cleared, so that its content becomes void.

At step 1268, the record of the HVLRange table located above the record CurrRec becomes the new CurrRec record.

At step 1269, a test is performed to check whether or not the left field of the record CurrRec is equal to the local variable NewLevel. If it is the case, then control is given to step 1202; otherwise control is given to step 1270.

At step 1270, a test is performed to check whether or not the right field of the record CurrRec is not void and greater than or equal to the value of the local variable HVCriteria. If it is the case, then control is given to step 1271; otherwise control is given to step 1269.

At step 1271, the right field of the record CurrRec is cleared so that it becomes void. Then control is given to step 1269.

ALTERNATE EMBODIMENTS

The methods and systems according to the present invention may be used advantageously in those environments where elements of information are organized as multidimensional tables having more than two or three dimensions.

The methods and systems according to the embodiment of the present invention may be easily extended for managed ranges of cells with FocusType equal to CONTENT, by identifying the focus level of an element according to the content of multiple cells of the element, or according to the comparison of the content of a single or of a plurality of cells of the element against the content of a single or of a plurality of other cells located either inside or outside the managed range of cells.

While the invention has been particularly shown and described with reference to an embodiment, it will be understood that various changes in form and detail may be made therein without departing from the spirit, and scope of the invention.

What is claimed is:

1. A system for providing an electronic multidimensional spreadsheet comprising a plurality of cells identified by a cell address along each dimension of the spreadsheet, including a non-transitory computer readable medium having stored thereon program code for displaying and/or hiding on a user interface, elements of a range of cells, the range of cells comprising one or a plurality of contiguous elements aligned along a given spreadsheet dimension, an element comprising one or a plurality of cells, the program code comprising:

(A) program code for detecting a command for hiding at least one element in a selected range of cells, the command identifying the selected range of cells and identifying a display focus level selected from an ordered set of display focus levels defined for the selected range of cells wherein the set of focus levels reflects a user defined display hierarchy;

(B) program code for identifying the selected range of cells comprising the element to hide;

(C) program code for identifying the selected display focus level;

(D) program code for identifying a table selected from a horizontal level range table, vertical level range table, horizontal range table, and vertical range table, the identified table associated with the selected range of cells, a focus manager linked to the identified table and associating each defined display focus level with at least one user defined cell content criteria to apply to the content of the at least one element, wherein a given display focus level is associated with a given cell in the selected range of cells if the given cell's content value matches the user defined cell content criteria for the given display focus level, wherein said user defined cell content criteria includes a user defined relationship to a predefined threshold value; and (E) program code for selectively displaying the element on the user interface only if the associated display focus level for the element is at least equal to or higher than the selected display focus level.

2. The system according to claim 1 wherein (E) further comprises: (E1) program code for hiding the at least one element on the user interface where the associated display focus level is lower than the selected display focus level.

3. The system according to claim 1 wherein (E) further comprises:

(E1) program code for operating on each element of the selected range of cells by:
(i) identifying at least one predefined cell in the element;
(ii) identifying the content of the predefined cell;
(iii) applying to the identified content, the cell content criteria associated with each display focus level defined in the table;
(iv) identifying in the table, the lowest display focus level for which all the associated cell content criteria is satisfied;
(v) associating the identified display focus level with the element; and
(vi) comparing the display focus level associated with the element with the selected display focus level.

4. The system according to claim 1 further comprising:
(F) program code for defining a plurality of display focus levels and ordering the display focus levels; and
(G) program code for defining at least one range of cells.

5. The system according to claim 4 further comprising:
(H) program code for operating on each defined range of cells by:
(i) defining elements in the range of cells;
(ii) defining a table and associating the range of cells with the table;
(iii) defining at least one criteria for each display focus level; and
(iv) associating, in the table, each defined display focus level with the at least one cell content criteria.

6. The system according to claim 1 wherein an element of a range of cells comprises one of a row, column and sheet.

7. The system according to claim 3 wherein (E1) further comprises:
(vii) program code for defining the predefined threshold value; and
(viii) program code for comparing the value of the content of the cell with the predefined threshold variable.

8. The system according to claim 3 wherein (E1) further comprises:
(vii) program code for defining means for identifying a second cell;

(viii) program code for comparing the content of the first cell with the content of the second cell.

9. A computer program product including a non-transitory computer readable medium having stored thereon program code for displaying and/or hiding on a user interface of an electronic multidimensional spreadsheet, elements of a range of cells, the range of cells comprising one or a plurality of contiguous elements aligned along a given spreadsheet dimension, an element comprising one or a plurality of cells, the program code comprising
   (A) program code for detecting a command for hiding at least one element in a selected range of cells, the command identifying the selected range of cells and identifying a display focus level selected from an ordered set of display focus levels defined for the selected range of cells, wherein the set of focus levels reflects a user defined display hierarchy
   (B) program code for identifying the selected range of cells comprising the element to hide;
   (C) program code for identifying the selected display focus level;
   (D) program code for identifying a table selected from a horizontal level range table, vertical level range table, horizontal range table, and vertical range table, the identified table associated with the selected range of cells, a focus manager linked to the identified table and associating each defined display focus level with at least one user defined cell content criteria to apply to the content of the at least one element, wherein a given display focus level is associated with a given cell in the selected range of cells if the given cell's content value matches the user defined cell content criteria for the given display focus level, wherein said user defined cell content criteria includes a user defined relationship to a predefined threshold value;
   and (E) program code for selectively displaying the element on the user interface only if the associated display focus level for the element is at least equal to or higher than the selected display focus level.

10. The computer program product according to claim 9 wherein (E) further comprises: (E1) program code for hiding the at least one element on the user interface where the associated display focus level is lower than the selected display focus level.

11. The computer program product according to claim 9 wherein (E) further comprises:
   (E1) program code for operating on each element of the selected range of cells by:
      (i) identifying at least one predefined cell in the element;
      (ii) identifying the content of the predefined cell;
      (iii) applying to the identified content, the cell content criteria associated with each display focus level defined in the table;
      (iv) identifying in the table, the lowest display focus level for which all the associated cell content criteria is satisfied;
      (v) associating the identified display focus level with the element; and
      (vi) comparing the display focus level associated with the element with the selected display focus level.

12. The computer program product according to claim 9 further comprising:
   (F) program code for defining a plurality of display focus levels and ordering the display focus levels; and
   (G) program code for defining at least one range of cells.

13. The computer program product according to claim 12 further comprising:
   (H) program code for operating on each defined range of cells by:
      (i) defining elements in the range of cells;
      (ii) defining a table and associating the range of cells with the table;
      (iii) defining at least one criteria for each display focus level; and
      (iv) associating, in the table, each defined display focus level with the at least one cell content criteria.

14. The computer program product according to claim 9 wherein an element of a range of cells comprises one of a row, column and sheet.

15. The computer program product according to claim 11 wherein (E1) further comprises:
   (vii) program code for defining the predefined threshold value; and
   (viii) program code for comparing the value of the content of the cell with the predefined threshold variable.

16. The computer program product according to claim 11 wherein (E1) further comprises:
   (vii) program code for defining means for identifying a second cell;
   (viii) program code for comparing the content of the first cell with the content of the second cell.

17. A computer program product including a non-transitory computer readable medium having stored thereon program code for displaying and/or hiding on a user interface of an electronic multidimensional spreadsheet, elements of a range of cells, the range of cells comprising one or a plurality of contiguous elements aligned along a given spreadsheet dimension, an element comprising one or a plurality of cells, the program code comprising
   (A) means for detecting a command for hiding at least one element in a selected range of cells, the command identifying the selected range of cells and identifying a display focus level selected from an ordered set of display focus levels defined for the selected range of cells, wherein the set of focus levels reflects a user defined display hierarchy
   (B) means for identifying the selected range of cells comprising the element to hide;
   (C) means for identifying the selected display focus level;
   (D) means for identifying a table selected from a horizontal level range table, vertical level range table, horizontal range table, and vertical range table, the identified table associated with the selected range of cells, a focus manager linked to the identified table and associating each defined display focus level with at least one user defined cell content criteria to apply to the content of the at least one element, wherein a given display focus level is associated with a given cell in the selected range of cells if the given cell's content value matches the user defined cell content criteria for the given display focus level, wherein said user defined cell content criteria includes a user defined relationship to a predefined threshold value;
   and (E) means for selectively displaying the element on the user interface only if the associated display focus level for the element is at least equal to or higher than the selected display focus level.

* * * * *